United States Patent
Cook, Jr. et al.

(10) Patent No.: US 7,988,036 B2
(45) Date of Patent: Aug. 2, 2011

(54) ARTICLE HAVING AN EMBEDDED ACCESSIBLE STORAGE MEMBER, APPARATUS AND METHOD FOR USING SAME

(75) Inventors: Bert D. Cook, Jr., Morgan Hill, CA (US); Donald C. Mann, Thousand Oaks, CA (US)

(73) Assignee: UltraCard, Inc., Bend, OR (US)

( * ) Notice: Subject to any disclaimer, the term of this patent is extended or adjusted under 35 U.S.C. 154(b) by 0 days.

(21) Appl. No.: 12/210,064

(22) Filed: Sep. 12, 2008

(65) Prior Publication Data

US 2009/0127338 A1    May 21, 2009

Related U.S. Application Data

(60) Division of application No. 09/502,812, filed on Feb. 9, 2000, now Pat. No. 7,487,908, and a continuation-in-part of application No. 09/426,793, filed on Oct. 23, 1999, now Pat. No. 7,036,739.

(60) Provisional application No. 60/161,302, filed on Oct. 23, 1999.

(51) Int. Cl.
| | |
|---|---|
| *G06F 17/00* | (2006.01) |
| *G06Q 40/00* | (2006.01) |
| *G07D 11/00* | (2006.01) |
| *G07F 19/00* | (2006.01) |
| *G06K 5/00* | (2006.01) |
| *G06K 19/00* | (2006.01) |
| *G06K 19/06* | (2006.01) |
| *G06K 7/00* | (2006.01) |
| *G06K 7/08* | (2006.01) |
| *G11B 11/00* | (2006.01) |
| *G11B 33/02* | (2006.01) |
| *G11B 25/04* | (2006.01) |

(52) U.S. Cl. ........ 235/375; 235/379; 235/380; 235/487; 235/492; 235/493; 235/435; 235/439; 235/449; 369/13.17; 369/13.41; 369/13.11; 369/78; 705/41; 360/2; 360/17

(58) Field of Classification Search .................. 235/375, 235/379, 380, 487, 492, 493, 435, 439, 449; 369/13.17, 13.41, 13.11, 78; 705/41; 360/22, 360/17

See application file for complete search history.

(56) References Cited

U.S. PATENT DOCUMENTS

1,756,547 A    4/1930    Hansen
(Continued)

FOREIGN PATENT DOCUMENTS

EP    0 194 675    9/1986
(Continued)

OTHER PUBLICATIONS

Gooch et al. "A High Resolution Flying Magnetic Disk Recording System with Zero Reproduce Spacing Loss," IEEE Transactions on Magnetics, vol. 27, No. 6, Nov. 1991, pp. 4545-4554.

(Continued)

*Primary Examiner* — Daniel Walsh
(74) *Attorney, Agent, or Firm* — Bever, Hoffman & Harms, LLP; Patrick T. Bever

(57) ABSTRACT

A portable card adapted to interact with a data processing station when the portable card and the data processing station are moved relative to each other is disclosed. The portable card includes a substrate having a predetermined shape, e.g. rectangular. An accessible embedded storage member is enclosed within said substrate. The storage member includes at least one layer of storage material for storing information in a predetermined format for processing by the data processing station. The storage member and the substrate are adapted to be transported relative to each other to expose at least a portion of the storage member to the data processing station to facilitate processing of stored information and for embedment of the storage member within the substrate. The storage member may be in the form of an elongated strip member, or a circular member.

17 Claims, 22 Drawing Sheets

U.S. PATENT DOCUMENTS

| | | | |
|---|---|---|---|
| 3,612,835 A | 10/1971 | Andrews et al. | |
| 3,633,188 A | 1/1972 | Bittmann | |
| 3,648,832 A | 3/1972 | Kirshenbaum et al. | |
| 3,677,843 A | 7/1972 | Reiss | |
| 3,732,640 A | 5/1973 | Changnon | |
| 3,749,889 A * | 7/1973 | Vaskunas et al. | 235/474 |
| 3,838,252 A * | 9/1974 | Hynes et al. | 360/131 |
| 3,864,755 A | 2/1975 | Hargis | |
| 3,986,205 A | 10/1976 | Fayling | |
| 4,001,888 A * | 1/1977 | Morgan | 360/78.05 |
| 4,006,507 A | 2/1977 | Yoshida | |
| 4,058,839 A | 11/1977 | Darjany | |
| 4,076,125 A | 2/1978 | Ohsaki et al. | |
| 4,100,689 A | 7/1978 | Broune | |
| 4,104,682 A | 8/1978 | Lehner et al. | |
| 4,108,362 A | 8/1978 | Trussell et al. | |
| 4,141,400 A * | 2/1979 | Mangan | 206/39.6 |
| 4,197,988 A | 4/1980 | Moss et al. | |
| 4,202,445 A | 5/1980 | Porter | |
| 4,209,811 A | 6/1980 | Blazevic | |
| 4,271,351 A | 6/1981 | Bloodworth | |
| 4,277,809 A | 7/1981 | Fisher et al. | |
| 4,296,315 A * | 10/1981 | Weimer et al. | 235/460 |
| 4,302,523 A | 11/1981 | Audran et al. | |
| 4,314,289 A | 2/1982 | Haynes | |
| 4,318,136 A * | 3/1982 | Jeffers | 360/17 |
| 4,330,350 A | 5/1982 | Andrews | |
| D264,853 S | 6/1982 | Scavino et al. | |
| 4,394,621 A | 7/1983 | Rohen | |
| 4,403,138 A | 9/1983 | Battarel et al. | |
| 4,450,955 A | 5/1984 | Featherston | |
| 4,503,125 A * | 3/1985 | Nelson et al. | 428/408 |
| 4,518,627 A | 5/1985 | Foley et al. | |
| 4,530,016 A | 7/1985 | Sawazaki | |
| 4,535,369 A * | 8/1985 | Sawazaki | 360/55 |
| 4,581,523 A | 4/1986 | Okuno | |
| 4,585,929 A | 4/1986 | Brown et al. | |
| 4,592,042 A | 5/1986 | Lemelson et al. | |
| 4,598,196 A | 7/1986 | Pierce et al. | |
| 4,609,812 A | 9/1986 | Drexler | |
| 4,612,436 A | 9/1986 | Okada | |
| 4,612,455 A | 9/1986 | Weiner et al. | |
| 4,619,469 A | 10/1986 | Grover | |
| 4,620,727 A | 11/1986 | Stockburger et al. | |
| 4,650,597 A | 3/1987 | Hibst et al. | |
| 4,659,914 A | 4/1987 | Kondo et al. | |
| 4,659,915 A | 4/1987 | Flies | |
| 4,672,182 A | 6/1987 | Hirokawa | |
| 4,683,371 A | 7/1987 | Drexler | |
| 4,687,712 A | 8/1987 | Sugita et al. | |
| 4,701,601 A | 10/1987 | Francini et al. | |
| 4,707,593 A | 11/1987 | Murata et al. | |
| D293,694 S | 1/1988 | Alden et al. | |
| 4,718,697 A | 1/1988 | Berardus van Amelsfort | |
| 4,731,645 A | 3/1988 | Parmentier et al. | |
| 4,745,267 A | 5/1988 | Davis et al. | |
| 4,754,128 A | 6/1988 | Takeda et al. | |
| 4,756,967 A | 7/1988 | Hashimoto et al. | |
| 4,774,618 A | 9/1988 | Raviv | |
| 4,777,540 A | 10/1988 | McCoy | |
| 4,780,604 A | 10/1988 | Hasegawa et al. | |
| 4,786,564 A | 11/1988 | Chen et al. | |
| 4,789,776 A | 12/1988 | Inoue | |
| 4,791,283 A | 12/1988 | Burkhardt | |
| 4,812,633 A | 3/1989 | Vogelgesang et al. | |
| 4,826,772 A | 5/1989 | Meathrel | |
| 4,833,310 A | 5/1989 | Shimamura et al. | |
| 4,851,610 A | 7/1989 | LeBlanc et al. | |
| 4,868,373 A | 9/1989 | Opheij et al. | |
| 4,877,488 A | 10/1989 | Cody et al. | |
| 4,884,507 A | 12/1989 | Levy | |
| 4,889,755 A | 12/1989 | Charbonneau | |
| 4,897,533 A | 1/1990 | Lyszczarz | |
| D305,887 S | 2/1990 | Nishimura | |
| 4,931,623 A | 6/1990 | Nakamura et al. | |
| 4,937,438 A | 6/1990 | Warwick et al. | |
| 4,965,440 A | 10/1990 | Hasegawa | |
| 4,978,401 A | 12/1990 | Bonomi | |
| 4,985,795 A | 1/1991 | Gooch | |
| 4,990,759 A | 2/1991 | Gloton et al. | |
| 4,998,009 A | 3/1991 | Iijima et al. | |
| 5,009,925 A * | 4/1991 | Grigat et al. | 427/599 |
| 5,036,430 A | 7/1991 | Hills | |
| 5,041,922 A | 8/1991 | Wood et al. | |
| 5,049,728 A | 9/1991 | Rovin | |
| 5,051,288 A | 9/1991 | Ahlert et al. | |
| 5,054,088 A * | 10/1991 | Gunderson et al. | 382/120 |
| 5,055,155 A | 10/1991 | Crotty et al. | |
| 5,079,831 A * | 1/1992 | Reid | 29/603.13 |
| 5,099,111 A | 3/1992 | Takakura et al. | |
| 5,101,097 A | 3/1992 | Conant | |
| 5,107,099 A | 4/1992 | Smith | |
| 5,119,256 A * | 6/1992 | NakaMats | 360/128 |
| D328,457 S | 8/1992 | Matsuzaka | |
| 5,147,732 A | 9/1992 | Shiroishi et al. | |
| 5,155,663 A | 10/1992 | Harase | |
| 5,172,282 A | 12/1992 | Ghose | |
| 5,180,640 A | 1/1993 | Yamashita et al. | |
| 5,191,198 A | 3/1993 | Do | |
| 5,204,513 A | 4/1993 | Steele | |
| 5,206,489 A | 4/1993 | Warwick | |
| 5,206,494 A | 4/1993 | Metzger | |
| 5,217,056 A | 6/1993 | Ritter | |
| 5,221,838 A | 6/1993 | Gutman et al. | |
| 5,227,212 A | 7/1993 | Ahlert et al. | |
| 5,236,791 A | 8/1993 | Yahisa et al. | |
| 5,237,164 A | 8/1993 | Takada | |
| 5,254,843 A | 10/1993 | Hynes et al. | |
| 5,255,941 A * | 10/1993 | Solomon | 283/82 |
| 5,270,523 A | 12/1993 | Chang et al. | |
| 5,275,573 A | 1/1994 | McCleerey | |
| 5,286,958 A | 2/1994 | Smeets | |
| 5,288,942 A * | 2/1994 | Godfrey | 174/380 |
| 5,309,388 A | 5/1994 | Maruyama et al. | |
| 5,311,003 A | 5/1994 | Saroya | |
| 5,321,243 A | 6/1994 | Groves et al. | |
| 5,336,871 A | 8/1994 | Colgate, Jr. | |
| 5,339,209 A | 8/1994 | Dion | |
| 5,356,717 A | 10/1994 | Choki et al. | |
| 5,362,952 A | 11/1994 | Nair et al. | |
| 5,396,369 A | 3/1995 | Deland, Jr. et al. | |
| 5,396,545 A | 3/1995 | Nair et al. | |
| 5,397,886 A | 3/1995 | Mos et al. | |
| 5,408,384 A | 4/1995 | Gannyo et al. | |
| 5,410,136 A | 4/1995 | McIntire et al. | |
| 5,421,618 A | 6/1995 | Okazaki et al. | |
| 5,426,286 A | 6/1995 | Nair | |
| 5,431,746 A | 7/1995 | Manning et al. | |
| 5,452,143 A | 9/1995 | Kamagami | |
| 5,455,723 A | 10/1995 | Boutaghou et al. | |
| 5,466,918 A | 11/1995 | Ray et al. | |
| 5,473,505 A | 12/1995 | Kessoku et al. | |
| 5,480,685 A | 1/1996 | Suzuki et al. | |
| 5,488,526 A * | 1/1996 | Sakashita et al. | 360/267.3 |
| 5,492,745 A | 2/1996 | Yokoyama | |
| 5,494,621 A * | 2/1996 | Sugisaki et al. | 264/40.1 |
| 5,509,083 A | 4/1996 | Abtahi et al. | |
| 5,521,774 A | 5/1996 | Parks et al. | |
| 5,526,233 A | 6/1996 | Hayakawa | |
| 5,530,232 A | 6/1996 | Taylor | |
| 5,535,078 A | 7/1996 | Warwick | |
| 5,537,282 A | 7/1996 | Treves et al. | |
| 5,538,291 A | 7/1996 | Gustafson | |
| 5,546,250 A | 8/1996 | Diel | |
| 5,557,089 A | 9/1996 | Hall et al. | |
| 5,559,885 A | 9/1996 | Drexler et al. | |
| 5,563,400 A * | 10/1996 | Le Roux | 235/486 |
| 5,588,763 A | 12/1996 | Nubson et al. | |
| 5,594,233 A | 1/1997 | Kenneth et al. | |
| 5,598,474 A | 1/1997 | Johnson | |
| 5,609,253 A | 3/1997 | Goade | |
| 5,612,526 A | 3/1997 | Oguchi et al. | |
| 5,612,940 A * | 3/1997 | Otsuka et al. | 720/631 |
| 5,621,583 A | 4/1997 | Parks et al. | |
| 5,625,534 A * | 4/1997 | Okaya et al. | 361/679.32 |
| 5,626,970 A | 5/1997 | Hedgcoth | |
| 5,637,174 A | 6/1997 | Field et al. | |

| | | | | | | | |
|---|---|---|---|---|---|---|---|
| 5,638,345 | A | 6/1997 | Hosoya | 6,097,605 | A * | 8/2000 | Klatt et al. ............ 361/737 |
| 5,677,524 | A | 10/1997 | Haghiri-Tehrani | 6,116,655 | A | 9/2000 | Thouin et al. |
| 5,679,942 | A | 10/1997 | Toyama | 6,131,816 | A | 10/2000 | Smith |
| 5,679,945 | A | 10/1997 | Renner et al. | 6,138,917 | A | 10/2000 | Chapin, Jr. |
| 5,689,105 | A | 11/1997 | Mizoguchi et al. | 6,141,161 | A | 10/2000 | Sato et al. |
| 5,696,369 | A | 12/1997 | Watanabe | 6,155,410 | A | 12/2000 | Davis |
| 5,698,839 | A | 12/1997 | Jagielinski | D436,991 | S | 1/2001 | Morgante |
| 5,713,406 | A | 2/1998 | Drury | 6,184,788 | B1 | 2/2001 | Middlemiss et al. |
| 5,714,747 | A | 2/1998 | West et al. | 6,186,398 | B1 | 2/2001 | Kato et al. |
| 5,720,500 | A | 2/1998 | Okazaki et al. | 6,193,163 | B1 | 2/2001 | Fehrman et al. |
| 5,721,942 | A | 2/1998 | Nishiyama et al. | 6,196,047 | B1 | 3/2001 | Carnegie et al. |
| 5,723,033 | A | 3/1998 | Weiss | 6,196,594 | B1 | 3/2001 | Keller |
| 5,734,154 | A | 3/1998 | Jachimowicz et al. | 6,202,926 | B1 | 3/2001 | Ito et al. |
| 5,738,945 | A | 4/1998 | Lal et al. | 6,221,508 | B1 | 4/2001 | Kanbe et al. |
| 5,739,975 | A | 4/1998 | Parks et al. | 6,238,809 | B1 | 5/2001 | Wu et al. |
| 5,748,737 | A | 5/1998 | Daggar | 6,241,153 | B1 * | 6/2001 | Tiffany, III ............ 235/488 |
| 5,756,220 | A | 5/1998 | Hoshino et al. | 6,254,713 | B1 | 7/2001 | Riehle |
| 5,763,862 | A | 6/1998 | Jachimowicz et al. | 6,268,919 | B1 | 7/2001 | Meeks et al. |
| 5,770,942 | A | 6/1998 | Taguchi | D447,146 | S | 8/2001 | Myers |
| 5,777,306 | A | 7/1998 | Masuda | D448,776 | S | 10/2001 | Weng et al. |
| 5,789,733 | A | 8/1998 | Jachimowicz et al. | 6,301,068 | B1 | 10/2001 | Ionescu |
| 5,801,368 | A | 9/1998 | Hayashi et al. | 6,310,471 | B1 | 10/2001 | Chedister |
| 5,808,981 | A | 9/1998 | Suzuki | 6,311,893 | B1 | 11/2001 | Liu et al. |
| 5,818,030 | A * | 10/1998 | Reyes ............ 235/492 | 6,320,751 | B2 | 11/2001 | Takeda et al. |
| 5,825,393 | A | 10/1998 | Kocznar et al. | 6,353,870 | B1 | 3/2002 | Mills et al. |
| 5,828,053 | A | 10/1998 | Kinugasa | 6,372,338 | B1 | 4/2002 | Jeffers et al. |
| 5,830,590 | A | 11/1998 | Gooch et al. | 6,375,081 | B1 | 4/2002 | Hileman et al. |
| 5,834,756 | A | 11/1998 | Gutman et al. | 6,378,037 | B1 | 4/2002 | Hall |
| 5,843,565 | A | 12/1998 | Davies et al. | 6,394,343 | B1 | 5/2002 | Berg et al. |
| 5,844,218 | A | 12/1998 | Kawan et al. | 6,398,114 | B1 | 6/2002 | Nishikawa et al. |
| 5,844,230 | A | 12/1998 | Lalonde | 6,430,114 | B1 | 8/2002 | Wang et al. |
| 5,844,757 | A * | 12/1998 | Rose ............ 360/131 | 6,438,638 | B1 | 8/2002 | Jones et al. |
| 5,851,688 | A | 12/1998 | Chen et al. | 6,448,638 | B1 | 9/2002 | Fidalgo et al. |
| 5,852,289 | A | 12/1998 | Masahiko | 6,460,772 | B1 | 10/2002 | Stahl |
| 5,857,079 | A | 1/1999 | Claus et al. | 6,482,330 | B1 | 11/2002 | Bajorek |
| 5,858,265 | A | 1/1999 | Ataie et al. | 6,484,940 | B1 | 11/2002 | Dilday et al. |
| 5,859,419 | A | 1/1999 | Wynn | 6,554,193 | B1 | 4/2003 | Fehrman et al. |
| 5,861,220 | A | 1/1999 | Coughlin | RE38,290 | E * | 10/2003 | Rose ............ 360/131 |
| 5,862,174 | A | 1/1999 | Yokota | 6,629,643 | B1 | 10/2003 | Nagata et al. |
| 5,866,891 | A | 2/1999 | Fujimoto et al. | 6,677,105 | B2 | 1/2004 | Wang et al. |
| 5,869,823 | A | 2/1999 | Bublitz et al. | 6,738,259 | B2 | 5/2004 | Le et al. |
| 5,870,260 | A | 2/1999 | Davies et al. | 6,761,313 | B2 | 7/2004 | Hsieh et al. |
| 5,877,488 | A * | 3/1999 | Klatt et al. ............ 235/486 | 6,786,415 | B2 * | 9/2004 | Yiu ............ 235/486 |
| 5,880,445 | A | 3/1999 | Mori et al. | 6,824,066 | B2 * | 11/2004 | Weyant ............ 235/493 |
| 5,880,454 | A | 3/1999 | Monicault | 6,832,730 | B2 | 12/2004 | Conner et al. |
| 5,883,377 | A | 3/1999 | Chapin | 6,857,569 | B1 | 2/2005 | Smith et al. |
| 5,884,271 | A | 3/1999 | Pitroda | 6,871,682 | B2 | 3/2005 | Hogganvik |
| 5,886,333 | A | 3/1999 | Miyake | 6,883,718 | B1 | 4/2005 | Le et al. |
| 5,887,145 | A | 3/1999 | Harari et al. | 6,893,268 | B1 | 5/2005 | Harari et al. |
| 5,889,273 | A | 3/1999 | Goto | D509,847 | S | 9/2005 | Cook et al. |
| D408,377 | S | 4/1999 | Ferchau et al. | 6,969,006 | B1 * | 11/2005 | Smith, Sr. ............ 235/487 |
| 5,895,903 | A | 4/1999 | Abe et al. | 6,991,172 | B2 | 1/2006 | Luu |
| 5,895,909 | A | 4/1999 | Yoshida | 7,036,739 | B2 | 5/2006 | Mann et al. |
| 5,898,612 | A | 4/1999 | Chen et al. | 7,160,129 | B2 | 1/2007 | Yin |
| 5,901,012 | A | 5/1999 | Ishida | 7,201,324 | B2 | 4/2007 | Mann et al. |
| 5,901,303 | A | 5/1999 | Chew | 7,213,749 | B2 | 5/2007 | Webb et al. |
| D410,769 | S | 6/1999 | Dorizas | 7,222,205 | B2 | 5/2007 | Jones et al. |
| 5,928,759 | A | 7/1999 | Arita et al. | 7,487,908 | B1 * | 2/2009 | Cook et al. ............ 235/375 |
| 5,932,865 | A | 8/1999 | Drexler | 2001/0006441 | A1* | 7/2001 | Komatsu et al. ............ 360/99.02 |
| 5,936,226 | A * | 8/1999 | Aucsmith ............ 235/492 | 2001/0011684 | A1* | 8/2001 | Krause ............ 235/492 |
| 5,939,202 | A | 8/1999 | Ataka et al. | 2001/0021087 | A1* | 9/2001 | Guo et al. ............ 360/315 |
| 5,941,375 | A | 8/1999 | Kamens et al. | 2001/0029490 | A1 | 10/2001 | Inamochi |
| 5,942,744 | A | 8/1999 | Kamo et al. | 2001/0052543 | A1 | 12/2001 | Liu et al. |
| 5,955,961 | A | 9/1999 | Wallerstein | 2001/0055702 | A1 | 12/2001 | Wang et al. |
| 5,975,584 | A | 11/1999 | Vogt | 2002/0016739 | A1* | 2/2002 | Ogasawara ............ 705/22 |
| 5,979,774 | A | 11/1999 | Urushibata | 2002/0074401 | A1 | 6/2002 | Madani |
| 5,984,191 | A | 11/1999 | Chapin, Jr. | 2002/0088851 | A1 | 7/2002 | Hodes |
| 5,997,042 | A | 12/1999 | Blank | 2002/0091573 | A1 | 7/2002 | Hodes |
| 6,011,677 | A * | 1/2000 | Rose ............ 360/133 | 2002/0113130 | A1 | 8/2002 | Barnhill et al. |
| 6,012,635 | A * | 1/2000 | Shimada et al. ............ 235/380 | 2002/0150675 | A1* | 10/2002 | Everitt et al. ............ 427/128 |
| 6,015,093 | A * | 1/2000 | Barrett et al. ............ 235/492 | 2003/0024995 | A1* | 2/2003 | Conner et al. ............ 235/492 |
| 6,043,947 | A | 3/2000 | Gooch et al. | 2003/0043485 | A1* | 3/2003 | Conner et al. ............ 360/2 |
| D425,876 | S | 5/2000 | Maiers et al. | 2003/0095358 | A1* | 5/2003 | Oishi et al. ............ 360/133 |
| 6,065,681 | A | 5/2000 | Trueggelmann | 2003/0095386 | A1* | 5/2003 | Le et al. ............ 361/737 |
| 6,073,845 | A | 6/2000 | Kawase | 2003/0104730 | A1 | 6/2003 | Kitadai |
| 6,079,621 | A | 6/2000 | Vardanyan et al. | 2003/0124384 | A1* | 7/2003 | Sanders ............ 428/692 |
| 6,080,476 | A | 6/2000 | Kanbe et al. | 2003/0132300 | A1* | 7/2003 | Dilday et al. ............ 235/487 |
| 6,089,459 | A | 7/2000 | Eisele et al. | 2003/0155423 | A1 | 8/2003 | Limelette et al. |
| D429,733 | S | 8/2000 | Jones et al. | 2003/0213849 | A1 | 11/2003 | Luu |

| | | | |
|---|---|---|---|
| 2003/0218064 A1 | 11/2003 | Conner et al. | |
| 2004/0042323 A1 | 3/2004 | Moshayedi | |
| 2004/0048503 A1* | 3/2004 | Mills et al. | 439/76.1 |
| 2004/0089717 A1* | 5/2004 | Harari et al. | 235/441 |
| 2004/0093503 A1* | 5/2004 | Dombrowski | 713/186 |
| 2004/0188530 A1* | 9/2004 | Cook et al. | 235/486 |
| 2004/0268001 A1* | 12/2004 | Mills et al. | 710/301 |
| 2005/0001027 A1* | 1/2005 | Bahar | 235/382 |
| 2005/0023361 A1 | 2/2005 | Ikefuji et al. | |
| 2005/0157462 A1 | 7/2005 | Sugawara et al. | |
| 2005/0190542 A1 | 9/2005 | Chee | |
| 2005/0194453 A1 | 9/2005 | Conner et al. | |
| 2005/0198424 A1 | 9/2005 | Harari et al. | |
| 2005/0235086 A1 | 10/2005 | Mills et al. | |
| 2005/0242193 A1 | 11/2005 | Smith et al. | |
| 2005/0286156 A1* | 12/2005 | Shimamura et al. | 360/77.08 |
| 2006/0038014 A1* | 2/2006 | Mann et al. | 235/449 |
| 2006/0038023 A1 | 2/2006 | Brewer et al. | |
| 2006/0054709 A1 | 3/2006 | Lee | |
| 2006/0079133 A1* | 4/2006 | Kim | 439/630 |
| 2006/0091223 A1 | 5/2006 | Zellner et al. | |
| 2006/0253636 A1* | 11/2006 | Jones et al. | 710/301 |
| 2007/0016704 A1* | 1/2007 | Harari et al. | 710/68 |
| 2007/0108279 A1* | 5/2007 | Wang | 235/441 |
| 2007/0251999 A1* | 11/2007 | Bohlke et al. | 235/380 |
| 2007/0259570 A1 | 11/2007 | Moshayedi | |
| 2009/0045262 A1* | 2/2009 | Cook et al. | 235/493 |
| 2009/0127338 A1 | 5/2009 | Cook, Jr. et al. | |
| 2009/0321530 A1* | 12/2009 | Harari et al. | 235/492 |

FOREIGN PATENT DOCUMENTS

| | | |
|---|---|---|
| EP | 0 402 182 A1 | 12/1990 |
| FR | 2 505 523 | 12/1982 |
| JP | 63-013794 | 1/1988 |
| JP | 64-055756 | 3/1989 |
| JP | 02-009037 | 1/1990 |
| JP | 02-103719 | 4/1990 |
| JP | 02-156416 | 6/1990 |
| JP | 02-308418 A | 12/1990 |
| JP | WO 93/12928 A1 | 7/1993 |
| JP | 05-314433 | 11/1993 |
| JP | 06-167920 | 6/1994 |
| JP | 07-503337 | 4/1995 |
| JP | 07-041769 | 7/1995 |
| JP | 07-326046 | 12/1995 |
| JP | 10-041118 A | 2/1998 |
| JP | 10-144391 | 5/1998 |
| JP | 11-116412 | 5/1998 |
| JP | 10-171961 | 6/1998 |
| JP | 11-007515 | 1/1999 |

OTHER PUBLICATIONS

Advertising Brochure, iomega Click! PC Card Drive (40 MB disk) Iomega Corporation, 1999, 1 page.

Advertising Brochure, SysTECH, Wallet size CD-ROM, Copyright 1999, 1 page.

Gold CD Mini ROM (Picture), Back/Front Packaging for CD Mini ROM AOL, America on Line, 1995.

Bhushan, Bharat. *Tribology and Mechanics of Magnetic Storage Devices*, New York: Springer-Verlag, 1990, pp. 599, 629-638.

* cited by examiner

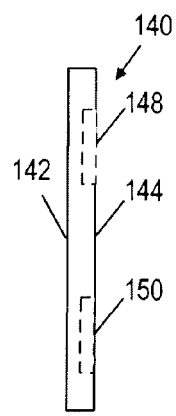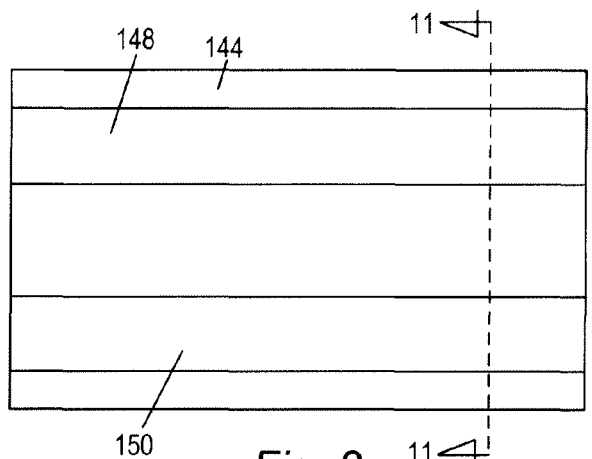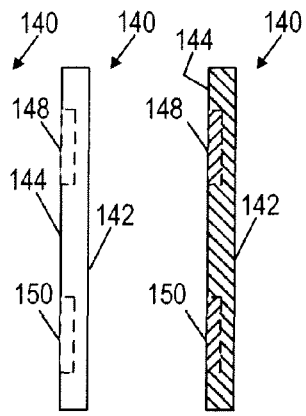
Fig. 10   Fig. 8   Fig. 9   Fig. 11
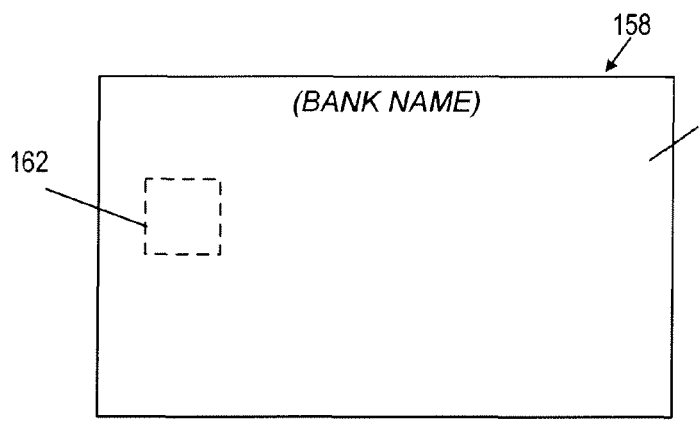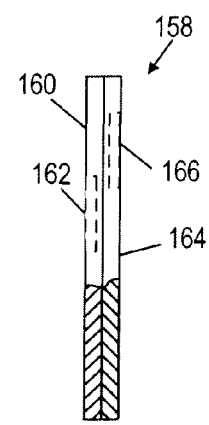
Fig. 12   Fig. 13
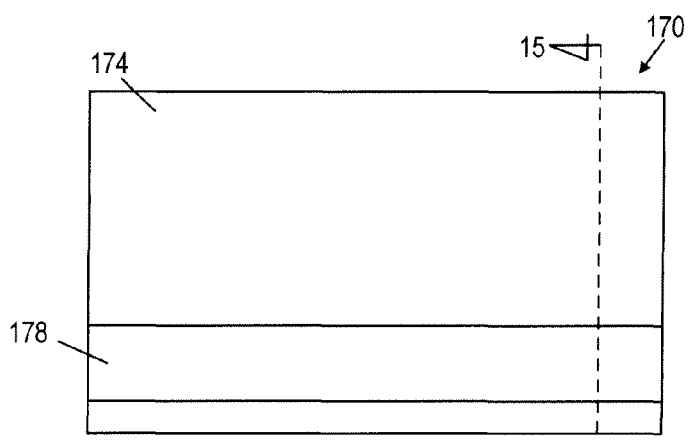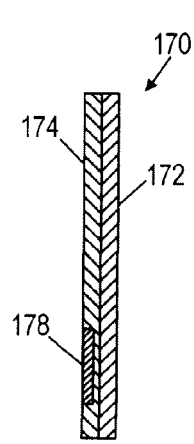
Fig. 14   Fig. 15

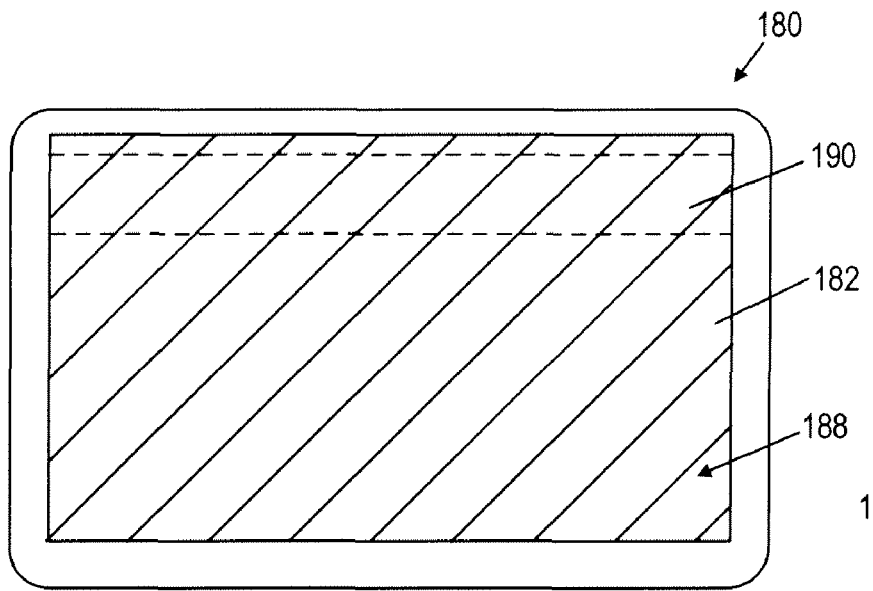
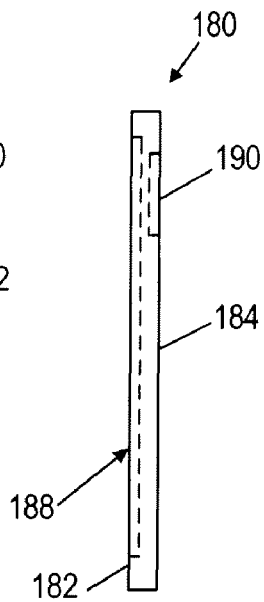
Fig. 16      Fig. 17
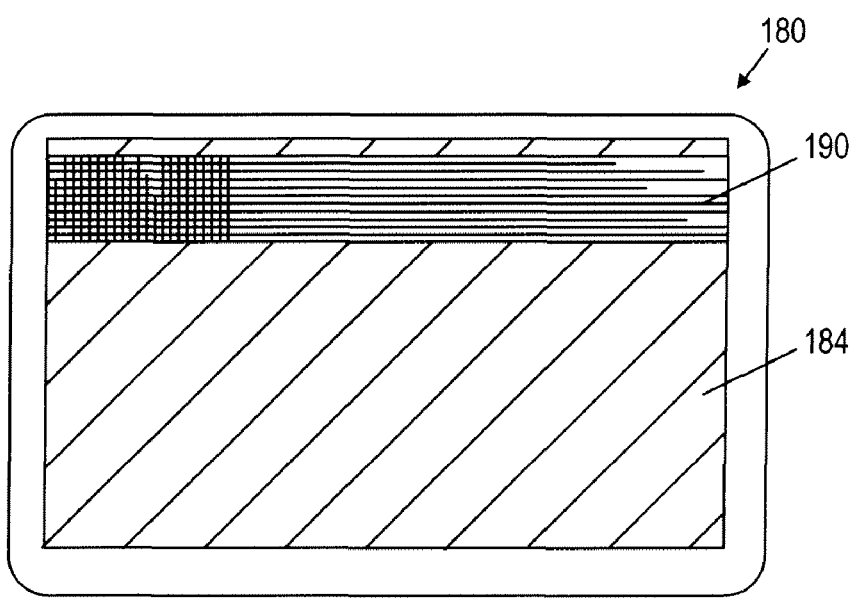
Fig. 18

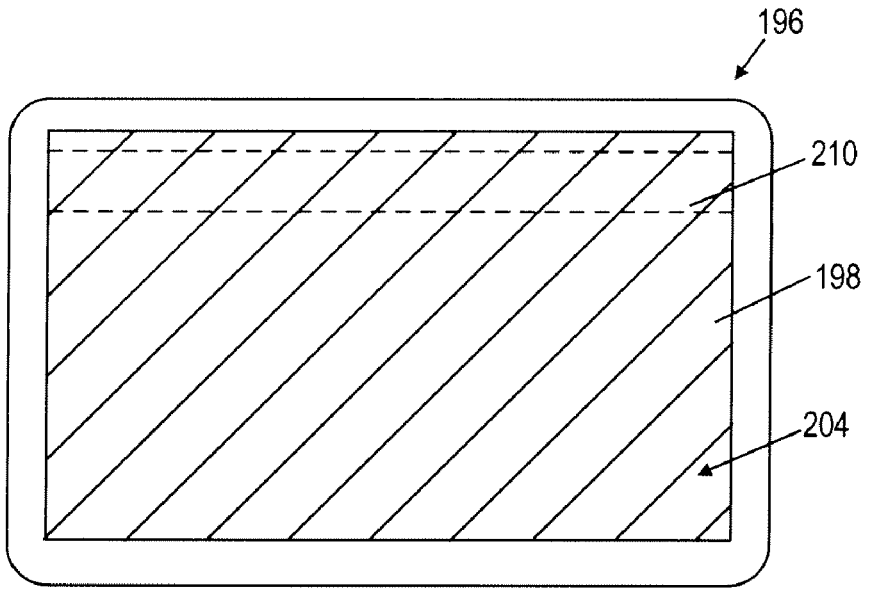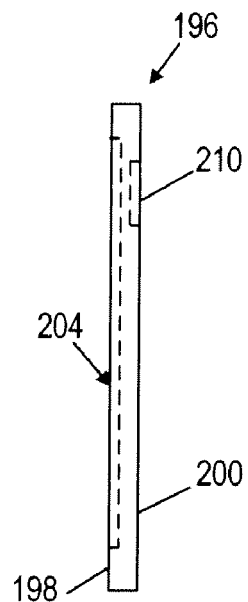
Fig. 19       Fig. 20
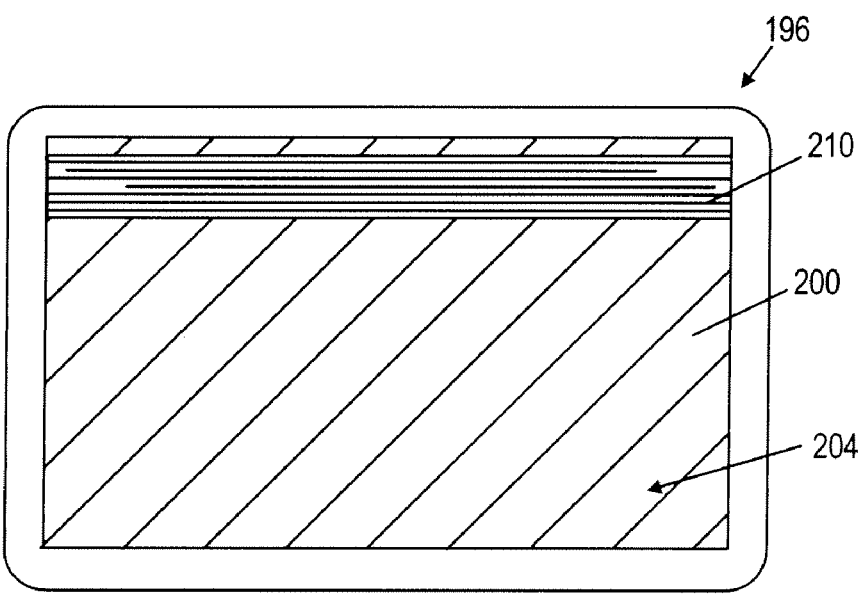
Fig. 21

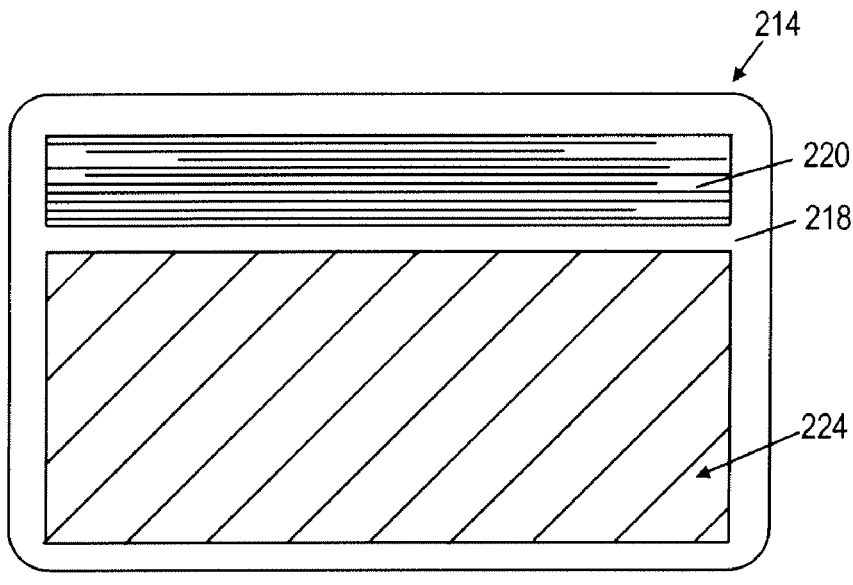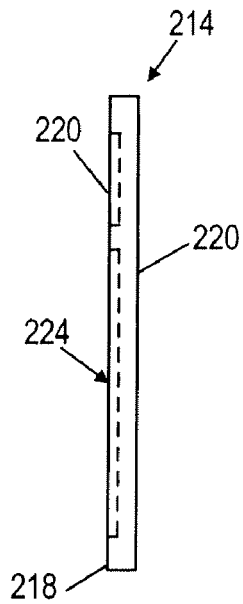
Fig. 22      Fig. 23
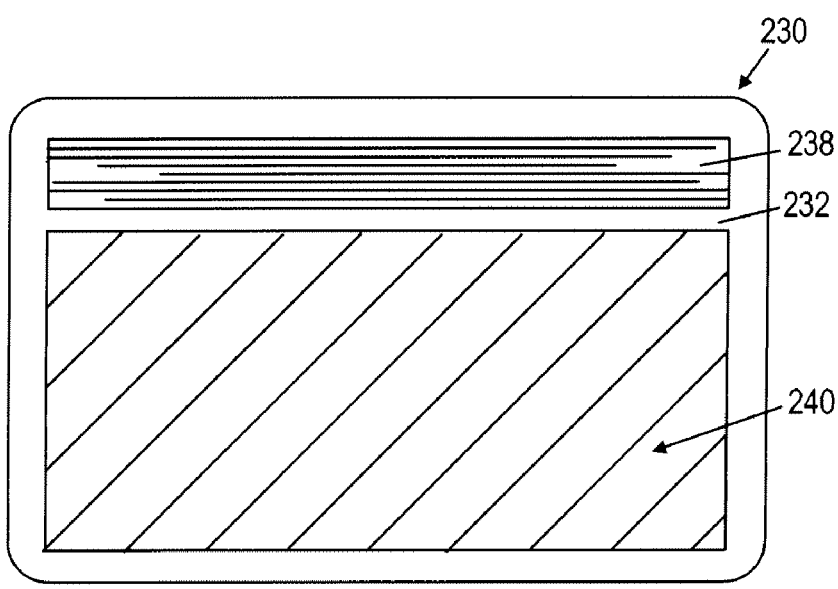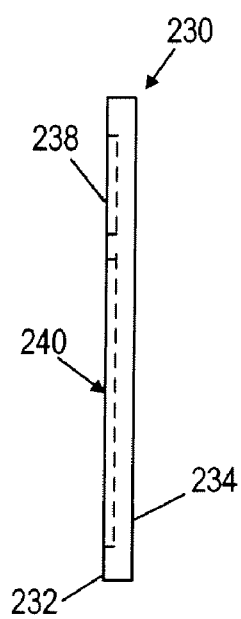
Fig. 24      Fig. 25

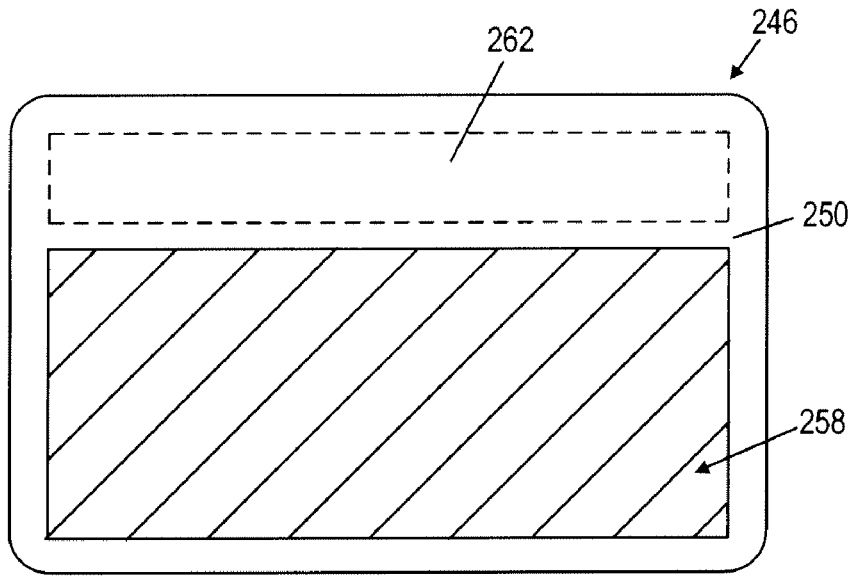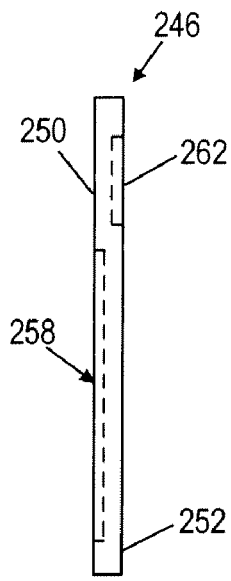
Fig. 26  Fig. 27
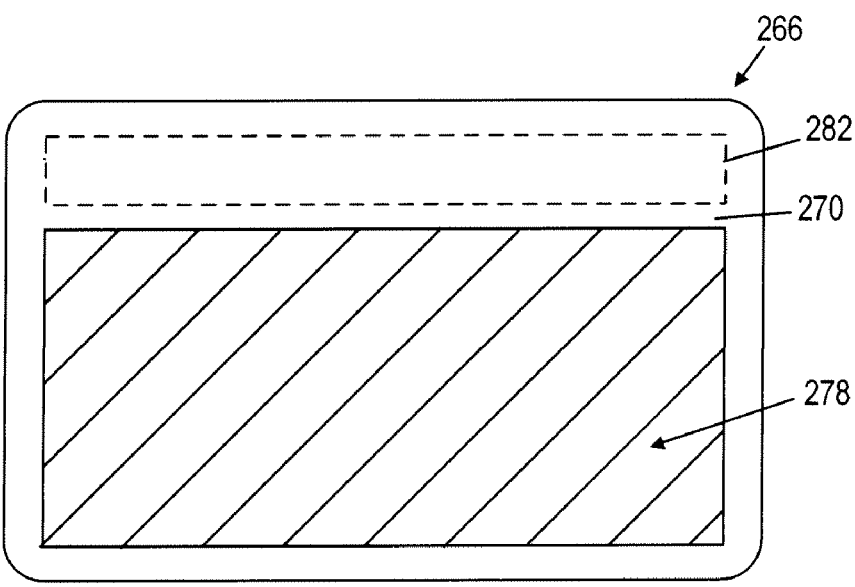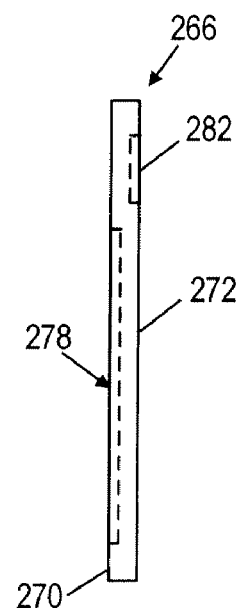
Fig. 28  Fig. 29

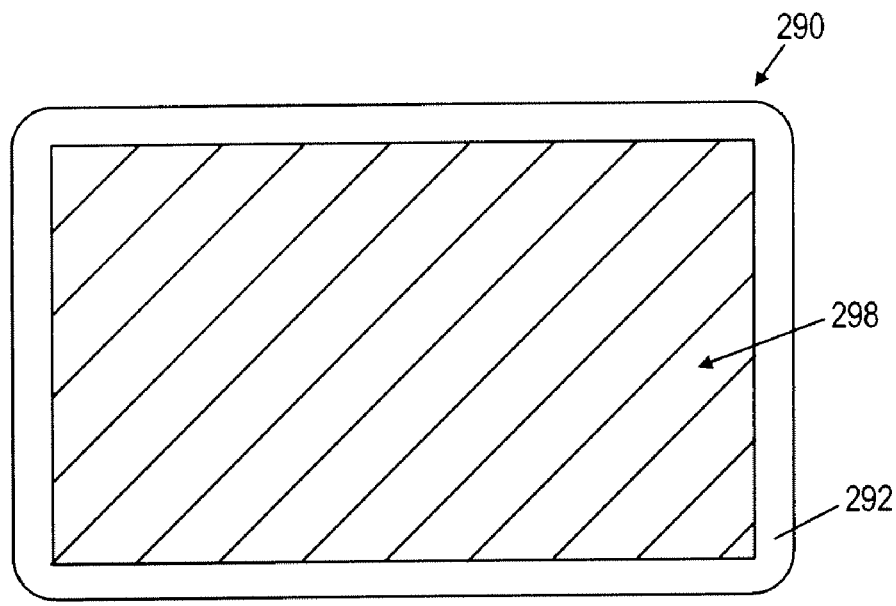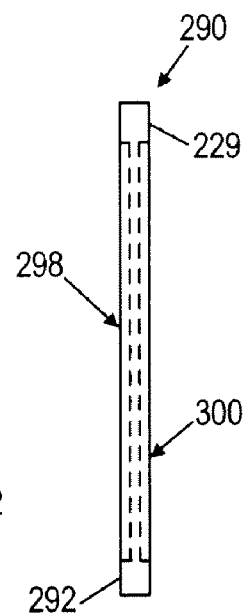
Fig. 30  Fig. 31
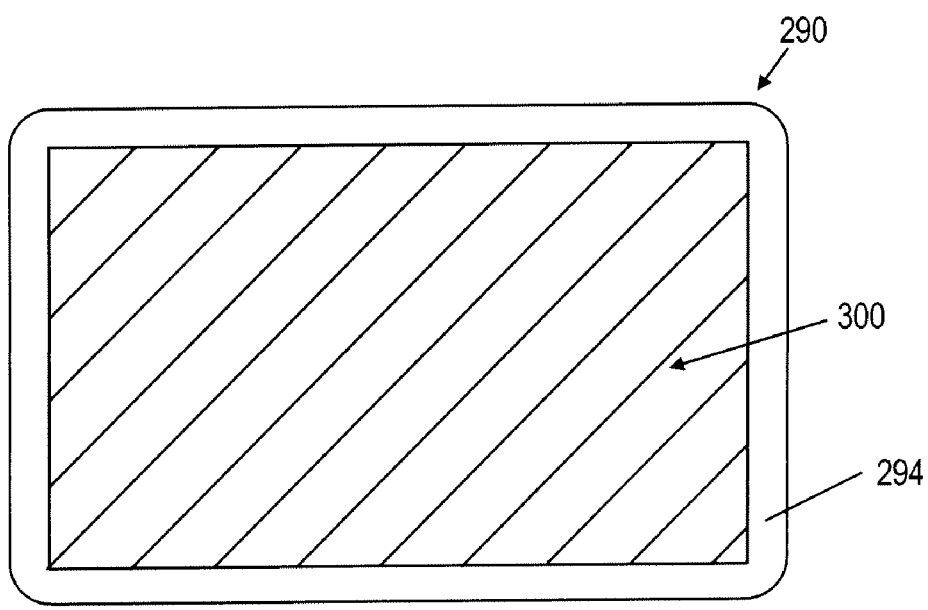
Fig. 32

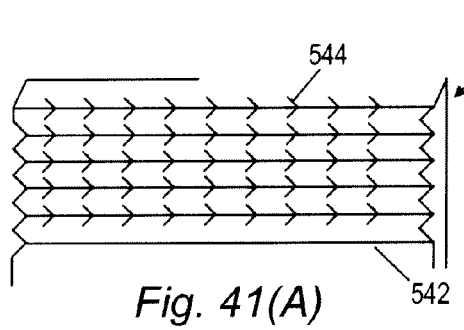
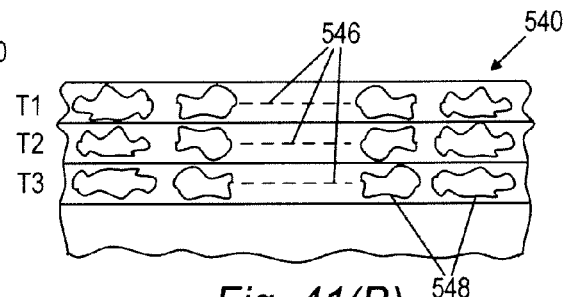
Fig. 41(A)　　　　　　　　Fig. 41(B)
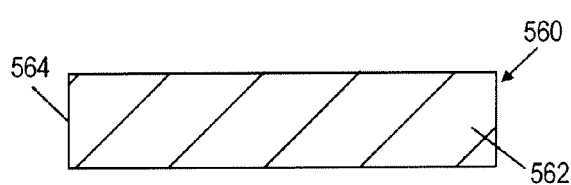
Fig. 42(A)　　　　　　　　Fig. 42(B)
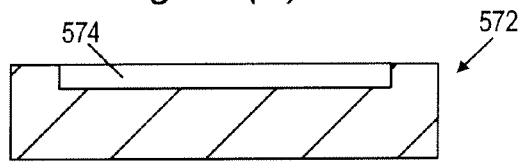
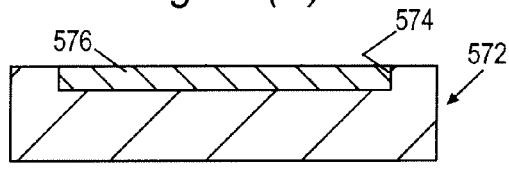
Fig. 43(A)　　　　　　　　Fig. 43(B)
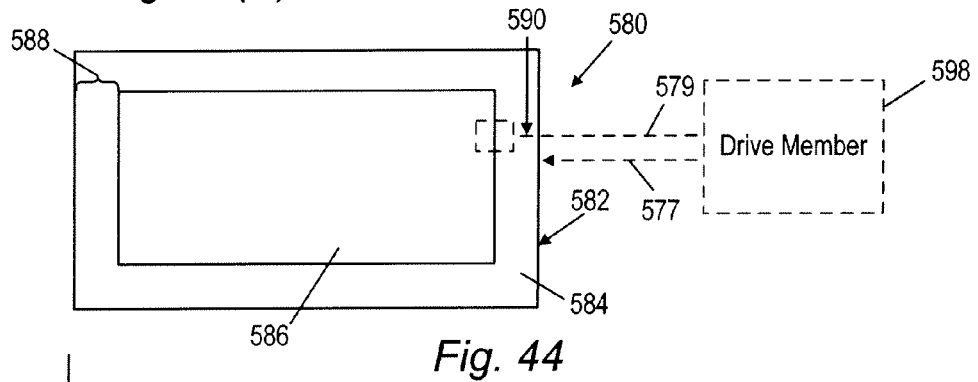
Fig. 44
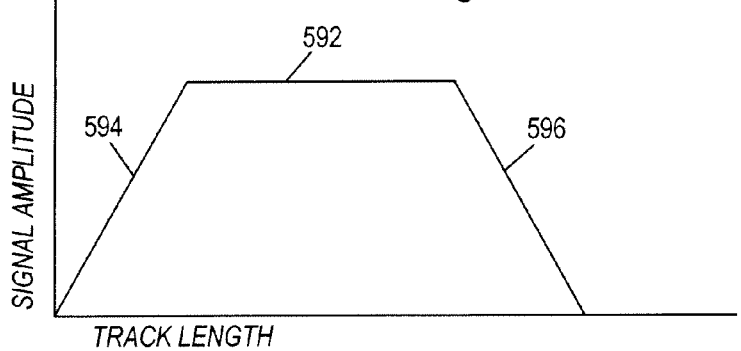
Fig. 45

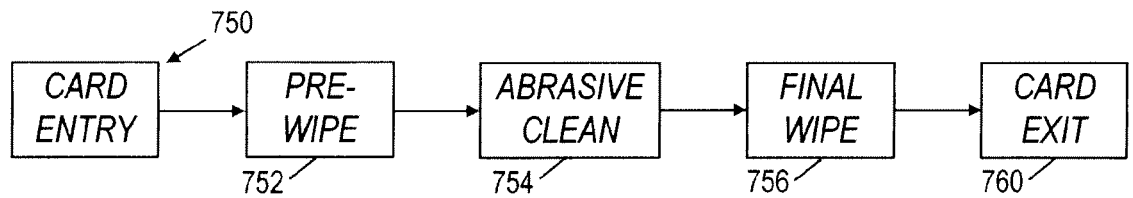
Fig. 49
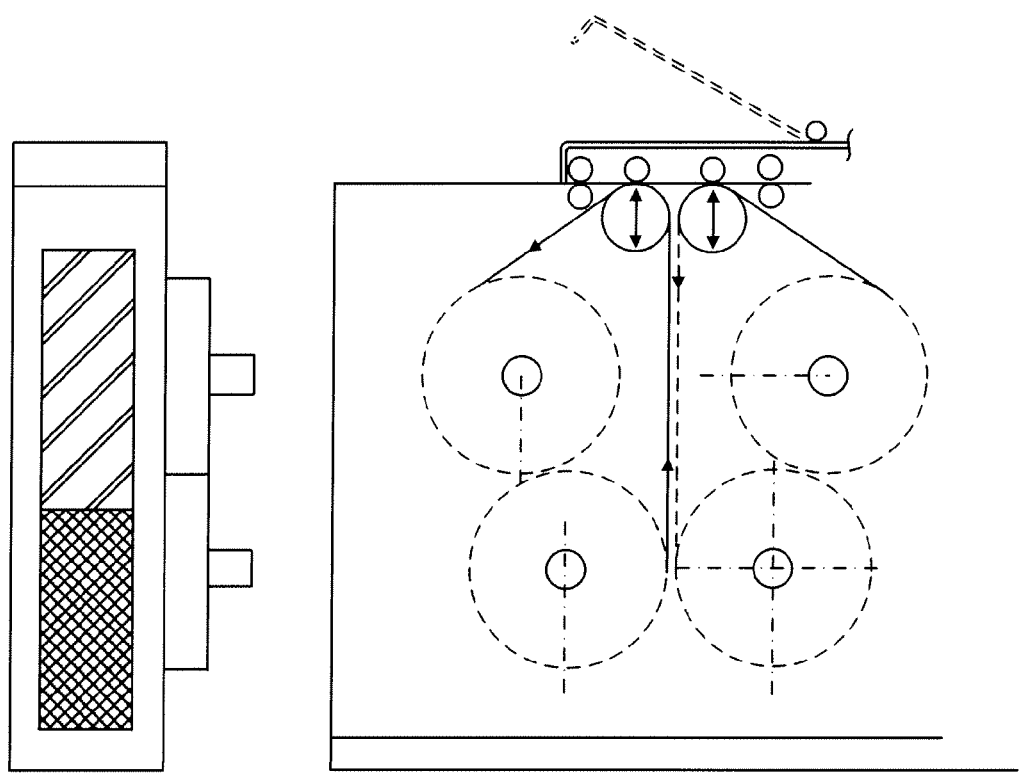
Fig. 51                    Fig. 50
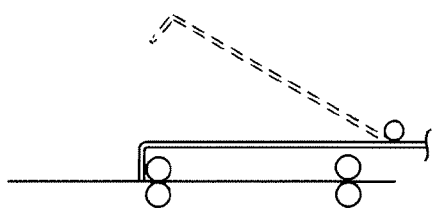
Fig. 52

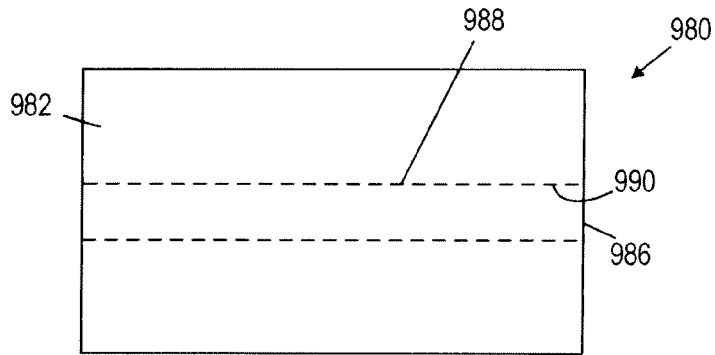
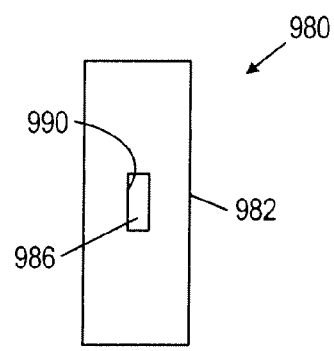
Fig. 60(A)    Fig. 60(B)
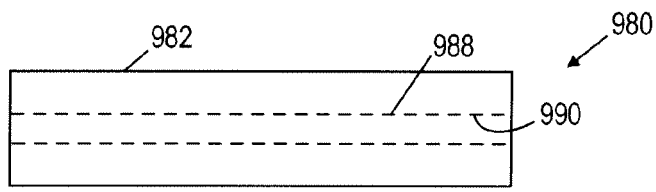
Fig. 60(C)
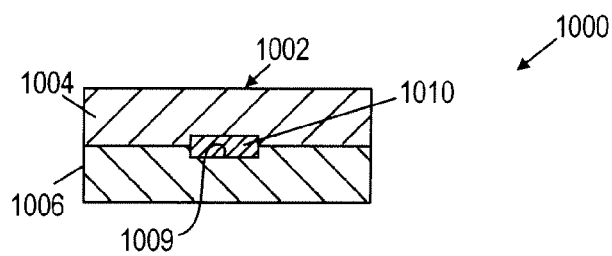
Fig. 61
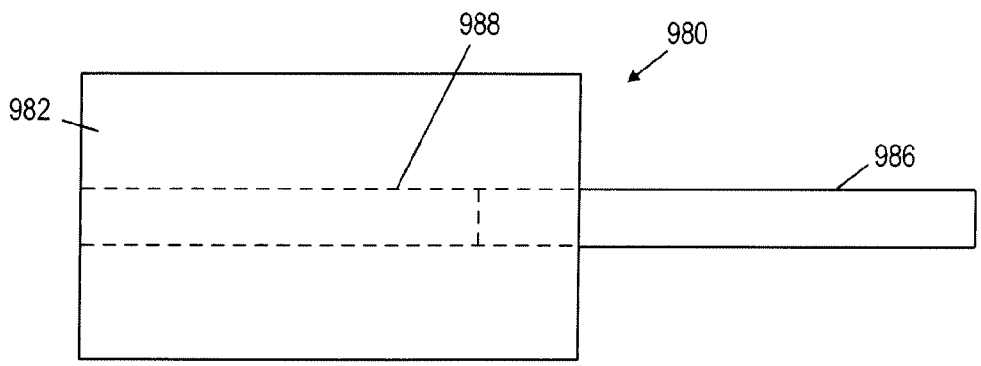
Fig. 62

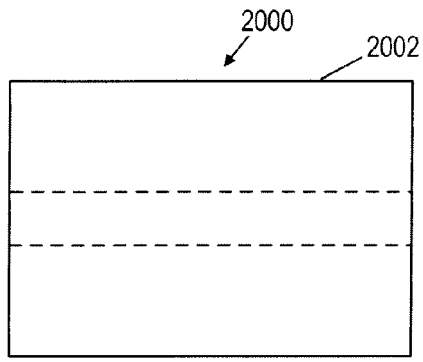
Fig. 65(A)
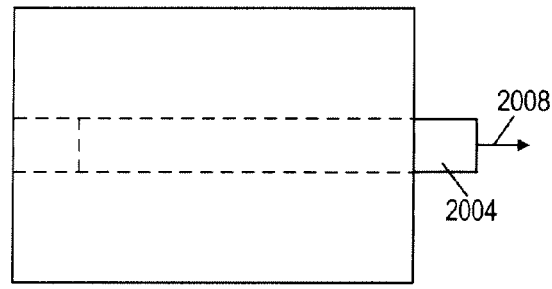
Fig. 65(B)
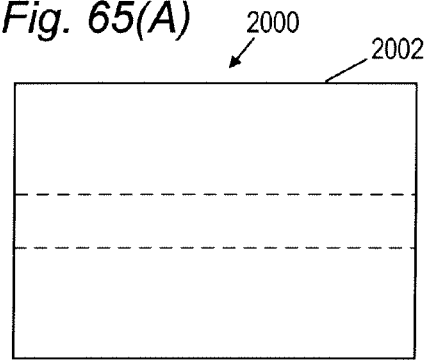
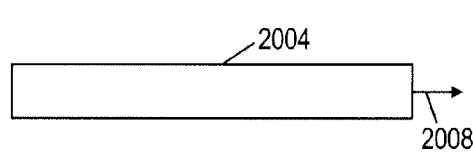
Fig. 65(C)
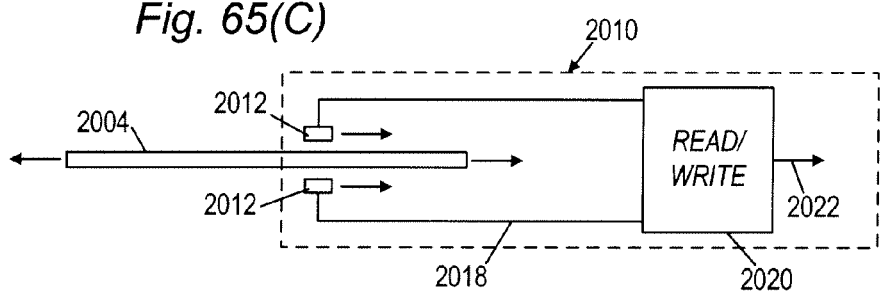
Fig. 65(D)
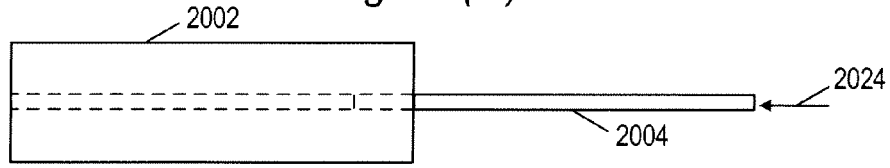
Fig. 65(E)
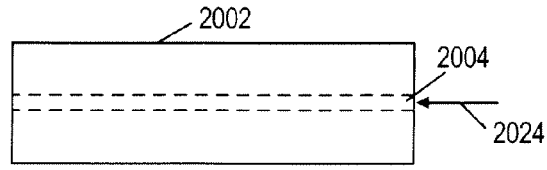
Fig. 65(F)

ARTICLE HAVING AN EMBEDDED ACCESSIBLE STORAGE MEMBER, APPARATUS AND METHOD FOR USING SAME

RELATED APPLICATIONS

This application is a Divisional of U.S. patent application Ser. No. 09/502,812 filed Feb. 9, 2000 which is a Continuation-in-Part application of U.S. patent application Ser. No. 09/426,793 filed Oct. 23, 1999. This application also claims the benefit, under Title 35, United States Code §119(e), of U.S. Provisional Patent Application Ser. No. 60/161,302 filed Oct. 23, 1999.

A portable card having a substrate having a predetermined shape enclosing an accessible embedded storage member is shown. The accessible embedded storage member includes at least one layer of storage material for storing information and is enclosed by the substrate. The storage member and the substrate are adapted to be transported relative to each other to expose at least a portion of the storage member to facilitate processing of stored information and for embedment of the storage member within the substrate. The portable card is adapted to be used in a card processing system having a data processing station, in a card writer/reader system and in a method for reading a portable card. A data storage device comprising a substrate enclosing an accessible embedded storage member wherein the storage member has a layer of storage material, which may be a magnetic material, an optical material or magneto-optical material. The storage member and substrate are adapted to be transported relative to each other to expose at least a portion the storage member to facilitate processing of stored information. The storage member may be in the form of an elongated strip member or a circular member.

BACKGROUND OF THE INVENTION

1. Field of the Invention

This invention relates generally to data storage devices and more particularly to a portable storage device or a portable card incorporating a data storage device which is capable of having information recorded into and read from the data storage device. The portable storage device or portable card may be in the form of an encodeable card having a magnetic or optical data storage device adapted to be used as a credit card, medical identification card, identification card or the like.

The data storage device utilizes a recording medium or a data storage medium formed on a substrate capable of reliable data recording and reproduction in an ambient natural atmospheric operating environment. Traditional hard disks require a profoundly protected environment for reliable data recording and reproduction. In the preferred embodiment, the data storage device is in the form of a magnetically encodeable credit card having a data storage capability in the order of about 1 megabyte to about 500 megabytes or more.

This invention also relates to a portable card which includes a substrate, having a predetermined shape, which encloses an accessible embedded storage member having at least one layer of storage material for storing information. The storage member and substrate are adapted to be transported relative to each other to expose at least a portion the storage member to facilitate processing of stored information and for embedment of said storage member within the substrate. The storage member may be in the form of an elongated strip member or a circular member.

2. Description of the Prior Art

The prior art magnetically encodeable card, illustrated as 100 in FIG. 1 through 4, have primary application as financial credit cards. The magnetically encodeable card has an obverse surface or side 102 containing indicia, e.g. typically user and/or bank information and a converse surface or side 104 containing an encoding section shown generally as 106. To insure that magnetically encoded cards can be read by standard card reading devices, the prior art cards are fabricated in accordance with standards promulgated by the American National Standards Institute, Inc. ("American National Standard" or "ANSI"). This is discussed in greater detail hereinbelow.

The encoding section 106 is typically a wide magnetic stripe area 110 shown on FIG. 2 and this format is generally used by the AMERICAN EXPRESS® or AMEX® credit card.

Alternatively, a narrow magnetic stripe, as shown by dashed line 112 shown in FIG. 2 defining a narrow magnetic stripe area 114, is used by Visa® and most other credit cards. Typically, the substrate for both the VISA® credit card and the AMEX® credit card is formed of polyvinyl chloride ("PVC") and/or polyvinyl chloride acetate ("PVCA"). VISA®, AMERICAN EXPRESS® and other financial institutions make wide use of magnetically encoded cards for financial transactions.

Another known card used for credit or banking transaction is a Smart Card 120 illustrated in FIGS. 5 through 7. The typical Smart Card 120 has an integrated circuit shown as 122 located on the obverse side 126 thereof. The integrated circuit 122 may include a dedicated storage member. The converse side 128 of the Smart Card 120 may be blank or alternatively may include a magnetic stripe area similar to magnetic stripe areas 110 and 114 as illustrated in FIG. 2.

BACKGROUND

The term "data card" is used in the art to define both financial cards and cards that contain non-financial data. The terms "financial card" or "financial credit cards" generally include credit cards, debit cards, A.T.M. cards and other cards that contain financial data. Examples of financial cards include general purpose financial credit cards e.g. VISA®, AMERICAN EXPRESS®, MASTERCARD®, and specific or special purpose credit cards such as oil company cards, department store cards, car rental cards, hotel cards, airline cards and the like.

U.S. Pat. Nos. 5,396,545 and 4,791,283 disclose typical state-of-the-art financial cards or transaction cards having a single magnetic stripe. The storage densities of single stripe magnetic cards are defined by the ANSI Standard Specifications. Prior art magnetically encoded cards may have up to three (3) data tracks as described in Table 1 below:

TABLE 1

| Track | Density | Targeted Application |
|---|---|---|
| 1 | 553 bytes | Designed for Airline Use |
| 2 | 200 bytes | Designed for Credit Card Use |
| 3 | 535 bytes | Not for General use. reserved for Special Applications, Has Read/Write Capability |

Total Storage 1,306 bytes

A general trend presently exists to develop special purpose data cards for non-financial data applications such as for driver's licenses, building security, insurance identification, medical insurance identification, personal identification, inventory identification, baggage tags and the like.

Since the use of data cards including financial cards and other cards used for non-financial data purposes has proliferated significantly over the past several years, such data cards are being fabricated to be machine readable by a wide variety of reading devices and apparatus. As discussed above, typically a financial card has a single magnetic stripe having three (3) data tracks. Certain of the reading devices are used for "read-only" applications while other of the reading devices are used for "read and/or write" applications using one or more of the three (3) data tracks.

Other known prior art magnetically encodeable cards have at least two magnetic stripes, each of which may have one or more data tracks, for recording and writing data.

United States patents disclosing cards having one or more magnetic strips and/or semiconductor memory include U.S. Pat. Nos. 5,883,377; 5,844,230; 5,59,885 and 5,714,747. Certain of these cards using a semi-conductor memory have storage densities as high as 8 kilobytes.

In order to facilitate reliable reading by such reading devices, financial cards are fabricated in accordance with standards promulgated by ANSI. For example, the American National Standard for Identification Cards—Physical Characteristics is covered by the ANSI/ISO/IEC 7810-1995 Standard (the "ANSI/ISO/IEC 7810-1995 Standard"). The ANSI/ISO/IEC 7810-1995 Standard specifies the physical characteristics of identifications including card materials, construction, characteristics and dimensions for various sizes of financial cards.

In addition, financial credit cards must comply with the American National Standard for Identification Cards—Recording Technique—Part 4: Location of Read-Only Magnetic Tracks—Tracks 1 and 2 which is covered by the ANSI/ISO/IEC 7811-4-1995 Standard (the "ANSI/ISO/IEC 7811-4-1995 Standard"). The ANSI/ISO/IEC 7811-4-1995 Standard specifies the location of a magnetic stripe area which defines a magnetic track for read-only magnetic recording, tracks 1 and 2 on identification cards. The ANSI/ISO/IEC 7811-4-1995 Standard specifically identifies the location of encoded data tracks, and the beginning and end of encoding.

Further, and depending on the application or use, financial credit cards must comply with the American National Standard for Identification Cards—Recording Technique—Part 5: Location of Read-Write Magnetic Tracks—Track 3 which is covered by the ANSI/ISO/IEC 7811-5-1995 Standard (the "ANSI/ISO/IEC 7811-5-1995 Standard"). The ANSI/ISO/IEC 7811-5-1995 Standard specifies the location of a magnetic stripe area which defines a magnetic track for read-write magnetic recording, track 3 on identification cards. The ANSI/ISO/IEC 7811-5-1995 Standard likewise specifically identifies the location of encoded data tracks, and the beginning and end of encoding.

Financial credit cards include a magnetic stripe area which complies with all of the ANSI Standards. Adherence to the ANSI Standards ensures that financial credit cards can accurately pass magnetic signals between the card reader transducer and the magnetic stripe area.

In the prior art known credit cards having a magnetic stripe area, the obverse side of the card generally contains indicia used to identify the individual to whom the credit card is issued, the issuing bank and other appropriate information. Information is stored on the magnetic stripe area in a "Biphase" mark coding technique in "magnetic domains" defined by a leading and an associated trailing magnetic flux reversal. The spacing between the magnetic domains defines the areal density of the magnetic storage material. Thus, the information bits (data) on a magnetic stripe area is represented by a sequence of binary ones and zeros as defined above.

The standard densities for financial or credit cards having magnetic stripe areas having three (3) data tracks which are in compliance with the ANSI Standards as described above are in the order of: (i) 210 bytes per inch (BPI) for track 1; (ii) in the order of 75 BPI for track 2 and (iii) in the order of 210 BPI for track 3. The transducers used in card reader are responsive to one or more tracks; e.g., any one or more of track 1, track 2 or track 3.

As the demand for financial or credit cards or data cards for non-financial uses increase, in certain applications it is desirable that the data card include the ability to record information from on-line card reading and data processing systems with enhanced security as well. As a result thereof, a category of data cards generally known as "Smart Cards", otherwise generally known as "IC Cards", have developed.

The Smart Card is often defined as an International Standards Organization ("ISO") standard card with an embedded integrated circuit chip. The IC Card may include a microprocessor and a dedicated storage chip thereby resulting in such an IC Card being identified or referred to as a Smart Card. A Smart Card generally is in the form of a standard financial or credit card, but includes a microprocessing chip, memory and may even include a magnetic stripe area which can be read by a standard card reader for financial or credit cards.

One advantage of a Smart Card is that the data stored therein is usually more secure than data stored on a magnetic stripe, and such data cannot be easily read from the Smart Card due to incorporation of encryption technology. Further, the Smart Card has the ability to store a larger quantity of data compared to a magnetic stripe and can be used in a variety of applications in cooperation with a card reading apparatus and data processing system. U.S. Pat. No. 5,901,303 discloses an example of a Smart Card.

Other known storage devices used in non-card applications, such as for example, data storage mediums in hard disk, have storage densities greater than the storage densities of the known credit cards having one or more magnetic stripes including three (3) data tracks. A data storage medium in a hard disc drive typically has an 130 mm, 95 mm, 65 mm or 25 mm outer diameter with a hole in the middle for mounting the medium on a spindle motor. Hard disk drive medium is designed and manufactured for use as a rotating memory device with circumferential discrete data tracks. The medium, or disks, typically spin at a high rate of speed with the data tracks accessed by one or more a radially movable read/write heads.

It is known in the art to use horizontal recording media for recording magnetic signals. For horizontal recording, the easy axis of magnetization is parallel to the surface of the magnetic layer.

It is also known in the art to use vertical recording media for recording magnetic signals. An example of a vertical magnetic recording medium is disclosed in U.S. Pat. No. 4,687,712.

Through a plating and/or a sputter process, various types and layers of magnetic or non-magnetic materials are deposited on a round substrate which, when used in conjunction with a data recording head, can read and write data to the disk. The layer which provides the data memory is formed of a high coercive force magnetic material. This high coercive force magnetic layer is designed for maximum signal-to-noise ratio. This is attained by circumferential texturing, which is a mechanical process of scratching or buffering the disk substrate surface to provide circumferential anisotropy of the magnetic domains. Thereafter, the magnetic material is deposited on the circumferentially treated surface using known plating and/or sputtering technology.

Past and present data storage media have been manufactured in an ultra clean environment requiring Class 100, or better, clean rooms. Workers are required to be garmented wearing gloves, masks, hoods, smocks, and booties. Hard disk drive media is tested for electrical performance and number of errors (defects) before leaving the clean room. The media is placed in a sealed container in the clean room for shipment to the drive manufacturer.

The disk drive manufacturer must exercise similar clean room conditions in order to avoid damaging or contaminating the medium. Contamination or damage to the medium will cause an unacceptable error rate for the disk drive. To further insure data integrity, the drive manufacturer mounts the heads and medium, commonly called a head/disk assembly, inside a sealed disk drive cavity. As the medium rotates, it generates airflow over the head/disk assembly. Particles or contamination inside the drive are captured by filters located within the air flow. Capillary tubes and/or breather filters located in the lid of disk drive are used to equalize pressure and prevent moisture from entering the head/disk assembly.

The magnetic head(s) that perform the read/write operations can indent, mark or damage the medium through shock, vibration or improper head/medium design. The medium layers are very thin and fragile, on the order of a few microinches thick, and can be easily destroyed by mechanical damage imposed by the head. Non-operating environmental conditions, such as those normally found outside a clean room or outside a disk drive, can also easily render the medium unusable. Some of these major concerns which adversely affect medium quality and usability are:

Moisture, which can cause the Cobalt in the high coercive force magnetic layer to corrode which causes the medium surface to flake off or pit and compromise medium performance;

Chemical contamination from out gassing of internal head/disk assembly components such as uncured epoxy and plasticizers from gaskets, and such chemical contamination can cause the head to stick to the media surface resulting in stopping the drive from spinning or causing a head/disk crash resulting in substantial loss of data;

Particles inside the drive which can cause a head crash that can damage the medium beyond use;

Handling damage by the disk or drive manufacturer including finger prints, scratches, and indentations which can cause nonreversible loss of data;

Shock and vibration from improper drive design or use can cause a head crash that damages the medium beyond use; and Poorly designed drives can fail during drive power up cycles due to high stiction, friction, temperature/humidity conditions or improper lubricant conditions.

A hard disk drive medium has no direct means to prevent demagnetization by stray magnetic fields should the drive medium be exposed to a stray field having sufficient magnetic field strength to erase the recorded data. Further, no surface of hard disk drive medium readily permits cleaning, and there are no known commercial hard disk drives that provide a means to clean the medium. For example, fingerprints cannot easily be removed from the surface of a hard disk drive medium.

Further, any attempts to use a hard disk drive magnetic medium outside of its intended clean and protected environment has been unsuccessful for a number of reasons, such as those discussed above.

As the demand for improved portable cards having increased memory storage capacity, such as credit cards, non-financial cards, transaction cards and the like increases, the driving factor as to the likely success or failure of an improved card is directly related to: (a) the storage densities available in such a card for storing and retrieving data; (b) the integrity of the magnetically encoded data in such a card; and (c) its ability to resist mechanical, chemical and magnetic degradation in an unprotected environment; such as in an ambient natural atmosphere operating environment in which financial and non-financial cards are used.

The magnetic disk media in known rigid disk drives are not designed to withstand even the most minor surface damage or degradation. The magnetic disk media for use inside the profoundly clean disk drive has a very hard but thin overcoat or protective layer. That overcoat or protective layer is typically diamond-like carbon on the order of 50 Angstroms to 300 Angstroms thick and is primarily used to control corrosion of the underlying cobalt based high coercivity layer. The underlying magnetic high coercivity film is also very thin, in the order of 150 to 500 Angstroms.

Since the protective layer includes at least one layer of a highly magnetic permeable material, the added thickness of this highly magnetic permeable material does not appear to increase the magnetic separation loss during read back as reported in U.S. Pat. No. 5,041,922.

The most prevalent type of media construction for use in hard disk drives is an aluminum substrate with a thick layer of Nickel Phosphor plated on the surface for polishing. This is an underlayer to the high coercivity magnetics. The Nickel Phosphor layer is typically 10 to 12 microns thick and is used to provide a material that can be subsequently polished to a smoother finish than the aluminum surface.

Hard disk drive media substrate range in thickness from 0.020 inches to 0.050 inches. Thinner substrates are desirable in order to be able to package more disks in the disk drive but have the problem of mechanical flutter, especially at high RPM. None of these substrates are bendable. A large bend radius of 20 inches will result in permanent deformation of the disk. A bend radius of less than 20 inches will result in permanent deformation as well as fracturing of the thick Nickel Phosphor layer. This fracturing of the Nickel Phosphor will propagate through the high coercivity magnetic layer rendering the media useless as a storage device.

No thick Nickel Phosphor underlayer is used on the portable card of the present invention. Therefore, fracturing problems associated with a thick Nickel Phosphor are avoided.

The portable card structure allows a card to be bendable to a degree depending upon the thickness and material of the substrate. For example, on one extreme are thick cards having a substrate formed of Zirconium. Such cards are 0.020 inches thick and can be bendable to a radius of approximately 10 inches. Another type of card uses a plastic substrate. Such cards are 0.030 inches thick and are bendable to a radius of approximately 4 inches. A thin card, such as a card having a substrate, formed of stainless steel, which is in the order of 0.005 inches thick and are bendable to a radius in excess of 4 inches without fracturing or becoming permanently deformed.

The protective coating of the present invention can be used with such cards in all forms of data storage devices, data storage sections, data storage medium and recording mediums. The known prior art media used for disk drive including the unabradable, thin protective coatings are not capable of being used in such portable cards.

SUMMARY OF THE INVENTION

The present invention discloses and teaches a new, novel and unique magnetically encodeable card comprising a non-magnetic substrate having at least one surface. A thin film, high density magnetically coercive material is disposed on the substrate for storing magnetic signals. In the preferred embodiment, the coercive material axis of magnetization are oriented in a predetermined direction relative to the at least one surface of the substrate. Preferably, a non-magnetic material is disposed on the substrate for defining an exchange break layer.

A protective coating including a magnetically permeable, magnetically saturable storage material disposed on the substrate and is responsive through the exchange break layer to the coercive material axis of magnetization to produce a magnetic image field in a direction opposite to the predetermined direction. The protective coating is formed on the magnetic material layer and is a relatively hard, abradeable protective coating. The protective coating is selected to have a thickness between a maximum thickness which would materially attenuate magnetic signals passing between the magnetic material layer and a transducer and a minimum thickness enabling the protective coating to be abraded by usage in an natural, ambient atmosphere operating environment for removing therefrom a known quantity of the protective coating.

The protective coating is formed of a material which resists at least one of chemical, magnetic and controlled mechanical degradation of the data storage device. The protective coating may be formed of at least one layer, wherein the least one layer includes the magnetically permeable, magnetically saturable storage material.

In the alternative, the protective coating may have at least two layers wherein one of the at least two layers includes or comprises a magnetically permeable, magnetically saturable storage material and the other of the at least two layers includes a non-magnetic abrasion resisting layer formed on the one of the two layers.

In its broadest aspect, the invention resides in a data storage device comprising a substrate having at least one surface with at least one high density magnetically coercive material disposed on the substrate for storing magnetic signals. The magnetic material may be isotropic or anisotropic. Such materials are well known in the art. At least one layer formed of non-magnetic material, which functions as a decoupler or quantum effect insulator, may be disposed on the substrate for defining an exchange break layer. A protective coating is formed on the substrate and is selected to have a depth in a direction substantially normal to the exchange break layer to facilitate passage of magnetic signals, in an ambient natural atmospheric operating environment, through the protective layer to the coercive material having the axis of magnetization in the predetermined direction.

In addition, new and novel magnetic signal processing apparatus and methods are disclosed herein utilizing the novel the magnetic recording medium having a high density magnetically coercive material for storing magnetic signals with the coercive material axes of magnetization oriented in a predetermined direction and having a protective coating selected to have a thickness to facilitate passage of magnetic signals in an ambient natural atmospheric operating environment through the protective coating to the high density magnetic material and which resists at least one of chemical, magnetic and controllable mechanical degradation of the data storage device.

The prior art which utilizes magnetic strips in a portable cards including portable data storage card having relatively low storage limitations. These relatively low density storage limitations of the prior art magnetic stripes is overcome by use of a data storage device having the new, novel and unique recording medium based use of standard hard disk drive medium technology with a high coercive force layer, but wherein such use of this technology is in a new and novel manner, namely outside the disk drive protective enclosure and protected operating environment.

None of the known prior art anticipates, discloses, teaches or suggests portable cards including portable data storage cards using a recording medium based standard hard disk drive medium technology with a high coercive force layer using a novel protective layer having a selected thickness and wherein such use occurs outside the disk drive protective enclosure and in natural atmosphere and environment. This invention is clearly new, novel and unobvious to persons skilled-in-the-art for all of the reasons set forth herein.

Therefore, one advantage of the data storage device is that the data storage device is capable of reliable read and write operations after handling in a non-clean, normal environment.

Another advantage of the present invention is that several media form factors can be provided for use in such a portable card including a magnetically encodeable card of a standard credit card size which is capable of multiple read and write operations.

Another advantage of the present invention is that other portable card sizes and configurations, such as rectangular, square or circular shaped, may utilitize the teachings of the present invention.

Another advantage of the present invention is that a portable card using such a data storage device can be provided with a memory capacity substantially greater than that of the conventional financial cards using a magnetic stripe.

Another advantage of the present invention is that a data storage device can be provided which can be processed in a manner similar to a standard financial credit card.

Another advantage of the present invention is that a data storage device can be provided which can be exposed to rough handling in a manner similar to a credit card.

Another advantage of the present invention is that a portable card utilizing the teachings of the present invention can be stored in a wallet and can be freely handled without concerns for contamination and without regard to whether or not the card is impervious to scratches stray magnetic fields, fingerprints and other types of damage which would cause a prior art hard disk medium to fail.

Another advantage of the present invention is that the data storage device including its use as a portable card or magnetically encodeable card may include a high permeability protection coating in combination with a protective coating to prevent stray weak to medium strength (e.g. all but the strongest) magnetic fields from demagnetizing and/or erasing the recorded data.

Another advantage of the present invention is that a data storage device is provided that is capable of reading and writing in a longitudinal, linear, arcuate, radial or circumferential pattern.

Another advantage of the present invention is that the data storage device utilizes a recording medium having a protective coating formed on the uppermost surface thereby permitting cleaning of a magnetically encodeable credit card by pressure pads, abrasive materials and chemicals without damage to the recording medium including the magnetic signals stored therein.

Another advantage of the present invention is that the data storage device can be utilized in a magnetic signal processing apparatus.

Another advantage of the present invention is that the data storage device may be used in a method of processing magnetic signals using a magnetic recording medium having a high density magnetically coercive material for storing magnetic signals with the coercive material axes of magnetization oriented in a predetermined direction and a protective coating as described herein.

Another advantage of the present invention is that a magnetic recording medium having a high density magnetically coercive material for storing magnetic signals with the coercive material axes of magnetization oriented in a predetermined direction utilizing the teachings of the present invention, including a protective coating as disclosed herein, may be used in a system having a magnetic transducer, a drive member and a magnetic control device having a bias field that interacts with a magnetically permeable, magnetically saturable storage material layer, generally known in the art as a "keeper" layer, which is used as the protective coating to enable magnetic signals to pass between the high density magnetically coercive material, through the protective coating and the exchange break layer and a transducer typically located in a data processing station.

BRIEF DESCRIPTION OF THE DRAWINGS

The foregoing and other advantages of this invention will be apparent from the following description of the preferred embodiment of the invention when considered with the illustrations and accompanying drawings, which include the following Figures:

FIG. 8 is a pictorial representation of a portable card utilizing the teachings of the present invention in the form of a magnetically encodeable credit card fabricated from polyvinyl chloride or polyvinyl chloride acetate and having on the converse side thereof two spaced parallel magnetic stripe areas, each magnetic stripe area including the capability of having a plurality of magnetic tracks for providing at least five megabytes formatted of magnetic storage or, alternatively, for being used as a standard magnetic stripe area on a financial credit card;

FIG. 9 is a right end elevational view of the credit card of FIG. 8 showing by dashed lines the magnetic stripe areas;

FIG. 10 is a left end elevational view of the credit card of FIG. 8 showing by dashed lines the magnetic stripe areas;

FIG. 11 is a sectional view taken along section lines 11-li of the credit card of FIG. 8 showing by dashed lines the magnetic stripe areas;

FIG. 12 is a pictorial representation of the obverse side of the credit card having indicia which may provide bank/user information shown thereon and which may include an integrated circuit as shown by dashed rectangle and the converse side thereof may have a single magnetic stripe area of the form depicted in FIG. 8;

FIG. 13 is a partial right end elevational and sectional view of the credit card of FIG. 12 showing by dashed lines the magnetic stripe area using the teachings of this invention and integrated circuit;

FIG. 14 is a pictorial representation of another embodiment of a portable card utilizing the teachings of the present invention in the form of a magnetically encodeable credit card fabricated from polyvinyl chloride or polyvinyl chloride acetate and having on the converse side thereof a magnetic stripe area having a plurality of magnetic tracks for providing at least five megabytes of formatted of magnetic storage;

FIG. 15 is a right end elevational view of the credit card of FIG. 14 showing by cross-hatching lines the magnetic stripe area;

FIG. 16 is a pictorial representation of yet another portable card utilizing the teachings of the present invention in the form of a magnetically encodeable credit card fabricated to have on the obverse side thereof a data storage device which covers substantially all of the obverse side area and wherein the data storage device has a plurality of magnetic tracks for providing at least five megabytes formatted of magnetic storage and wherein the converse side thereof contains a standard magnetic stripe area as used on an AMEX® credit card shown by dashed lines;

FIG. 17 is a right end elevational view of the portable card of FIG. 16 showing by dashed lines the data storage device located on substantially all of the obverse side and the AMEX® standard magnetic stripe area located on the converse side;

FIG. 18 is a pictorial representation of the portable card of FIG. 16 wherein the converse side thereof contains the AMEX® standard magnetic stripe area and having on the obverse side thereof a data storage device which covers substantially all of the obverse side area;

FIG. 19 is a pictorial representation of yet another portable card utilizing the teachings of the present invention in the form of a magnetically encodeable credit card fabricated to have on the obverse side thereof a data storage device which covers substantially all of the obverse side area and wherein the data storage device has a plurality of magnetic tracks for providing at least five megabytes formatted of magnetic storage and wherein the converse side thereof contains a standard magnetic stripe area as used on a VISA® credit card shown by dashed lines;

FIG. 20 is a right end elevational view of the portable card of FIG. 19 showing by dashed lines the data storage device located on substantially all of the obverse aide and the VISA® standard magnetic stripe area located on the converse side;

FIG. 21 is a pictorial representation of the portable card of FIG. 18 wherein the converse side thereof contains the VISA® standard magnetic stripe area and having on the obverse side thereof a data storage device which covers substantially all of the obverse side area;

FIG. 22 is a pictorial representation of still yet another embodiment of a portable card utilizing the teachings of the present invention in the form of a magnetically encodeable credit card fabricated to have on the obverse side adjacent the top edge of the credit card a standard magnetic stripe area as used on an AMEX® credit card shown by dashed lines and located below the magnetic stripe area a data storage device which covers in excess of one-half of the obverse side area and wherein the data storage device has a plurality of magnetic tracks for providing at least five megabytes formatted of magnetic storage and wherein the converse side thereof may contain indicia;

FIG. 23 is a right end elevational view of the portable card of FIG. 22 showing by dashed lines the AMEX® standard magnetic stripe area and the data storage device, both of which are located on the obverse side and the credit card;

FIG. 24 is a pictorial representation of still yet another embodiment of a portable card utilizing the teachings of the present invention in the form of a magnetically encodeable credit card fabricated to have on the obverse side adjacent the top edge of the credit card a standard magnetic stripe area as used on an VISA® credit card shown by dashed lines and located below the magnetic stripe area a data storage device which covers in excess of one-half of the obverse side area and wherein the data storage device has a plurality of magnetic tracks for providing at least five megabytes formatted of magnetic storage and wherein the converse side thereof may contain indicia;

FIG. 25 is a right end elevational view of the portable card of FIG. 24 showing by dashed lines the VISA® standard magnetic stripe area and the data storage device, both of which are located on the obverse side and the credit card;

FIG. 26 is a pictorial representation of still yet another embodiment of a portable card utilizing the teachings of the present invention in the form of a magnetically encodeable credit card fabricated to have on the obverse side a data storage device which covers in excess of one-half of the obverse aide area and wherein the data storage device has a plurality of magnetic tracks for providing at least five megabytes formatted of magnetic storage and wherein the converse side thereof has, adjacent the top edge of the credit card, a standard magnetic stripe area as used on an AMEX® credit card shown by dashed lines and wherein optionally either the observe side or the converse side may contain indicia;

FIG. 27 is a right end elevational view of the portable card of FIG. 25 showing by dashed lines the data storage device located on the obverse side of the credit card and the AMEX® standard magnetic stripe area located on the converse side of the credit card;

FIG. 28 is a pictorial representation of still yet another embodiment of a portable card utilizing the teachings of the present invention in the form of a magnetically encodeable credit card fabricated to have on the obverse side a data storage device which covers in excess of one-half of the obverse side area and wherein the data storage device has a plurality of magnetic tracks for providing at least five megabytes formatted of magnetic storage and wherein the converse side thereof has, adjacent the top edge of the credit card, a standard magnetic stripe area as used on a VISA® credit card shown by dashed lines and wherein optionally either the observe side or the converse side may contain indicia;

FIG. 29 is a right end elevational view of the portable card of FIG. 25 showing by dashed lines the data storage device located on the obverse side of the credit card and the VISA® standard magnetic stripe area located on the converse side of the credit card;

FIG. 30 is a pictorial representation of still yet another embodiment of a portable card utilizing the teachings of the present invention in the form of a magnetically encodeable credit card wherein the obverse side thereof is shown and wherein both the obverse side and converse side thereof each include a data storage device which covers substantially all of the area of the applicable side and wherein each data storage device has a plurality of magnetic tracks for providing at least five megabytes formatted of magnetic storage;

FIG. 31 is a right end elevational view of the portable card of FIG. 30 showing by dashed lines the data storage devices located on both the obverse side and converse side;

FIG. 32 is a pictorial representation of the portable card of FIG. 30 wherein the converse side thereof is shown and wherein both the obverse side and converse side thereof each include a data storage device which covers substantially all of the area of the applicable side and wherein each data storage device has a plurality of magnetic tracks for providing at least five megabytes formatted of magnetic storage;

FIG. 41(A) is the pictorial representation of a recording medium of the present invention illustrating that the surface thereof is textured during the fabrication process of the recording medium to provide lineal antisotrophy of the magnetic domains;

FIG. 41(B) is a pictorial representation of the recording medium of FIG. 41(A) having a plurality of magnetic tracks and illustrating that specific domain areas used for recording magnetic signals therein;

FIG. 42(A) is a pictorial representation of an encodeable credit card wherein the entire substrate or body is fabricated of a magnetic recording material and having a protective coating therearound forming a data storage device;

FIG. 42(B) is a pictorial representation of an encodeable credit card wherein the interior of the substrate or body thereof is formed of a high density recording material having a protective coating formed thereon for forming a data storage device;

FIG. 43(A) is a pictorial representation of a credit card having a groove formed therein which is adapted to have a data storage device comprising a recording medium having a protective coating formed therein;

FIG. 43(B) is a pictorial representation of a credit card having a groove formed therein which encloses a data storage device wherein the data storage device may comprise a recording medium illustrated in FIGS. 38, 39, 40(A), 40(B), 40(C) and 40 (D);

FIG. 44 is a pictorial representation of still yet another portable card utilizing the teachings of the present invention in the form of a magnetically encodeable credit card wherein the obverse side thereof may contain indicia providing banker/user information or, alternatively, a standard magnetic stripe area as shown in FIGS. 19, 20, 21, 26, 27, 28 and 29 and the converse side thereof each include a data storage device having a plurality of parallel spaced magnetic tracks for storing at least five megabytes formatted of a magnetic data;

FIG. 45 is a plot depicting the magnitude of magnetic signals transduced by a magnetic transducer being transported linearly over a magnetic track plotted as a function of track length;

FIG. 49 is a simplified schematic diagram of a card cleaner for cleaning debris, fingerprints and the like from a portable card utilizing the teachings of the present invention wherein the cleaning process is preformed prior to processing by a card reader for reading and reproducing information from the portable card;

FIG. 50 is a pictorial representation of a front elevational view of a card cleaner having a card feeder for carrying out the card cleaning process;

FIG. 51 is a pictorial representation of a left side elevational view of a card cleaner illustrated in FIG. 50;

FIG. 52 is a pictorial representation of an alternate structure of a card feeder for use with the card cleaner illustrate in FIG. 50;

FIG. 60(A) is a top plan view of still another embodiment of a portable card having a substrate formed of a predetermined shape and an accessible embedded storage member having at least one layer of storage material for storing information which is enclosed by the substrate;

FIG. 60(B) is a front elevational view of the embodiment of a portable card shown in FIG. 60(A);

FIG. 60(C) is a right end elevational view of the embodiment of a portable card shown in FIG. 60(A);

FIG. 61 is a pictorial representation in cross-section of a portable card having a substrate formed of a first layer and a second layer which defines a hollowed-out central area for enclosing or embedding storage member;

FIG. 62 is a a is a top plan view of the embodiment of a portable card illustrated in FIG. 60(A) wherein the accessible embedded storage member in the from of an single elongated strip member and the substrate have been transported relative to each other to expose at least a portion the storage member to facilitate processing of stored information;

FIG. 63 (B) is a top plan view of the embodiment of the portable card illustrated in FIG. 63(A) wherein the three accessible embedded storage members in the form of elongated strip members and the substrate have been transported through the sides and end of the substrate relative to each other to expose at least a portion the storage member to facilitate processing of stored information;

FIG. 63 (C) is a top plan view of still yet another embodiment of a portable card having a substrate formed of a predetermined shape and three accessible embedded storage members each having at least one layer of storage material for storing information which are enclosed by the substrate;

FIG. 63 (D) is a top plan view of the embodiment of a portable card illustrated in FIG. 63(C) wherein the three accessible embedded storage member in the form of elongated strip members and the substrate have been transported through the sides of the substrate relative to each other to expose at least a portion the storage member to facilitate processing of stored information;

FIG. 64 (B) is a top plan view of the embodiment of a portable card illustrated in FIG. 64(A) wherein the accessible embedded storage member in the form of a circular member and the substrate have been transported through the side of the substrate relative to each other to expose at least a portion the storage member to facilitate processing of stored information;

FIG. 64 (C) is a pictorial representation of the positions of at least two transducers located in a data processing station to process stored information on both sides of the circular accessible storage member having at least one layer of material for storing information located on each side of the storage member;

FIGS. 65 (A) through 65(F) are pictorial representations of various steps of a reader/writer and/or method for reading and storing information on a portable card using the teachings of this invention;

DESCRIPTION OF THE PREFERRED EMBODIMENT

Figure 1:
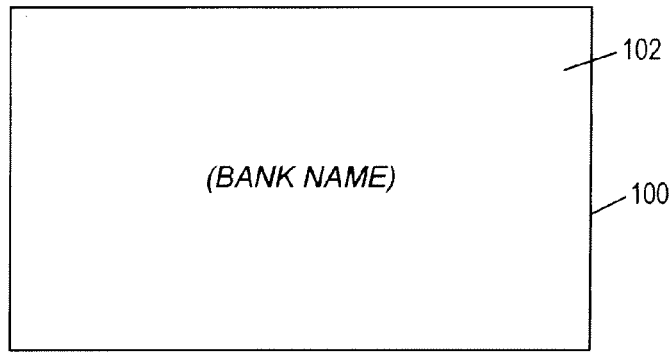
FIG. 1 is a pictorial representation of a prior art AMEX® credit card fabricated from polyvinyl chloride having indicia providing bank/user information on the front or obverse side thereof.
Figure 4:
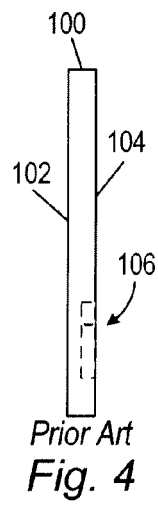
FIG. 4 is a left end elevational view of the prior art AMEX® credit card of FIG. 2 showing by dashed lines the standard magnetic stripe areas.
Figure 2:
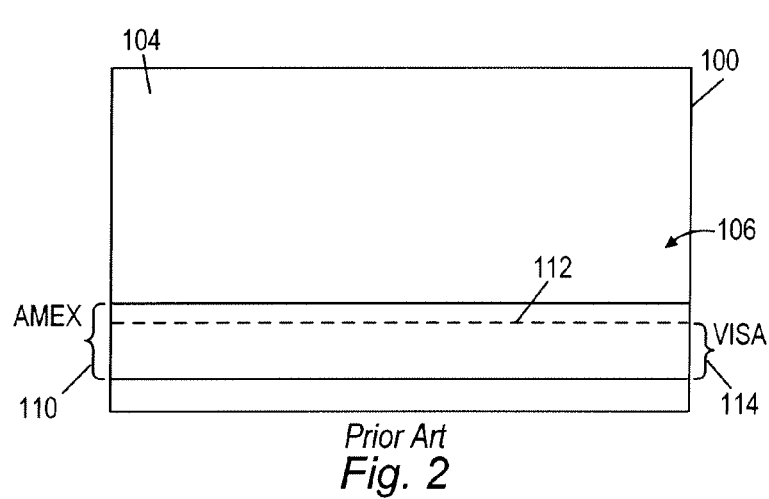
FIG. 2 is a pictorial representation of the prior art AMEX® credit card of FIG. 1 showing the converse side thereof having either a standard read-only magnetic stripe area defining one or more magnetic tracks or a standard read-write magnetic stripe area defining two or more magnetic tracks.
Figure 3:
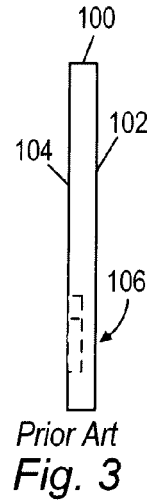
FIG. 3 is a right end elevational view of the prior art AMEX® credit card of FIG. 2 showing by dashed lines the standard magnetic stripe areas.

In this regard, FIGS. 1 through 7, labeled prior art, pictorially illustrate the presently used financial or credit cards. FIGS. 1 through 4 illustrate a credit card 100 where the obverse side 102 bears indicia describing certain bank/user information while the converse side 104, is illustrated in FIG. 2, includes a data storage section 106 which may be in the form of wide magnetic stripe area 110, which is typical of the magnetic stripe area used in a AMEX® credit card, which contains stored data in compliance with the AHSI Standards as described above.

Alternatively, the magnetic stripe area may be a thin magnetic strip area as depicted by dashed line 112 which forming a narrow stripe 114 which is typically used in a VISA® credit card.

Figure 7:
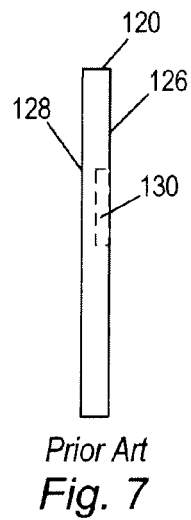
FIG. 7 is a left end elevational view of the prior art Smart card of FIG. 5 showing by dashed lines the standard magnetic stripe area.
Figure 5:
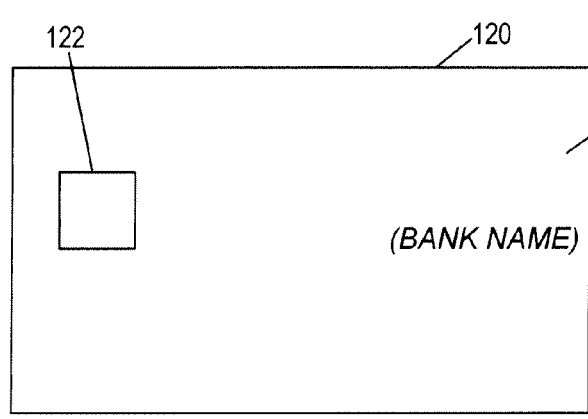
FIG. 5 is a pictorial representation of a prior art Smart card having a computer chip, memory and indicia providing bank/user information located on the front thereof.
Figure 6:
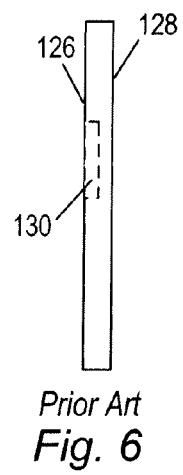
FIG. 6 is a right end elevational view of the prior art Smart card of FIG. 5 showing by dashed lines the standard magnetic stripe area.

FIGS. 5 through 7 illustrate a typical Smart Card 120 having an integrated circuit shown as 122 located on the obverse side 126 thereof. The integrated circuit 122 may include a dedicated storage member. The converse side 128 of the Smart Card 120 may be blank or alternatively may include a magnetic stripe area similar to magnetic stripe areas 110 and 114 as illustrated in FIG. 2.

In FIGS. 6 and 7, the integrated circuit 122 is illustrated by dashed lines. If a magnetic stripe area is used on the Smart Card 120 the magnetic stripe area is typically located on the converse side 128.

The pictorial representation of a portable card 140, as shown in FIGS. 8, 9 10 and 11, utilize the teachings of the present invention in the form of a magnetically encodeable credit card fabricated from polyvinyl chloride or polyvinyl chloride acetate. The portable card 140 has a obverse side 142 and a converse side 144. The converse side 144 has two spaced parallel magnetic stripe areas shown as magnetic stripe areas 148 and 150. Each magnetic stripe area 148 and 150 are capable of having a plurality of magnetic tracks for providing at least five megabytes formatted of magnetic storage. Alternatively, one of the magnetic stripe areas 148 or 150, may be formatted for use as a standard magnetic stripe area on a financial credit card. Of course, the lower density application may not efficiently use the storage capability of the applicable magnetic stripe area.

In the portable card 158 illustrated in FIGS. 12 and 13, the obverse side 160 of the card 158 may contain indicia which may provide bank/user information and may include an integrated circuit as shown by the dashed rectangle 162 and the converse side thereof 164 may have a single magnetic stripe area 166 of the form depicted in FIG. 8.

In the portable card of FIGS. 14 and 15, the portable card has an obverse side 172 and a converse side 174. The portable card 170 is in the form of a magnetically encodeable credit card fabricated from polyvinyl chloride, or other equivalent operable material, such as for example PVCA. The converse side 174 has a magnetic stripe area 178 having a plurality of magnetic tracks for providing at least five megabytes of formatted of magnetic storage. The obverse side 172 may be used for providing indicia or for other uses as described herein.

FIGS. 16, 17 and 18 depict a pictorial representation of yet another embodiment of a portable card 180 utilizing the teachings of the present invention. The portable card 180 has an obverse side 182 and a converse side 184. The obverse side 182 has formed thereon a data storage device shown by arrow 188, which covers substantially all of the obverse side area of obverse side 182. The data storage device 188 has a plurality of magnetic tracks for providing at least five megabytes formatted of magnetic storage. The converse side 184 contains a standard magnetic stripe area as used on an AMEX® credit card shown by dashed lines 190. This enables the portable card 180, to be used as a magnetically encodeable credit card which is capable of being read using an AMEX® credit card reader or other standard financial credit card readers or standard financial magnetically encoded card processing apparatus.

Alternatively, a card reader or magnetic signal processing apparatus, adapted to read and/or write on the data storage device 188, may be used to process the magnetically encoded data.

FIGS. 19, 20 and 21 depict a pictorial representation of still yet another embodiment of a portable card 196 utilizing the teachings of the present invention. The portable card 196 has an obverse side 198 and a converse side 200. The obverse side 198 has formed thereon a data storage device shown by arrow 204, which covers substantially all of the obverse side area of obverse side 198. The data storage device 204 has a plurality of magnetic tracks for providing at least five megabytes formatted of magnetic storage. The converse side 200 contains a standard magnetic stripe area as used on an AMEX® credit card shown by dashed lines 210. This enables the portable card 196, to be used as a magnetically encodeable credit card which is capable of being read using a VISA® credit card reader or other standard financial credit card readers or standard financial magnetically encoded card processing apparatus.

Alternatively, a card reader or magnetic signal processing apparatus adapted to read and/or write on the data storage device 204 may be used to process the magnetically encoded data.

FIGS. 22 and 23 depict a pictorial representation of still yet another embodiment of a portable card 214 utilizing the teachings of the present invention in the form of a magnetically encodeable credit card fabricated in a substantially rectangular shape and having substantially planar sides including an obverse side 218 and converse side 220. The obverse side 218, adjacent the top edge of the credit card 214, has a standard magnetic stripe area as used on an AMEX® credit card shown by dashed lines 220. Located below the magnetic stripe area 220 is a data storage device shown by arrow 224 which covers in excess of one-half of the obverse side area of obverse side 218. The data storage device 224 has a plurality of magnetic tracks for providing at least five megabytes formatted of magnetic storage. The converse side 220 may contain indicia or be utilized for other uses as described herein.

FIGS. 24 and 25 depict a pictorial representation of still yet another embodiment of a portable card 230 utilizing the teachings of the present invention in the form of a magnetically encodeable credit card fabricated in a substantially rectangular shape and having substantially planar sides, obverse side 232 and converse side 234. The obverse side 232 adjacent the top edge of the credit card 230 has a standard magnetic stripe area as used on an VISA® credit card shown by dashed lines 238. Located below the magnetic stripe area 238 is a data storage device shown by arrow 240 which covers in excess of one-half of the obverse side area of obverse side 232. The data storage device 240 has a plurality of magnetic tracks for providing at least five megabytes formatted of magnetic storage. The converse side 234 may contain indicia or be utilized for other uses as described herein.

FIGS. 26 and 27 depict a pictorial representation of still yet another embodiment of a portable card 246 utilizing the teachings of the present invention in the form of a magnetically encodeable credit card fabricated in a substantially rectangular shape and having substantially planar sides including an obverse side 250 and converse side 252. The obverse side 250 has formed on the lower portion thereof a data storage device shown by arrow 258 which covers in excess of one-half of the obverse side area of obverse side 250. The data storage device 258 has a plurality of magnetic tracks for providing at least five megabytes formatted of magnetic storage.

Located on the converse side 252 and adjacent the top edge of the credit card 246 is a standard magnetic stripe area as used on an AMEX® credit card shown by dashed lines 262. The converse side 252 may contain indicia or be utilized for other uses as described herein.

FIGS. 28 and 29 depict a pictorial representation of still yet another embodiment of a portable card 266 utilizing the teachings of the present invention in the form of a magnetically encodeable credit card fabricated in a substantially rectangular shape and having substantially planar sides including an obverse side 270 and converse side 272. The obverse side 270 has formed on the lower portion thereof a data storage device shown by arrow 278 which covers in excess of one-half of the obverse side area of obverse side 270. The data storage device 258 has a plurality of magnetic tracks for providing at least five megabytes formatted of magnetic storage.

Located on the converse side 272 and adjacent the top edge of the card 266 is a standard magnetic stripe area as used on an VISA® credit card shown by dashed lines 282. The converse side 272 may contain indicia or be utilized for other uses as described herein.

FIGS. 30, 31 and 32 depict a pictorial representation of still yet another embodiment of a portable card 290 utilizing the teachings of the present invention. The portable card 290 has an obverse side 292 and a converse side 294. The obverse side 292 has formed thereon a data storage device shown by arrow 298, which covers substantially all of the obverse side area of obverse side 292.

The converse side 294, likewise, has formed thereon a separate or second data storage device shown by arrow 300, which covers substantially all of the converse side area of converse side 294.

Each of the data storage devices 298 and 300 has a plurality of magnetic tracks for providing at least five megabytes formatted of magnetic storage. It is envisioned that one of the data storage devices 298 and 300 may be formatted for use in a manner similar to a standard magnetic stripe area on a financial card of financial credit card. Of course, the lower density application may not efficiently use the storage capability of the data storage devices 298 and 300.

There are a number of methods available to fabricate a portable card at a magnetically encodeable credit card utilizing the teaching of the present invention. FIGS. 33, 34, 35 and 36 are exemplary of several methods and structures for the teachings of the present invention. The structure, composition and thickness of the recording medium and protective coating may dictate which structure is the best embodiment for using the teachings of the present invention.

The methods and structures set forth below are not intended to be limiting and are being provided as examples only. It is envisioned that presently known alternative technologies or after developed technologies which are equivalent to the known technologies, may be used in practicing the invention set forth herein. In FIGS. 33 through 36, common elements are identified with the same numerals.

Figure 33:
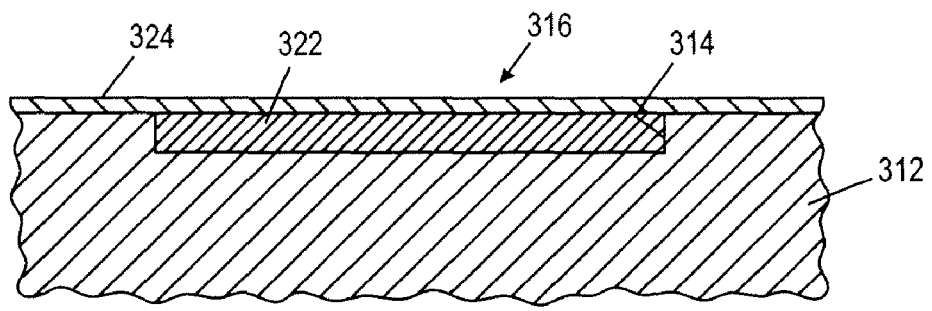
FIG. 33 is a pictorial representation of a credit card having a groove formed therein for receiving a data storage device wherein a data storage member is located in the groove and the data storage member and groove are enclosed by a protective coating of material which may be one or more layers of material.

FIG. 33 is a pictorial representation of one structure for a portable card formed of a substrate 312, which may be any known material for use as substrate for a recording medium including glass, ceramic or the like or other non-magnetic material. The substrate 312 has a groove 314 formed therein. Certain of the materials defining the remaining structure of the data storage device including the protective coating are shown generally by arrow 316. The materials disposed in the groove 314, excepting the protective coating, are depicted by 322 and define a data storage section or recording medium. The materials 322, the surface of substrate 312 and the groove 316 are enclosed by the protective coating 324 which may be one or more layers of material as disclosed herein.

Figure 34:
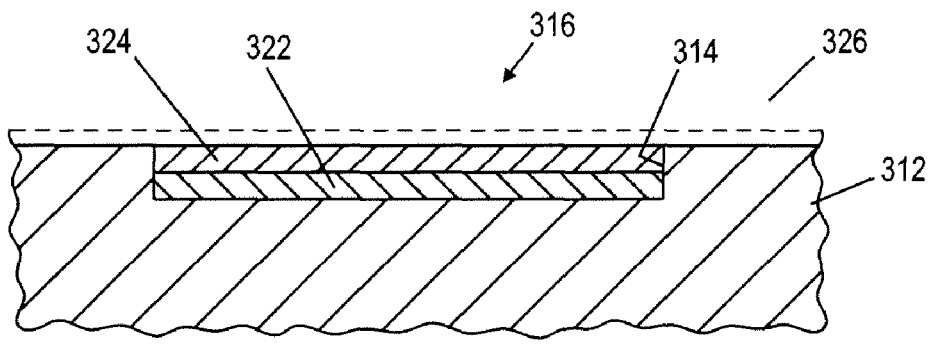
FIG. 34 is a pictorial representation of a credit card having a groove formed therein for receiving a data storage device comprising a data storage member and a protective coating of material enclosing the data storage member wherein both the data storage member and protective coating are located within the groove.

FIG. 34 is a pictorial representation of another structure for a portable card formed of a substrate 312. The substrate 312 has a groove 314 formed therein. Certain of the materials defining the remaining structure of the data storage device including the protective coating are shown generally by arrow 316. The materials, except for the protective coating, are depicted by 322 and the materials 322 are disposed in the groove 314 together with the protective coating 324. An overcoat layer or bonded lubricant layer, depicted by dashed line 326, may be applied to the outer surface of the substrate enclosing the protective coating 324, the layers of material 322 and the outer surface of the substrate 312.

Figure 35:
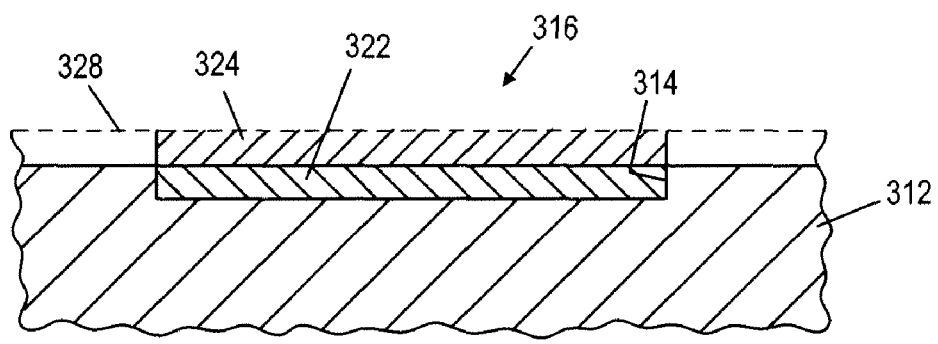
FIG. 35 is a pictorial representation of a credit card having a groove formed therein for receiving a data storage device wherein the data storage member is enclosed by a protruding protective coating of material located directly thereon and wherein a laminating layer material is formed to be coplanar with the protruding protective coating.

FIG. 35 is a pictorial representation of yet another structure for a portable card formed of a substrate 312. The substrate 312 has a groove 314 formed therein. Certain of the materials defining the remaining structure of the data storage device including the protective coating are shown generally by arrow 316. The materials, except for the protective coating, are depicted by 322 and the materials 322 are disposed in the groove 314. The protective coating 324 is a protruding protective coating of material located directly on and enclosing the layers of material 322. A laminating layer material depicted by dashed line 328 is formed to be coplanar with the protruding protective coating 324.

Figure 36:
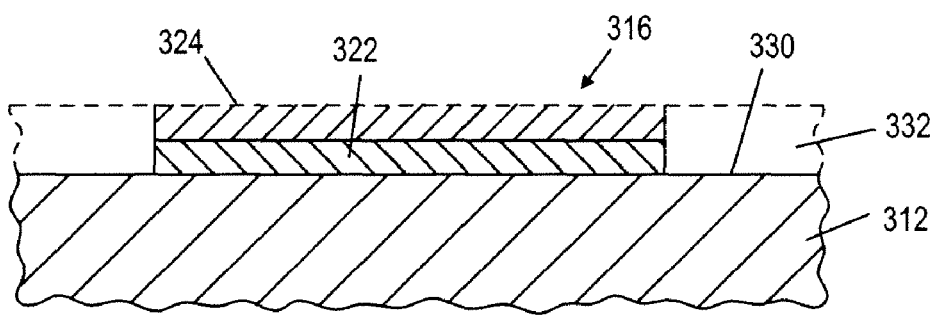
FIG. 36 is a pictorial representation of a credit card having a data storage device formed on the surface thereof wherein both a data storage member and a protective coating of material enclosing the data storage member are both protruding above the surface of the credit card and wherein a laminating layer material is formed to be coplanar with the protruding data storage member and protruding protective coating.

FIG. 36 is a pictorial representation of still yet another structure for a portable card formed of a substrate 312. The substrate 312 receives certain of the materials defining the remaining structure of the data storage device, and those certain materials including the protective coating are shown generally by arrow 316. These materials, except for the protective coating, are depicted by 322 and are disposed on and protrude above the surface 330 of substrate 312. The protective coating 324 is located directly on and enclosing the layers of material 322 and the protective coating 324 is likewise a protruding layer of material. A laminating layer material depicted by dashed line 332, which optionally may be the same material as the protective coating, is formed to be coplanar with the protruding layers of material 322 and the protective coating 324.

Figure 37:
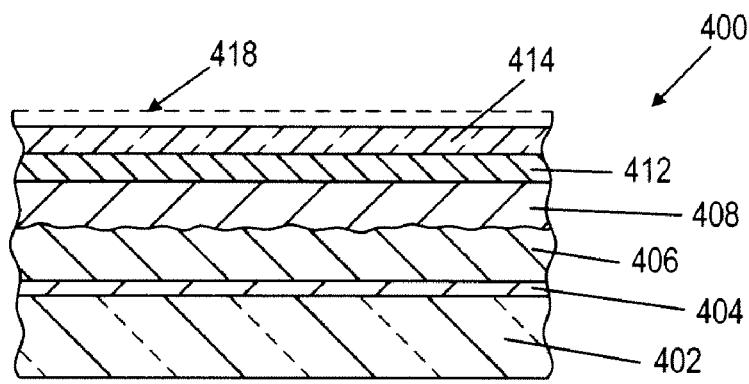
FIG. 37 is a pictorial representation of a prior art recording medium having a high density magnetic material having its axis of magnetization extending in a substantially horizontal direction relative to at least one surface of the substrate, which recording media is used for a data storage device operating in a protective environment, and to which a protective coating as disclosed herein can be added to use the same in a data storage device of the present invention.

FIG. 37 is a pictorial representation of a prior art recording medium 400 having substrate 402, a Ti Seed Layer 404 (having a thickness of approximately 100 Angstroms), a layer 406 of NiP having formed around a layer 408 of Cr, a high density magnetic material layer 412 having its axis of magnetization extending in a substantially horizontal direction relative to at least one surface of the substrate 402, and wherein the layer 412 is coated or sealed with a glass or PLC coating 414. The recording medium 400 is exemplary of the type of recording medium used for a data storage device operating in a protective environment.

Typically in a data storage device such as a disk drive operating in a protective environment, particles get inside disk drives from poor prior cleaning, surface abrasion created from the head landing on the media landing zone, and peaks of carbon extending above the head flying height that are severed or broken off by the flying head.

The typical sizes of particles that are common to hard disk drives are larger that the flying height which is typically 1 microinch to 10 microinches. These particles can easily become lodged between the head and the disk. The particles lift the head up and away from the disk. The particles plow through or penetrate the overcoat or protective layer and impact on the high coercivity recording layer, resulting in complete destruction of the recorded data track. This is commonly know as a "head crash". The particles generated by the "head crash" can rapidly spread throughout the disk drive causing an avalanche of "head crashes" on the other disks, if a multidisk drive.

On the other hand, the recording medium of the present invention has been intentionally designed to be exposed to and to tolerate mechanical degradation of the surface without any degradation of the underlying high coercivity recording layer. The head or transducer operating as the read/write device on medium or data storage device of this invention can either operate in absolute contact with the outer surface of the protective coating or can "fly" in "quasi" contact to 10 microinches above the outer surface of the protective coating.

The selected thickness and relative hardness of the protective coating permits substantial abrasion due to particulate contamination during read/write operation in a normal ambient atmosphere operating environment as well as during abrasive cleaning, where the outer surface of the protective coating may be abraded. The protective coating has been designed to abrade away upon impact with particulate matter including particles occurring between the head and media and during cleaning and handling leaving the underlying high coercivity recording material intact.

In the present invention, a relatively hard, abradeable protective coating is formed on the magnetic material layer and the selected thickness of the protective layer is an important criteria for rendering this invention operable. The thickness is selected to be between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating.

As such, the protective coating in the preferred embodiment is a bendable, diamond-like hardness protective coating having ~. selected thickness which allows passage of magnetic signals in an ambient natural atmospheric operating environment through the protective layer and between said at least one high density magnetically coercive material layer and a transducer and is formed of a material which resists at least one of chemical, magnetic and controlled mechanical degradation of the data storage device.

Figure 38:
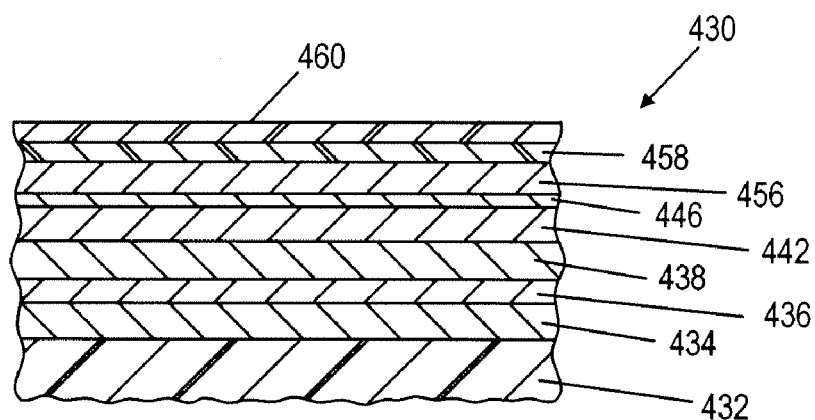
FIG. 38 is a pictorial representation of one embodiment of a recording medium of the present invention having a high density magnetic material having its axis of magnetization extending in a substantially horizontal direction relative to at least one surface of the substrate and a plurality of layers of the materials including a protective coating having a magnetically permeable, low coercivity layer of magnetic material separated by a layer of non-magnetic material defining an exchange break layer which enables a magnetic image field to be stored in the magnetically permeable, low coercivity layer, which recording medium is used for a data storage device.

FIG. 38 is a pictorial representation of one embodiment of a recording medium shown generally as 430 which is formed of a plurality of layers of material to provide the most ideal recording medium possible for practicing this invention. The recording medium 430 has a substrate 432 which functions as the portable card substrate. A base layer 434 is deposited on the substrate 432. A seed layer 436, which may be optional, is deposited on the base layer 434 a layer 438 formed of chromium is deposited on the seed layer 436. A layer 442 of high density magnetic material having its axis of magnetization extending in a substantially horizontal direction relative to at least one surface of the substrate 432 is deposited on the chrome layer 438. A layer 446 of non-magnetic material, which functions as a "break layer", "exchange break layer" or a "decoupling layer", is deposited on the magnetic layer 442. A protective coating shown by bracket 454 is applied to the layer 446. The protective coating 454 is formed of two layers, namely a magnetically permeable, low coercivity layer 460, which is deposited on the layer 446 to form a "keeper" layer, and a second layer 458 which preferably is a hard, diamond like material.

The structure, function and operation of a "keeper" layer and other known prior art relating to a "keeper" layer is described in PCT Application US92/10485 filed Dec. 7, 1992 and published on Jul. 8, 1993.

The protective coating 454 may have formed thereon a bonded lubrication layer 460 which functions as a cleaning material layer permitting the cleaning of debris, fingerprints and other particulate material from the surface of the recording medium 430.

Figure 39:
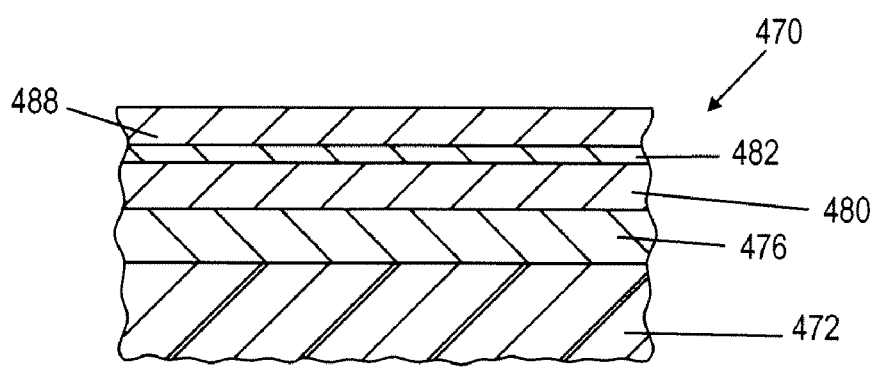
FIG. 39 is a pictorial representation of another embodiment of a recording medium of the present invention having an underlayer deposited on at least one surface of a substrate deposited, a high density magnetic material layer deposited on the underlayer wherein the high density magnetic, material has its axis of magnetization extending in a substantially horizontal direction relative to at least one surface of the substrate, a layer of non-magnetic material defining an exchange break layer, and a protective coating including a magnetically permeable, low coercivity layer of magnetic material separated which is separated from the high density magnetic material layer by the exchange break layer which enables a magnetic image field to be stored in the magnetically permeable, low coercivity layer, which recording medium is used for a data storage device.

FIG. 39 is a pictorial representation of another embodiment of a recording medium 470 for practicing this invention. This structure represents a recording medium having a significantly less number of layers of material compared to the embodiment and structure described above in connection with FIG. 38.

A substrate 472, which is used as the portable card, has a chromium underlayer 476 deposited on at least one surface of the substrate 472. A high density magnetic material layer 480 is deposited on the underlayer 476 wherein the high density magnetic material layer 480 has its axis of magnetization extending in a substantially horizontal direction relative to at least one surface of the substrate 472. A layer of non-magnetic material 482 defining an exchange break layer is deposited on the magnetic layer 480. A protective coating 488, which is in the form of a single layer, includes a magnetically permeable, low coercivity magnetic material which is separated from the high density magnetic material layer 480 by the exchange break layer 482 which enables a magnetic image field to be stored in the magnetically permeable, low coercivity magnetic material forming the protective coating 488.

Figure 40A:
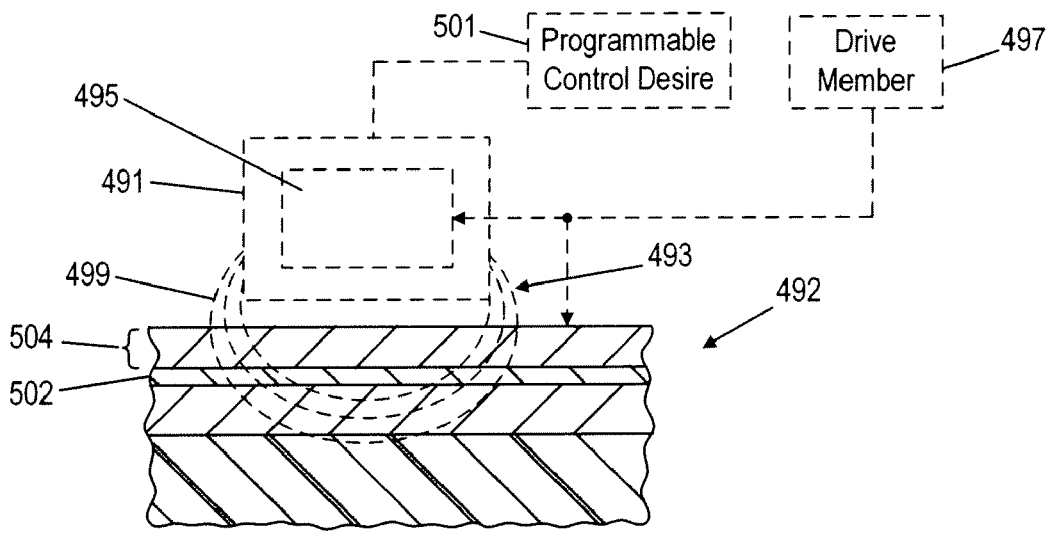
FIG. 40(A) is a pictorial representation of yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises one layer including a magnetically permeable, low coercivity layer of magnetic material separated which is separated from the high density magnetic material layer by the exchange break layer which enables a magnetic image field to be stored in the magnetically permeable, low coercivity layer, which recording medium is used for a data storage device.

FIG. 40(A) is a pictorial representation of yet another embodiment of a recording medium 492 for practicing this invention. In this embodiment, the protective coating is a single layer and includes a magnetically permeable, low coercivity magnetic material which also functions as the "keeper" layer. The recording medium 492 includes a substrate 496 which is preferable formed of a non-magnetic material. A high density magnetic material layer 498 is deposited on the at least one surface of the substrate 496 wherein the high density magnetic material has its axis of magnetization extending in a substantially horizontal direction relative to at least one surface of the substrate 496. A layer 502 of non-magnetic material, defining an exchange break layer, is deposited on the magnetic layer 498. The protective coating 504 comprises one layer including a magnetically permeable, low coercivity layer of magnetic material which is separated from the high density magnetic material layer 498 by the exchange break layer 502. The exchange break layer 502 enables a magnetic image field to be stored in the magnetically permeable, low coercivity material.

In an unsaturated state, the magnetic permeable, magnetically saturable material, which may be use alone as protective coating, provides a shunt path that contains substantially all of the magnetic flux from the recorded data in the high coercivity layer. The effectiveness of the protecting coating becomes degraded at a thickness where the material commences to emit a detectable quantity of magnetic flux leakage.

Also, the protective layer minimum thickness due to known quantity of magnetically permeable, magnetically saturable material being removed by usage is that minimum thickness thereof which is capable of supporting magnetic flux density of a reading signal.

It is highly desirable that the magnetic flux from the data stored in the high coercivity magnetic layer is substantially retained in the magnetic permeable protective layer.

Upon application of a localized saturating flux, such as DC bias field, an electrical aperture is created in the magnetic permeable, magnetically saturable layer. The flux lines from a bit cell of data are now unconstrained, e.g., a state of high reluctance, and can extend outside the magnetic permeable protective layer and into interaction with a transducer for detection and subsequent data processing. Flux from all of the other bit cells remain substantially contained in the non-saturated magnetic permeability, magnetically saturable protective coating; e.g. a state of low reluctance. Relative motion between the medium and the transducer will "move" the localized saturated aperture in the magnetic permeable, magnetically saturable layer, forming the protective coating, to permit additional cells of data to be accessible by the read transducer.

In the preferred embodiment where the protective coating is a magnetic permeability, magnetically saturable material, substantial amounts of the magnetic permeable protection layer can be abraded or worn away by sliding transducer contact, by an abrasive cleaning, by removing or slighting abrading as required to remove debris, fingerprints and the like from the card or by rough handling without affecting the integrity of the data stored in the high coercivity data memory layer. In the preferred embodiment, the magnetic permeable protection layer may be formed from a wide variety of low coercivity, high permeability materials, materials typically used as core material in magnetic read/write transducers. Such materials include Permalloy (NiFe), Sendust (AlFeSil) and super Sendust (AlFeSilNi).

The thickness of the magnetic permeable protection layer should be sufficient to retain all of the flux from the high coercivity memory layer with some additional material to permit substantial mechanical wear while still containing the underlying magnetic flux. However, even if nearly all of the magnetic permeable protection layer is worn away to the thickness where a slight amount of flux leakage occurs, some retention of the underlying flux will still occur.

Mechanical damage to the high coercivity layer will not occur as long as some material in the protective layer remains intact. Because of the protective coating of the present invention being so robust and bendable, a very severe grinding action would be required to remove all of the protection layer, exposing the underlying break layer and high coercivity data recording layer.

When a magnetically encodeable card having a protective coating of the present invention is exposed to stray magnetic field, such as adjacent credits cards for example, the magnetic permeability, magnetically saturable material causes the magnetic filed to be captured with the saturable material thereby providing magnetic protection to the material storage layer.

Likewise the relatively hard protective coating, if immersed in a chemical solution or other fluid, which may contain chemicals, the protective coating protects the material storage layer from being degraded by such chemicals which come into contact with the data storage device.

The relatively hard, abradeable protective coating of the present invention is formed on the magnetic material layer. the protective coating and is selected to have a thickness between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating. The maximum thickness and minimum thickness can be empirically determined and are generally a function of the data storage device materials, the protective coating materials, the transducer and the like.

The protective coating may be a single layer which includes a magnetically permeable, magnetically saturable material or at least two layers wherein one of the layers include a magnetically permeable, magnetically saturable material and the other of the layers may be a non-magnetic friction reducing layer formed on the one of the layers.

The term "diamond-like hardness" is well known in the art and is described in detail at page 599 and pages 629 through 638 in *TRIBOLOGY AND MECHANICS OF MAGNETIC STORAGE DEVICES* by Bharat Bhushan published by Springer-Verlag of New York. Generally the term diamond-like hardness refers to an amorphous or diamond-like carbon (DLC) deposited by sputtering or plasma-enhanced chemical vapor deposition techniques that has been developed for applications, such as the magnetic thin-film disks, which require extremely low friction, and wear at a range of environmental conditions [inside the protected environment of the disk drive].

FIG. 41(B) is a pictorial representation of the recording medium 540 of FIG. 41(A) having a plurality of substantially parallel magnetic tracks 546 and illustrating that specific domain areas 548 are used for recording magnetic signals therein.

In FIG. 40(A), the recording medium is illustrated to interact with a magnetic control device shown by dashed rectangle 491 having a bias field shown by arrow 493 which is adapted to increase through the protective coating 504 and the and the exchange break layer 502 the reluctance of the magnetic saturable, magnetically permeable material in the protective coating 504 to enable the magnetic signals to pass between the high density magnetically coercive material through the exchange break layer 502 and the protective coating 504 to a magnetic transducer 495.

The magnetic transducer is typically forms part of or is located in a data processing station and is adapted to interact with the portable card containing the data storage device 492 when the portable card and data processing station are moved relative to each other to position the data storage device proximate the data processing station to enable data flow between the magnetic layer in the data storage device and the transducer.

The bias field 493 causes or drives the magnetic saturable, magnetically permeable material in the protective coating 504 into saturation enabling the magnetic signals to easily pass from the magnetic layer 498, through the exchange break layer 502 and the protective coating 504 to the transducer 495. The portion of the protective coating that does have the bias filed 493 applied thereto remains in an unsaturated condition and retains or keeps the magnetic signals encoded in the magnetic layer 498.

A drive member, depicted by rectangle 497, is operatively coupled to at least one of the transducer 495 and the portable card containing the recording medium 492 to provide the relative movement therebetween.

The drive member is used to perform one of the following: (i) position the portable card proximate the data processing station to enable data flow therebetween; (ii) move the portable card relative to the data processing station; (iii) move the data processing station relative to the portable card; and (iv) the portable card and the data processing station are moved relative to each other.

The transducer 495 maybe be: (i) an inductive head; (ii) a thin film magnetic head; (iii) a magnetoresistive head; (iv) a giant magnetoresistive (GMR) head, and (v) a magnetoresistive head including a dual stripe magnetoresistive element. In addition, the magnetoresistive head may include a magnetic flux guide shown by dashed line 499 in FIG. 40(A) for conducting magnetic flux from the data storage device of the portable card read by such a magnetoresistive head.

In FIG. 40 (A), a programmable control device depicted by dashed box 501 is operatively connected to the magnetic control device 491 to cause the bias field 493 to be applied to the recording medium 492 when a selected magnetic image is located substantially adjacent the transducer 495. The use of such a programmable control device is known in the magnetic recording and reproducing art.

Figure 40B:
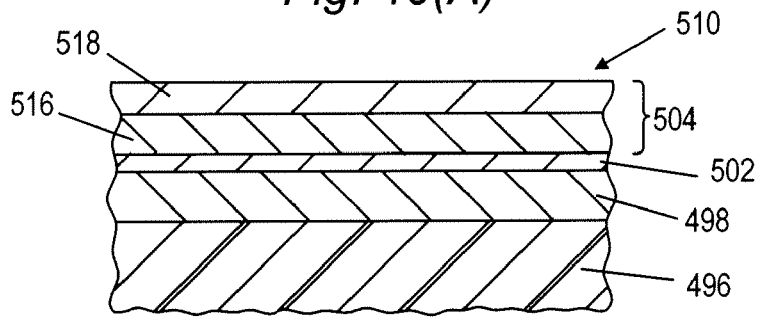
FIG. 40(B) is a pictorial representation of still yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises two layers wherein one layer comprises a magnetically permeable, low coercivity layer of magnetic material separated which is separated from the high density magnetic material layer by the exchange break layer which enables a magnetic image field to be stored in the magnetically permeable, low coercivity layer and the other layer is disposed on the one layer is formed of a hard, diamond like material, which recording medium is used for a data storage device.
Figure 40C:
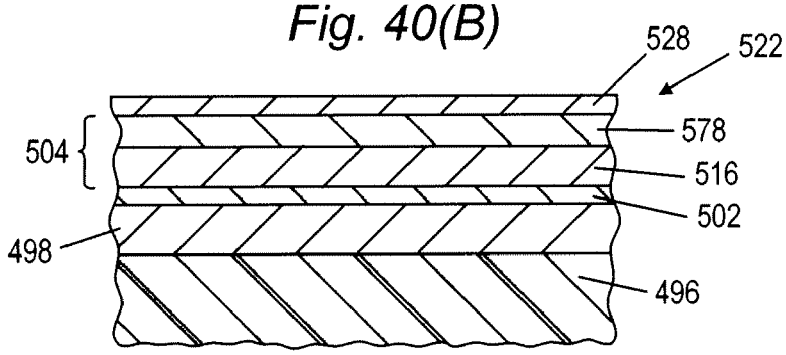
FIG. 40(C) is a pictorial representation of yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, a protective coating comprising two layers wherein one layer comprises a magnetically permeable, low coercivity layer of magnetic material separated which is separated from the high density magnetic material layer by the exchange break layer which enables a magnetic image field to be stored in the magnetically permeable, low coercivity layer and the other layer is disposed on the one layer is formed of a hard, diamond like material and a layer defining a bonded lubricant formed on the other layer of the protective coating, which recording medium is used for a data storage device.
Figure 40D:
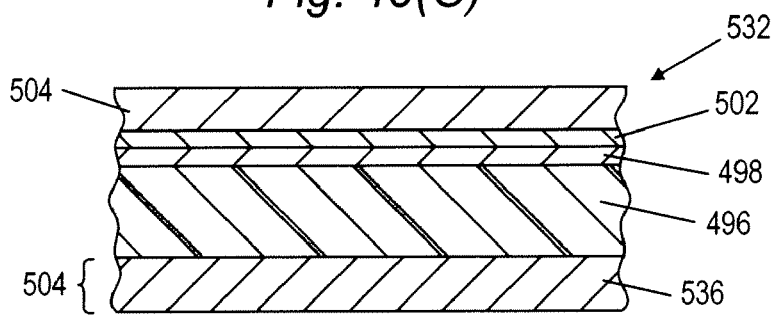
FIG. 40(D) is a pictorial representation of still yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises one layer including a magnetically permeable, low coercivity layer of magnetic material separated which is separated from the high density magnetic material layer by the exchange break layer which enables a magnetic image field to be stored in the magnetically permeable, low coercivity layer, and a protection coating formed on the other side of the substrate opposite to the surface having the high density magnetic material layer deposited thereon, which recording medium is used for a data storage device.

FIGS. 40(B), 40(C) and 40(D) are variations of the structure of FIG. 40(A) and the same numbers are used in each figure to identify similar elements for purposes of the following descriptions.

In FIG. 40(B), the structure of the recording medium 510 is substantially the same as that of the recording medium 492 of FIG. 40(A) except that the protective coating 504 is formed of two layers, one layer of which is a "keeper" layer 516 and the other of which is a layer 518 formed preferably of a hard, diamond like material.

In FIG. 40(C), the structure of the recording medium 522 is similar to that of the recording medium 510 of FIG. 40(B) except that an additional layer 528 of a bonded lubricant material is deposited on the layer 518. The bonded lubricant material may be any well known bonded lubricating material applicable for coating onto a recording medium, such as for example perflouroether or phosphozene.

In FIG. 40(D), the structure of the recording medium 532 is similar to that of FIG. 40(A) except that the protective coating 504 is applied to both the recording medium formed on the substrate, which coats one side of the substrate 496, and to the opposite side of the substrate 536.

Tables 2, 3, 4 and 5 set forth below provide examples of the various materials that can be used for various layers of materials as described in the embodiments of FIGS. 38, 39, 40(A), 40(B), 40(C) and 40(D), the thickness thereof and other important characteristics thereof. The examples set forth herein are not intended to be limiting in nature or teachings, but rather are examples of materials that can be used in practicing this invention. It is envisioned that other materials not disclosed herein, but which are known to persons skilled-in-the art, can also be used in practicing the present invention, and such materials as well, as any after developed material that are substantially equivalent to the materials disclosed herein, are deemed to be within or as using the teachings of the present invention.

Table 2 sets forth materials which can be used for the protective coating, "keeper layer", break layer and magnetic layer:

TABLE 2

| Protective Coating (Overlayer) | "Keener Layer": | Break Layer | Magnetic Layer |
|---|---|---|---|
| Carbon | AlFeSil (Sendust) | Silicon | CoCrPtTa |
| Diamond Like Carbon | NiFe (Permalloy) | Carbon | CoCrPt |
| Zirconia | CoZrNb | Chromium | CoCrTa |
| Zirconia Oxide | | | CoNiCr |
| Glass | | | CoNiPt |
| CoNiCrPt | | | |

Table 3 sets forth materials which can be used for an Underlayer, Optional seed layer, Optional base layer and card substrate:

TABLE 3

| Optional Underlayer | Optional Seed Layer | Base Layer | Card Substrate |
|---|---|---|---|
| Typically Chromium | Crystalline CrNi Ta Aluminum Nitride CrTiO2 | NiP | Glass Zirconia Plastic Isotropic Plastic Ceramic/Alumina Glass Ceramic Glass Carbon Fiber Stainless Steel Titanium Aluminum Phosphor Bronze |

Table 4 sets forth the range in Angstroms, for the Overcoat thickness, the Keeper thickness, the break layer thickness and magnetic layer thickness, as determined in a direction substantially normal to the surface of the substrate:

TABLE 4

| Protective Coating (Overlayer) Thickness | Keeper layer Thickness | Break Layer Thickness | Magnetic Layer Thickness |
|---|---|---|---|
| 150 Angstroms to 500 Angstroms | 50 to 500 Angstroms | 10 Angstroms to 150 Angstroms | 250 Angstroms to 1000 Angstroms |

Table 5 sets forth the range in Angstroms, for the underlayer thickness, the seed layer thickness, the base layer thickness and card substrate, as determined in a direction substantially normal to the surface of the substrate:

TABLE 5

| Underlayer Thickness | Seed Layer Thickness | Base Layer Thickness | Card Substrate Thickness |
| --- | --- | --- | --- |
| 200 Angstroms to 2000 Angstroms | 100 Angstroms to 1000 Angstroms | Typically 10 Micro-meters | .005 inches to .050 inches |

The substrate surface may be treated by texturing to enhance orientation of anistropic materials. The known texturing procedures that can be used include: (i) circumferential texturing; (ii) radial texturing; (iii) chemical texturing; and (iv) laser texturing.

The pictorial representation in FIG. 41(A) depicts a recording medium of the present invention illustrating that the surface 542 thereof is textured, as represented by the substantial linear, parallel texture markings 544, during the fabrication process to provide lineal antisotrophy of the magnetic domains.

In FIG. 42(A). the pictorial representation of an encodeable credit card 550 is shown wherein the entire substrate or body 562 is fabricated of a magnetic recording material in an appropriate binder material and having an appropriate protective coating 564 to form a data storage device using the teachings of the present invention;

FIG. 42(B) is a pictorial representation of an encodeable credit card 564 wherein the substrate or body 568 forms the high density magnetic recording material and a protective coating 570 is formed thereon to form a data storage device for practicing this invention.

FIG. 43(A) is a pictorial representation of a credit card 572 having a groove 574 formed therein which is adapted to have a data storage device having a separate substrate and a protective coating inserted therein.

FIG. 43(B) is a pictorial representation of a the credit card 572 of FIG. 43(A) having wherein the groove 574 formed therein encloses a data storage device 576 wherein the data storage device may comprise a recording medium illustrated in FIGS. 38, 39, 40(A), 40(B), 40(C) and 40(D). In addition, prior art recording medium having a protective coating as described in connection with FIG. 37 may also be used in practicing this invention.

FIG. 44 is a pictorial representation of still yet another portable card 580 utilizing the teachings of the present invention in the form of a magnetically encodeable credit card wherein the obverse side depicted by arrow 582 thereof may contain indicia providing banker/user information or, alternatively, a standard magnetic stripe area as shown in FIGS.~19, 20, 21, 26, 27, 28 and 29. The converse side thereof 584 includes a data storage device 586 located substantially centrally thereon and the data storage device has a plurality of parallel spaced magnetic tracks for storing at least five megabytes formatted of a magnetic data. The data storage device 586 covers a predetermined area of the converse side 586 so as to define a circumferential edge 588 around the periphery of the converse side 584 to provide a transition area to enable a linearly transported magnetic transducer, shown by dashed-lines 590, to be stepped onto selected magnetic tracks of the plurality of magnetic tracks for reading and/or writing of magnetic signals within the data storage device 580.

A drive member depicted by box 578 is operatively coupled to the portable card as illustrated by lead line 577 and to the transducer as illustrated by lead line 579. The drive member provides the relative movement between the portable card and the transducer to position the date storage device proximate the transducer 590 to enable the interaction therebetween.

FIG. 45 is a plot depicting the magnitude of magnetic signals, e.g. signal amplitude, transduced by a magnetic transducer. e.g. transducer 590 in FIG. 44, being transported linearly over a magnetic track plotted as a function of track length. The resulting tracking data is depicted by line 592 and has a ramp-up portion 594 corresponding to the circumferential edge 588 around the periphery of the converse side 584 as the transducer is transported towards the data storage device 586. When the transducer interacts with the data storage device the level of the magnetic signals are at maximum amplitude at the point where the magnetic transducer passes from the circumferential edge 588 around the periphery of the converse side 584 defining a transition area located around the periphery of the converse side 584 of the portable card 580. The magnetic signals remain at maximum amplitude until the magnetic transducer passes from the data storage device 586 back onto the circumferential edge 588 around the periphery of the converse side 584 and the signal ramps down as is depicted by that potion of the line shown as 596.

Figure 46:
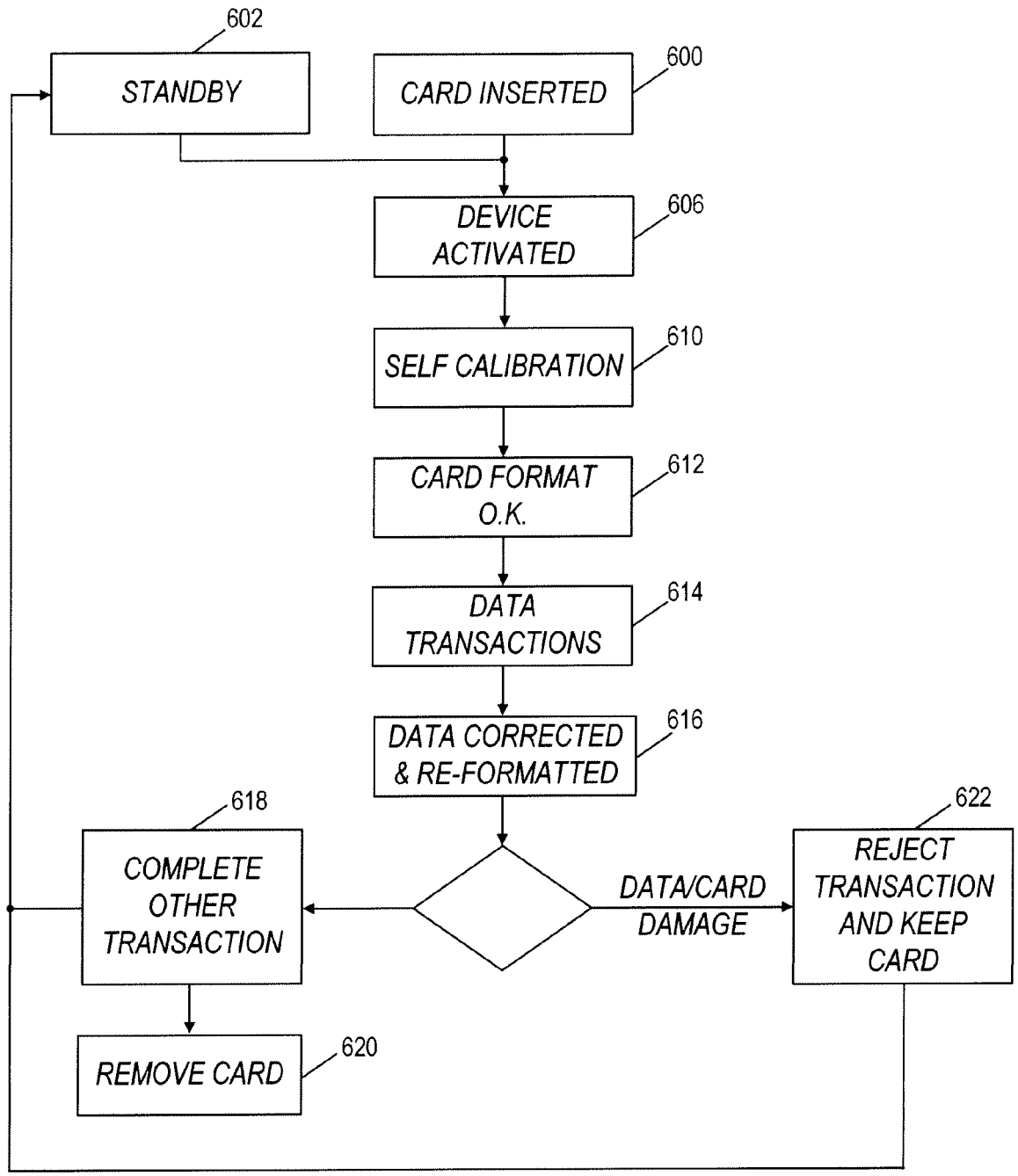
FIG. 46 is a simplified schematic diagram of a card reader for reading and reproducing information a portable card utilizing the teachings of the present invention.

The simplified schematic diagram of FIG. 46 discloses a card reader for reading and reproducing information a portable card utilizing the teachings of the present invention.

The simplified card reader schematic that illustrates that the portable card is inserted into the card reader as depicted by box 600. The card reader is programmed to be in a standby condition as depicted by box 602. When the portable card is inserted into the card reader, the card reader is activated as depicted by box 606. The card reader then performs a self-calibration step as depicted by box 610. The card reader then determines if the format of the portable card is acceptable and this step is depicted by box 612. The portable card and the data processing station located within and forming part of the card reader are moved relative to each other to cause the passage of magnetic signals between the data storage device and a transducer located within the data processing station. The relative movement between the portable card and the data processing station performs the required data transactions as depicted by box 614. To the extent that in the data corrections, recording of data, writing of data and the like, such operations are performed during such relative movement as described above and this step is depicted by box 616.

Upon completion of the data transaction 614 and data correction or other similar operations 616, a decision is made as to how the portable card is to be further processed. To the extent that any additional transactions are required before the portable card is returned to the user, the card reader completes such of the transactions as depicted by box 618. The portable card is then transported to a removable location for removal by the user and this is depicted by box 620. Upon completion of the other transactions as depicted by box 618, the card reader is placed into a standby mode in preparation for the next transaction.

If a decision is made that the data and/or card is damaged and the transaction should be rejected and/or the card is retained, that process step is depicted by box 622. Upon completion of the step depicted by box 622, the card reader is placed into a standby mode in preparation for the next transaction.

Figure 47:
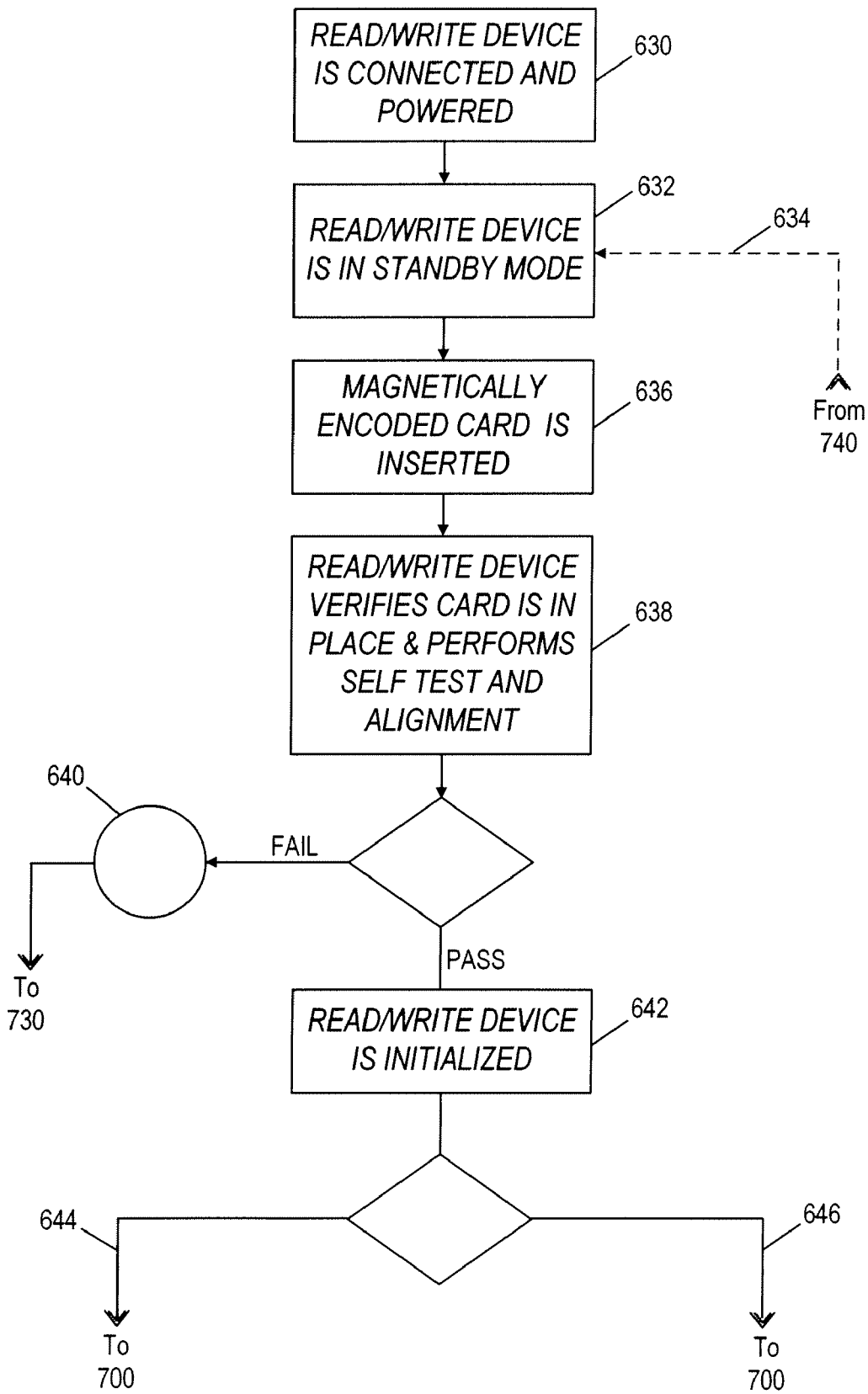
FIGS. 47 and 48, together, are a detailed schematic diagram of a card reader including data verification for reading and reproducing information from a portable credit card utilizing the teachings of the present invention.
Figure 48:
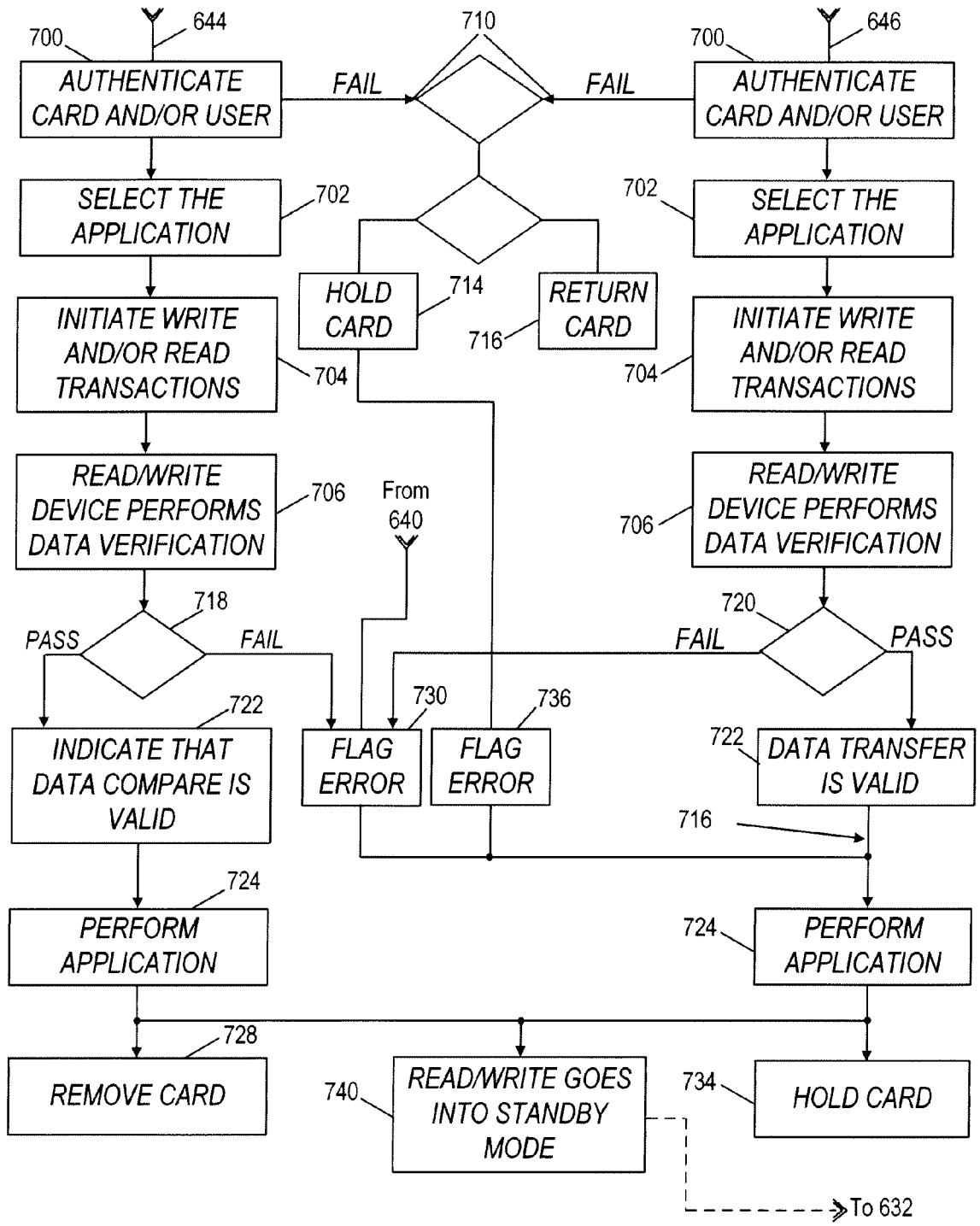

FIGS. 47 and 48, together, are a detailed schematic diagram of the operating steps or routine of a card reader for interacting with a data storage device as disclosed herein.

The description commences with FIG. 47. The card reader is a read/write device which is connected and powered from a power source and/or transmission device, and this is depicted by box 630.

The read/write device is in a standby mode until it is activated, and this is depicted by box 632. A control signal depicted by arrow 634 is typically transmitted to the card reader to designate that the card reader should change to or remain in the standby mode. A magnetically encoded card is inserted into the card reader causing the card reader to enter into its operating mode, and this is depicted by box 634.

The read/write device verifies that the card is in place and performs a self test and alignment operation, depicted by box 638. If the step of verification fails, the card is rejected, as depicted by circle 640. If the verification step is successful, then the card is deemed to have passed and the process then move into the read/write device being initialized as depicted by box 642.

The card reader then determines the operating mode as either a local mode, as depicted by lead 644, or a remote mode as depicted by lead 646.

The schematic diagram shown in FIG. 48 is referenced for the following discussion. As shown in FIG. 48, the local mode 644 and the remote mode 646 perform identical processing operations. The card reader authentic the card and/or used as depicted by box 700. The application to be performed is selected as depicted by box 702. The write and/or read transactions are initiated as depicted by box 704. The read/write performs data verification as id depicted by box 706. If a fail determination is made at the commencement of the processing, as depicted by arrows 710, then a determination is made to either hold the card, as depicted by box 714, or to return the card, as depicted by box 716.

Upon completion of the local mode or remote sequence, a determination is made that that transaction and/or data verification is valid. This is shown by rectangles 718 and 720, and the determination is pass of fail as shown in FIG. 48. If the determination is pass, then a indication is provided that the data compare is valid, as depicted by box 722, and the selected operation is performed, as depicted by box 724. Upon completion, the card is then transported to a location where the use removes the same as depicted by box 728.

If the determination is fail, then another series of determinations are enabled. The fail determination from 718 is transmitted to a flag error 730. Flag error 730 is enabled by the fail determination from 718, the fail determination from 640 and the fail determination from 720. The flag error 730 either allows the card to be returned and removed by the user, as depicted by box 728, or withhold the card as depicted by box 734.

In addition, a flag error 736 is responsive to a hold card determination 714, as described above, to withhold the card as depicted by box 734.

Upon a final determination to remove card, as depicted by box 728, or to withhold the card, as depicted by box 734, the read/write device then enabled to go into the standby mode as depicted by box 740. This determination is transmitted to the read/write device standby mode as depicted by box 632 in FIG. 47 by lead 634.

In the standby mode, the card reader is again actuated by the insertion of a portable card in the form of a magnetically encoded card as depicted by box 636 as described hereinbefore. Upon insertion of the portable card, the processing then commences as described herein.

The processing steps described herein in FIGS. 47 and 48 for the card reader is the preferred embodiment. It is envisioned that certain of the process steps can be eliminates or modified or that other process steps can be added, all of which are within the teachings of the present invention.

As discussed hereinbefore, it is anticipated that the protective coating could be subject to the collection of debris, finger prints or the like from normal handling by a user in an ambient and normal environment, as differentiated form a protected environment required for hard disk drive devices.

Therefore, the accuracy and reliability of reproducing (reading) encoded data from the portable card by a card reading apparatus and/or by methods for processing the portable card can be improved or enhanced by use of a card cleaner and process for cleaning a portable card prior to the card reader processing the portable card.

FIG. 49 is a simplified schematic diagram of a card cleaner for cleaning debris, fingerprints and the like from a portable card utilizing the teachings of the present invention, the cleaning process is commenced when a card is inserted into the card reader is depicted by box 750. Upon insertion of the card, the card is prewiped as depicted by box 752.

Thereafter, a mild, but effective, abrasive cleaning processing procedure is performed on the portable card to effectively remove debris, fingerprints and the like therefrom as depicted by box 754. A final wipe procedure is performed as depicted by box 756. The cleaned and wiped portable card is then exited as depicted by box 760. The portable card is then transported directly to the input section of the card reader as an inserted card as shown by box 636 in FIG. 47. The schematic diagram of FIG. 49 is the preferred embodiment of a cleaning process that is preformed prior to processing by a card reader for reading and reproducing information from the portable card, but all variations thereof are envisioned to be with the teachings of the present invention.

FIGS. 50 and 51 disclose one embodiment of a card cleaner 780 having a card feeder 782 for transporting a card 786 past an abrasive cleaning station 788 for carrying out carrying out the card cleaning process. In FIG. 50, the abrasive apparatus utilizes a strip abrasive material 790 which is supplied from supply reel 794, driven by drive member 796. The strip abrasive material 790 is brought into cleaning engagement with the card 786 by rollers 800 to mildly wipe and abrade the card protective coating as described herein. The expended or used strip abrasive material is past over a drive member 804 and onto a take up reel 806. A cover 808 located proximate the rollers 800 can be lifted to clean the roller 800.

FIG. 51 illustrate that drive motors 810 and 812 are used to drive the supply reel 794 and the take up reel 806, respectively.

FIG. 52 is a pictorial representation of an alternate structure of a card feeder and cleaner for rollers 800 illustrated in FIG. 50. In FIG. 52, the card feeder 782 includes an endless belt 820 to replace the roller 800 in FIG. 50. The cover 808 located proximate the endless belt 808 can be lifted to clean the endless belt 808.

Figure 53:
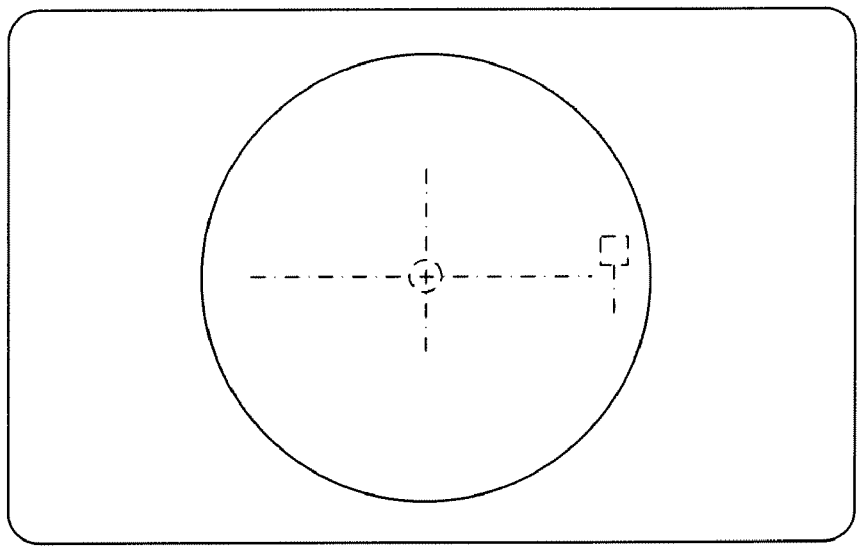
FIG. 53 is a pictorial representation of still yet another embodiment of a portable card utilizing the teachings of the present invention wherein a substrates enclosed the data storage device is in the form of a disk rigidly affixed to the substrate and wherein the entire substrate including the disk is rotated relative to a magnetic transducer shown by dashed lines.
Figure 54:
FIG. 54 is a right end elevational view of the portable card of FIG. 53 showing the disk fixedly located within the substrate by dashed lines.

In FIGS. 53 and 54, a portable card 820 includes a substrate 822 to enclosed a data storage device 826 in the form of a disk 830 rigidly affixed to the substrate 822. In this embodiment, the entire portable card 820 including the substrate and disk 830 is rotated relative to a magnetic transducer shown by dashed lines 830 to pass magnetic signals therebetween. In the preferred embodiment, the data storage device 826 is formed utilizing the teaching of the present invention.

Figure 55:
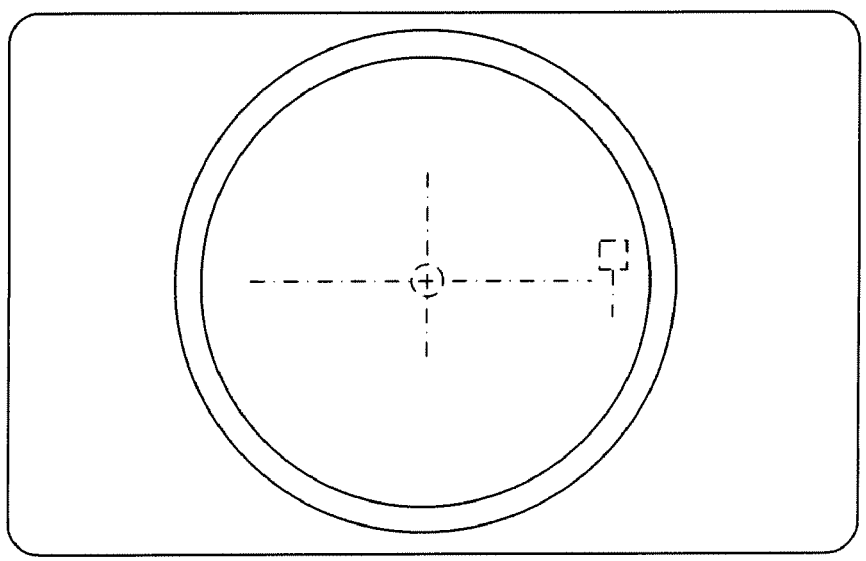
FIG. 55 is a pictorial representation of still yet another embodiment of a portable card utilizing the teachings of the present invention wherein a substrate encloses a data storage device in the form of a disk rotatably mounted to or supported with the substrate and wherein the disk is rotated within the substrate relative to a magnetic transducer shown by dashed lines.
Figure 56:
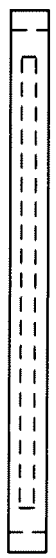
FIG. 56 is a right end elevational view of the portable card of FIG. 55 showing the disk rotatably located within the substrate by dashed lines.

FIGS. 55 and 56 are pictorial representations of still yet another embodiment of a portable card 840 utilizing the teachings of the present invention. A substrate 842 enclosed a data storage device 844 in the form of a disk 846 rotatably mounted within or supported within the substrate 842. The disk 846 is rotated within the substrate 842 relative to a magnetic transducer shown by dashed lines 850.

Based on the above disclosure, a card and card reader system is disclosed. The card and card reader comprises an encodeable card comprising a body having upper and lower surfaces and side and end edges and wherein the body includes on at least one of the upper and lower surfaces a data storage section adapted to interact with a data processing station when the card and the data processing station are moved relative to each other to at least one of encode signals in the data storage section and read encoded signals from the data storage section. The data storage section includes at least one thin film layer of high density storage material for storing data and a protective coating formed on the thin film layer which is selected to have a thickness to facilitate passage of encoded and encoding signals in an ambient natural atmospheric operating environment through the protective coating and the thin film layer and the protective coating formed of a material which resists at least one of chemical, magnetic and mechanical degradation of the data storage device.

The card reader has a transducer for at least one of encoding signals in the data storage section and reading encoded signals from the data storage section during relative movement of the card relative to the data processing station to enable data flow between the data storage section and the transducer.

In the preferred embodiment, the encodeable card is a magnetically encodeable card and the data storage section has at least one thin film layer of high density, high coercivity magnetic material having a predetermined magnetic field orientation for storing data. The transducer may be a thin film head, a magnetoresistive head or a giant magnetoresistive (GMR) head.

The encodeable card may optionally be an optically encodeable card and wherein the data storage section has at least one thin film layer of high density, optical recording material which is capable of reading and storing data in optical form. The transducer may be a laser adapted to reading and record optical data on said optical recording material.

It is envisioned that the card and card reader system may comprise, in the preferred embodiment, a magnetically encodeable card comprising a body having upper and lower surfaces and side and end edges wherein the body includes on at least one of the upper and lower surfaces a data storage section adapted to interact with a data processing station when the card and the data processing station are moved relative to each other. The data storage member may include at least one thin film layer of high density, high coercivity magnetic material having a predetermined magnetic field orientation for storing data.

A protective coating is formed on the at least one thin film layer of high density, high coercivity magnetic material and is selected to have a thickness to facilitate passage of magnetic signals in an ambient natural atmospheric operating environment through the protective coating and the thin film layer. The protective coating may be formed of a material which resists at least one of chemical, magnetic and mechanical degradation of the data storage device. The protective coating is adapted to interface with and be responsive to a data processing station when the substrate and data processing stations are moved relative to each other to enable data flow therebetween.

The reader has a transducer for reading the magnetically encoded storage section during relative movement of the card relative to the data processing station to enable data flow between the data storage section and the transducer. The transducer is capable of at least one of encoding magnetic signals in said data storage section and reading encoded magnetic signals from said data storage section during relative movement of the card relative to the data processing station to enable data flow between the data storage section and the transducer.

The at least one thin film layer of high density, high coercivity magnetic material may be a sputtered layer or a platted layer. The transducer may be a thin film magnetic head, a magnetoresistive head or a giant magnetoresistive (GMR) head. The magnetoresistive head may include a dual stripe magnetoresistive element. In addition. the magnetoresistive head may include a magnetic flux guide for conducting magnetic flux from the data storage section of the card read by said reader to the magnetoresistive head.

The data storage section may include data tracks having a predetermined width formed on a selected surface of the card and the predetermined width may be wider than said magnetoresistive head or have a predetermined width in the range of about "1" times to about "2" times wider than the magnetoresistive head.

A method for reading a card with a card reader is disclosed. The method comprises the steps of (a) forming on a substrate of a card a data storage section adapted to interact with a data processing station when the card and the data processing station are moved relative to each other to at least one of encode signals in the data storage section and read encoded signals from the data storage section; (b) forming a relatively hard, abradeable protective coating on said data storage section having a thickness between a maximum thickness which would materially attenuate encoding and encoded signals passing between said data storage section and a transducer and ~minimum thickness enabling said protective coating to be abraded by usage in an ambient natural atmosphere operating environment for removing therefrom a known quantity of the protective coating; and (c) moving the card and data processing station relative to each other to interface the data storage section relative to a transducer to enable data flow therebetween.

The step of forming may include forming a data storage section having at least one thin film layer of high density, high coercivity magnetic material having a predetermined magnetic field orientation for storing data.

The step of moving may include using a transducer which is a thin film head, a magnetoresistive head or a giant magnetoresistive (GMR) head.

The step of forming may include forming a data storage section having at least one thin film layer of high density, optical recording material which is capable of reading and storing data in optical form. The step of moving may include using a transducer which is a laser adapted to reading and record optical data on the optical recording material. In the preferred embodiment, a method for reading a card with a card reader may comprise the steps of: (a) forming on a substrate of a card a data storage section including a thin film of magnetic material having a predetermined magnetic orientation for storing data in a predetermined axis; (b) providing a protective coating including a magnetically permeable, magnetically saturable material which is disposed on an exchange break layer and responsive through the exchange break layer to the coercive material axes of magnetization to produce a magnetic image field in a direction opposite to the predetermined direction, the protection coating being formed of a material which resists at least one of chemical, magnetic and controllable mechanical degradation of the magnetic recording medium; and (c) moving the card and data processing station relative to each other to interface the data storage section relative to a transducer to enable data flow therebetween.

Also disclosed is a data storage device comprising a substrate having at least one surface. At least one high density magnetically coercive material layer is disposed on the substrate for storing magnetic signals with the coercive material axis of magnetization oriented in a predetermined direction relative to the at least one surface of the substrate. At least one non-magnetic material layer is disposed on the substrate for defining an exchange break layer. A protective coating is formed on the substrate and is selected to have a depth in a direction substantially normal to said exchange break layer to facilitate passage of magnetic signals in an ambient natural atmospheric operating environment through the exchange break layer and the coercive material having the axis of magnetization in the predetermined direction. The protective layer is formed of a material which resists at least one of chemical, magnetic and mechanical degradation of the data storage device. The substrate is preferably a non-magnetic substrate and the protective coating includes a magnetically permeable, magnetically saturable storage material disposed on the substrate and which is responsive through the exchange break layer to the coercive material axis of magnetization in the predetermined direction to produce a magnetic image field in a direction opposite to the predetermined direction.

The protective coating may include the magnetically permeable, magnetically saturable storage material as a separate independent layer disposed on the exchange break layer. Optionally, the protective coating may include a non-magnetic abrasion resisting layer as a separate independent layer disposed on the magnetically permeable, magnetically saturable storage material layer.

The at least one high density magnetically coercive material layer is disposed on the substrate for storing magnetic signals with the coercive material axis of magnetization oriented in a predetermined direction relative to the at least one surface of the substrate, and the predetermined direction may be: (i) orientated substantially parallel to said at least one surface of said substrate; (ii) orientated at an acute angle to said at least one surface of the substrate; (iii) orientated substantially perpendicular to the at least one surface of the substrate.

Also disclosed herein is a magnetically encodeable card comprising a non-magnetic substrate having at least one surface having a thin film, high density magnetically coercive material disposed on the substrate for storing magnetic signals with the coercive material axis of magnetization oriented in a predetermined direction relative to the at least on surface of said substrate. A non magnetic material is disposed on the substrate for defining an exchange break layer.

A protective coating is formed on the substrate in a direction substantially normal to the exchange break layer and the protective coating includes a magnetically permeable, magnetically saturable storage material disposed on the substrate and which is responsive through the exchange break layer and the magnetically saturable storage material to the coercive material axis of magnetization to produce a magnetic image field in a direction to facilitate passage of magnetic signals in an ambient natural atmospheric operating environment through the exchange break layer and the magnetically saturable storage material. The protective coating is formed of a material which resists at least one of chemical, magnetic and mechanical degradation of the data storage device.

Alternatively, the protective coating may include the magnetically permeable, magnetically saturable storage material being an independent layer disposed on the substrate. In addition, the protective coating may include a non-magnetic abrasion resisting material as a separate layer disposed on the magnetically permeable, magnetically saturable storage material.

In the magnetically encodeable card, the at least one high density magnetically coercive material layer is disposed on the substrate for storing magnetic signals with the coercive material axis of magnetization oriented in a predetermined direction relative to the at least one surface of the substrate, and the predetermined direction may be: (i) orientated substantially parallel to said at least one surface of said substrate; (ii) orientated at an acute angle to said at least one surface of the substrate; (iii) orientated substantially perpendicular to the at least one surface of the substrate.

The magnetically coercive material has a coercivity, in the preferred embodiment, of at least 1,000 Oersteds and the magnetically permeable, magnetically saturable storage material has a coercivity of less than about 100 Oersteds.

A magnetic signal processing apparatus is disclosed comprising a magnetic recording medium having a high density magnetically coercive material for storing magnetic signals with the coercive material axes of magnetization oriented in a predetermined direction; a non-magnetic material disposed on the high density magnetically coercive material for defining a exchange break layer and a protective coating which includes a magnetically permeable, magnetically saturable material which is disposed on the exchange break layer and which is responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium.

The apparatus includes a magnetic transducer positioned relative to a surface of the recording medium for transferring signals with respect to the recording medium. A drive member is operatively coupled to at least one of the transducer and the recording medium to provide relative movement therebetween. A magnetic control device having a bias field adapted to increase, through the protective coating and the exchange break layer, the reluctance of the magnetic saturable, magnetically permeable material to enable a magnetic signal to pass between the high density magnetically coercive material through the exchange break layer and the protective coating to the magnetic transducer.

A method of processing magnetic signals using a magnetic recording medium having a high density magnetically coercive material for storing magnetic signals with the coercive material axes of magnetization oriented in a predetermined direction is disclosed. The method comprises the steps of: (a) providing a layer of a non-magnetic material disposed on said high density magnetically coercive material for defining a exchange break layer; (b) providing a protective coating including a magnetically permeable, magnetically saturable material which is disposed on the exchange break layer and responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium; and (c) generating with a magnetic control device having a bias field adapted to increase through the protective coating and the exchange break layer the reluctance of the magnetic saturable, magnetically permeable material to enable the magnetic signal to pass between the high density magnetically coercive material through the exchange break layer and the protective coating to a magnetic transducer.

A system is disclosed which comprises a magnetic recording medium having a high density magnetically coercive material for storing magnetic signals with the coercive material axes of magnetization oriented in a predetermined direction. A non-magnetic material is disposed on the high density magnetically coercive material for defining a exchange break layer. A protective coating including a magnetically permeable, magnetically saturable material disposed on the exchange break layer and which is responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium.

A magnetic transducer is positioned relative to a surface of the recording medium for transferring signals with respect to the recording medium. A drive member is operatively coupled to at least one of the transducer and the recording medium to provide relative movement therebetween.

A magnetic control device having a bias field adapted to increase through the protective coating and the exchange break layer the reluctance of the magnetic saturable, magnetically permeable material to enable the magnetic signal to pass between the high density magnetically coercive material through the exchange break layer and the protective coating to the magnetic transducer.

A programmable control device operatively connected to the magnetic control device is used to cause the bias field to be applied to the recording medium when a selected magnetic image is located substantially adjacent the transducer.

The protective coating may have at least one layer which includes a magnetically permeable, magnetically saturable storage material. Alternatively, the protective coating may have at least two layers wherein one of the layers includes a magnetically permeable, magnetically saturable storage material and the other of the layers is a non-magnetic abrasion resisting layer formed on the one of the layers.

The data storage device may further include a non-magnetic material layer positioned between the protective coating and the at least one thin film layer. The magnetically permeable, magnetically saturable storage material is responsive through the non-magnetic layer to the coercive material axis of magnetization in the predetermine direction to produce a magnetic image field in a direction opposite to the predetermined direction.

Alternatively, the protective coating may have at least two layers wherein one of the layers includes a magnetically permeable, magnetically saturable storage material and the other of the layers is a non-magnetic abrasion resisting layer formed on the one of the layers In such a device, the data storage device may further includes a non-magnetic material layer positioned between the one of the layers of the protective coating and the at least one thin film layer and wherein the magnetically permeable, magnetically saturable storage material is responsive through the non-magnetic layer to the coercive material axis of magnetization in the predetermine direction to produce a magnetic image field in a direction opposite to the predetermined direction.

Figure 57:
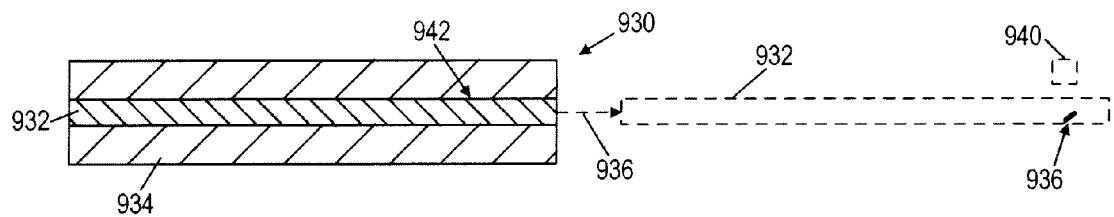
FIG. 57 is a front plan view of yet another embodiment of a linear high-memory portable card wherein the portable card is withdrawn from a protective holder into a read/write position.

FIG. 57 is a front plan view of yet another embodiment of a linear high-memory portable card assembly 930 wherein a storage member 932 is positioned within a substrate/housing 934 and can be moved therefrom into a withdrawn (read/write) position as depicted by dashed lines 936. A transducer 940 can be moved into position relative to the storage member 932 at position shown by dashed lines 936.

The embodiment of FIG. 57 may be generally referred to as a portable card 930 comprising a substrate 934 enclosing an accessible embedded storage member 932 having at least one layer of storage material, illustrated by arrow 942, for storing information. The substrate 934 and the storage member 932 are formed such that the storage member 932 can be transported relative to the substrate 934 to expose the at least one layer of storage material 942 to facilitate processing of stored information. The position shown by dashed lines 936 is one possible removeable position wherein the entire storage member 932 is completely removed from the substrate.

It is envisioned and indeed a teaching of this invention that the storage member 932 need not be entirely removed from the substrate 934, e.g., the storage member could be partially removed, to expose the at least one layer of storage material 942 to facilitate processing of stored information.

Figure 58A:
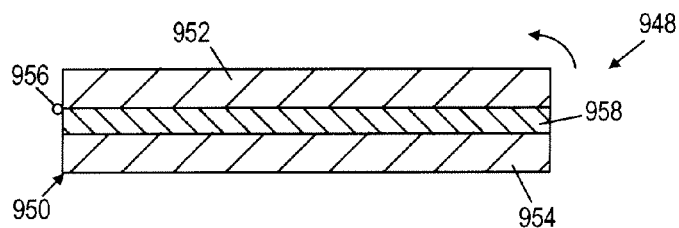
FIG. 58(A) is a front plan view of still yet another embodiment of a high-memory portable card wherein the portable card is stored within a protective hinged housing and the hinged housing is in a closed position.

FIG. 58(A) is a front plan view of still yet another embodiment of a high-memory portable card 948 wherein the storage member 958 is stored within a protective hinged housing or substrate shown by arrow 950 in a closed position. The substrate has a top section or first layer 952 that is hinged or pivoted, illustrated pictorially by pivot point 956, to a second substrate or bottom housing section 954 forming a clam-shell type structure.

Figure 58B:
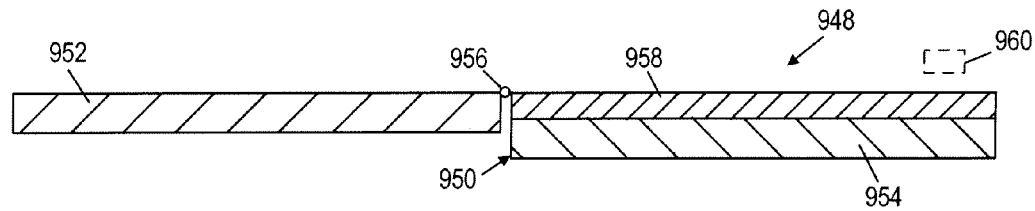
FIG. 58(B) is a front plan view of the embodiment illustrated in FIG. 66(A) wherein the hinged housing has been moved to an open position exposing the card to a read/write position.

As shown in FIG. 58(B), the hinged housing 950 has been moved to an opened position exposing the storage member 958 to a read/write position for access by a transducer 960.

Figure 59:
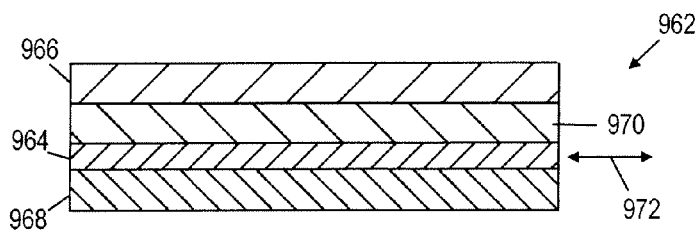
FIG. 59 is a front plan view of still yet another embodiment of a linear or rotational high-memory portable card wherein the portable card is maintained in a protective housing having a removable top section and removable bottom section which can be separated to bring the card from the protective holder into a read/write position.
Figure 63A:
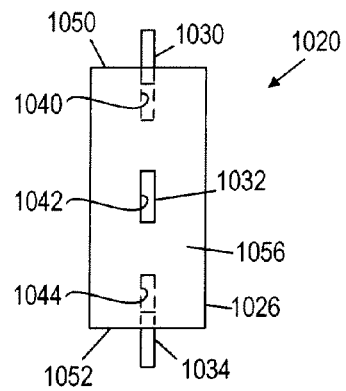
FIG. 63 (A) is a top plan view of still yet another embodiment of a portable card having a substrate formed of a predetermined shape and three accessible embedded storage members each having at least one layer of storage material for storing information which are enclosed by the substrate.
Figure 63B:
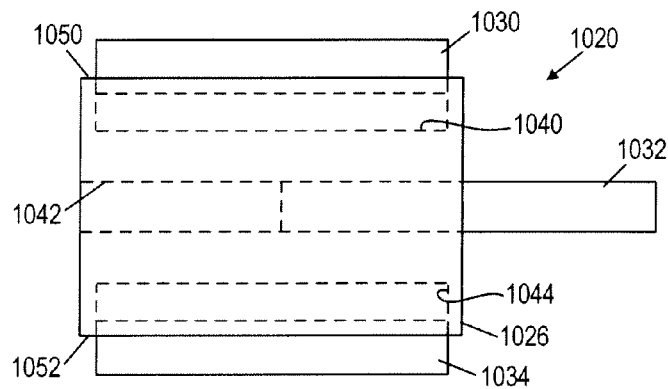
Figure 63C:
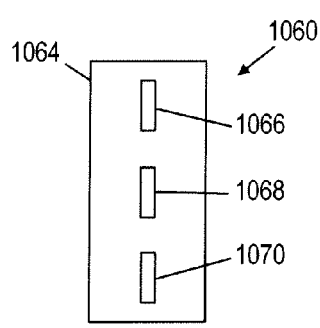
Figure 63D:
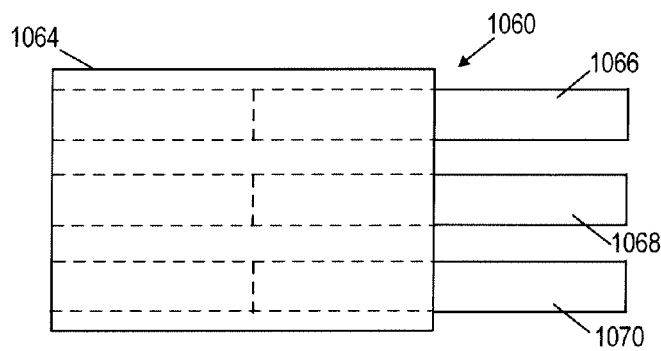

FIG. 59 is a front plan view of still yet another embodiment of a linear or rotational high-memory portable card 962 wherein the storage member 964 is maintained in a protective or shielding housing 962 having a removable top section 966, a first substrate or top section 970 and removable second substrate or bottom section 968 that can be separated to bring or withdraw the storage member 964 from the protective holder 966 for further processing, such as moving the card into a read/write position illustrated by arrow 972.

The embodiment of a portable card 980 illustrated in FIGS. 60(A), 60 (B) and 60 (C) has a substrate 982 formed of a predetermined shape, e.g. rectangular, square, circular or the like. The predetermined shape of the preferred embodiment illustrated in FIGS. 60(A), 60 (B) and 60 (C) is that of a credit card.

Figure 64A:
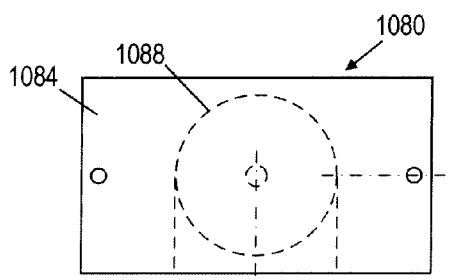
FIG. 64 (A) is a top plan view of still yet another embodiment of a portable card having a substrate formed of a predetermined shape and a single circular accessible embedded storage member each having at least one layer of storage material for storing information which is enclosed by the substrate.
Figure 64B:
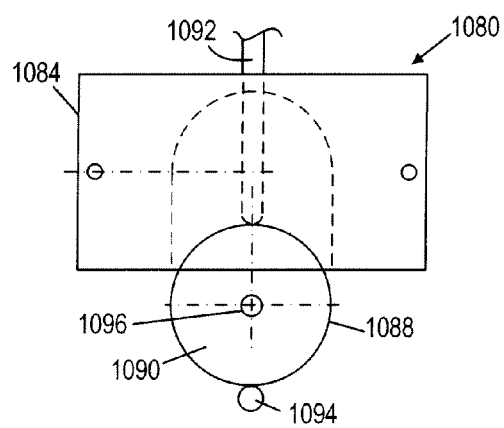
Figure 64C:
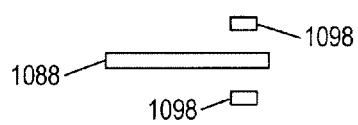
Figure 66A:
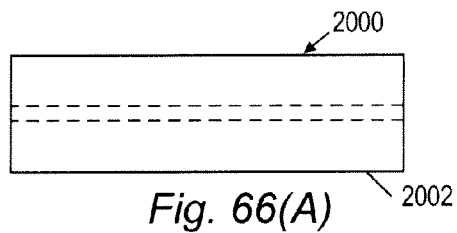
FIGS. 66 (A) through 66(I) are pictorial representations of various steps of a reader/writer and/or method for reading and storing information on a portable card in the form of the embodiment illustrated in FIG. 60 (A) through 60(C)
Figure 66B:
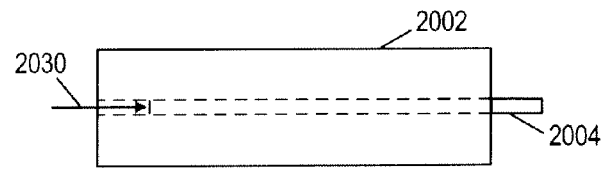
Figure 66C:
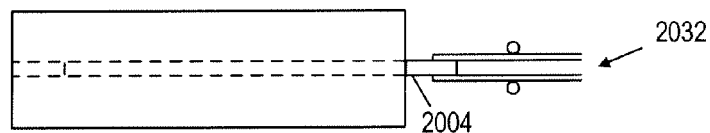
Figure 66D:
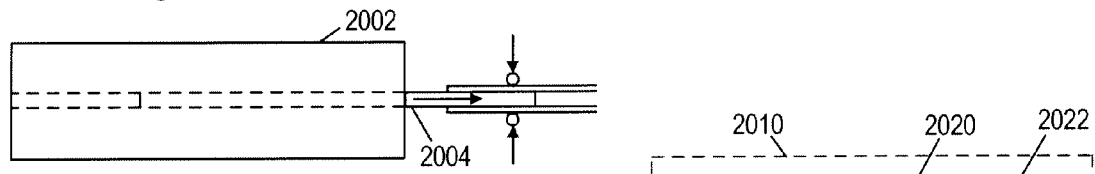
Figure 66E:
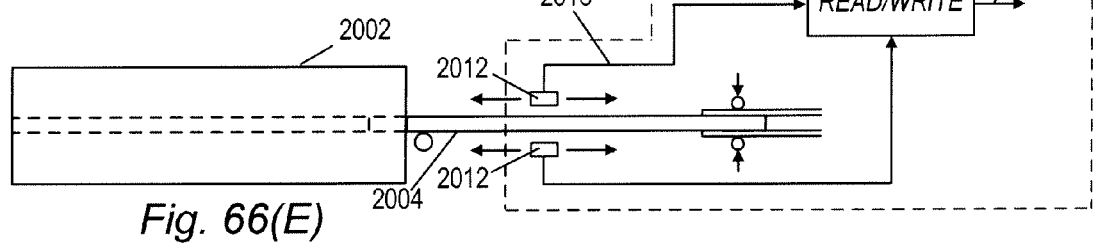
Figure 66F:
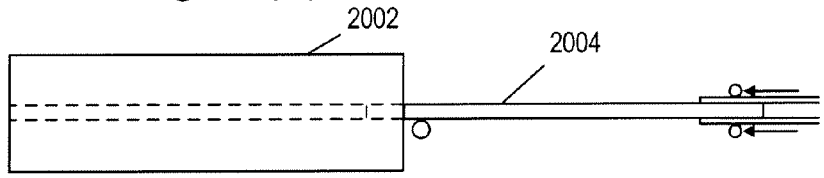
Figure 66G:
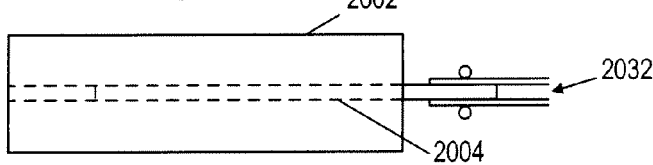
Figure 66H:
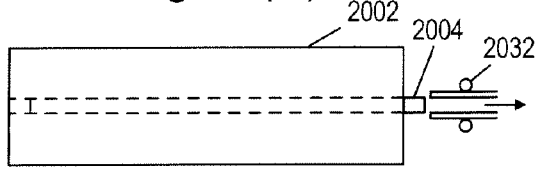
Figure 66I:
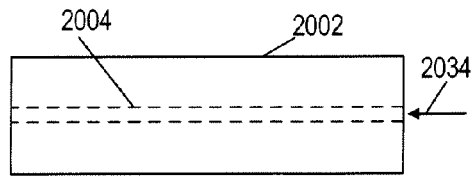

The substrate 982 of the portable card 980 encloses or embeds a single accessible embedded storage member 986 having at least one layer of storage material for storing information. In this embodiment, the storage member 986 is in the form of an elongated strip member as illustrated by dashed lines 988. The storage member may take other shapes, such as for example, a circular shape as illustrated in FIGS. 64 (B) and 64 (B). In this embodiment, the substrate 982 is a single structure having a hollowed-out central area 990 for enclosing or embedding a storage member 986.

FIG. 61 is a pictorial representation in cross-section of a portable card 1000 having a substrate 1002 formed of a first layer 1004 and a second layer 1006 which defines a hollowed-out central area 1008 for enclosing or embedding storage member 1010.

FIG. 62 illustrates pictorially the embodiment of the portable card illustrated in FIG. 60(A) wherein the accessible embedded storage member 986, in the from of an single elongated strip member, and the substrate 982 have been transported relative to each other to expose at least a portion the storage member including the at least one layer of storage material for storing information to facilitate processing of stored information.

The embodiment of a portable card 1020 illustrated in FIGS. 63 (A) and 63 (B) have a substrate 1026 formed of a predetermined shape and three accessible embedded storage members 1030, 1032 and 1034, each having at least one layer of storage material for storing information which are enclosed or embed by the substrate 1026. The substrate 1026 has three hollowed out areas 1040, 1042 and 1044 for enclosing or embedding the three accessible embedded storage members 1030, 1032 and 1034, respectively.

FIGS. 63 (A) and 63 (B) illustrate that the three accessible embedded storage members 11030, 1032 and 1034, in the form of elongated strip members, have been transported through the sides 1050 and 1052 and end 1056, respectively, of the substrate 1026 relative to each other to expose at least a portion the storage member to facilitate processing of stored information.

FIGS. 63 (C) and 64 (D) illustrate a still yet another embodiment of a portable card 1060 having a substrate 1064 formed of a predetermined shape and three accessible embedded storage members 1066, 1068 and 1070 each having at least one layer of storage material for storing information which are enclosed by the substrate 1064.

FIG. 63 (D) illustrates that the three accessible embedded storage members 1066, 1068 and 1070, in the form of elongated strip members have been transported relative to the substrate 1064 through the sides thereof to expose at least a portion the storage members 1066, 1068 and 1070 to facilitate processing of stored information.

FIGS. 64 (A) and 64 (B) illustrate still yet another embodiment of a portable card 1080 having a substrate 1084 formed of a predetermined shape, e.g., rectangular shape, and a single circular accessible embedded storage member 1088 wherein each surface thereof. e.g. surfaces 1090 on the top and bottom of the circular storage member 1088, e.g., a magnetic disk, has at least one layer of storage material for storing information.

In FIG. 64 (B), the accessible embedded storage member 1088 in the form of a circular member has been transported by urging of a pin member 1092 through the side of the substrate 1080 relative to each other to expose at least a portion the storage member 1088 to facilitate processing of stored information. In FIG. 64 (B), a drive member 1094 may, for example, engage the circumference of the storage member 1088 to rotate the same, or alternatively, a spindle 1094 may be used to rotate the storage member 1088.

FIG. 64 (C) illustrates pictorially the positions of at least two transducers 1098, located in and forming part of a data processing station, to process stored information on both surfaces of the circular accessible storage member 1088 each having at least one layer of material for storing information.

FIGS. 65 (A) through 65(F) are pictorial representations of various steps of a reader/writer and/or method for reading and storing information on a portable card using the teachings of this invention.

In the broadest aspect, the method for reading a card 2000 with a card reader comprising the steps of: (i) moving a portable card and a data processing station relative to each other wherein the portable card includes a substrate enclosing an accessible embedded storage member having at least one layer of storage material for storing information; and (ii) transporting storage member and said substrate relative to each other to expose at least a portion said storage member to facilitate processing of stored information by a data processing station.

In FIGS. 65 (A) and 65 (B), the portable card 2000 has a substrate 2002 having a predetermined shape. e.g., the shape of a credit card. The substrate 2002 encloses or embeds an accessible embedded storage member 2004 having at least one layer of storage material for storing information.

A removal and reinsertion member depicted by arrow 2008, cooperates with the substrate 2008, which functions as the body for the card, to at least partially remove the embedded storage member 2004 from the substrate 2002. The removal and reinsertion member depicted by arrow 2008 may completely remove the storage member 2004 from the substrate 2002 as depicted in FIG. 65 (C).

As illustrated in FIG. 65 (D), the removed storage member 2004 facilitates processing of the stored information by a data processing station shown by dashed box 2010. In this example, the data processing station 2010 includes transducers 2012 positioned one on each side of an elongated strip storage member 2004, which in the preferred embodiment may have a layer of magnetic material disposed on each side thereof containing stored information in the form of magnetic signals. The transducers 2012 pass the transduced signals over leads 2016 to read/write devices 2020 which processes the signals to produce an output signal on lead 2022. The output signals my be used as an input to a system for processing the signals as described herein before.

As depicted by FIGS. 65 (E) and 65 (F), the removal and reinsertion member then reinserts the storage member 2004 into the hollowed-out central area of the substrate 2002 as depicted by arrow 2024 for embedment of the storage member 2004 within the substrate 2002.

Although the above example utilizes an elongated strip storage member, it is envisioned that the above steps may be used with a storage member of any shape, e.g. a circular shape, rectangular shape or the like.

FIGS. 66 (A) through 66(I) are pictorial representations of various steps of a reader/writer and/or method for reading and storing information using the portable card 2000 illustrated in FIG. 65 (A) and generally following the steps illustrated in FIGS. 65 (A) through 65 (F).

The reader/writer and/or method utilizes a removal and reinsertion member having a stationary member, depicted by arrow 2030 in FIG. 66 (B), for urging the accessible embedded storage member 2004 the hollowed-out central area of substrate 2002 to position a portion of the storage member 2004 so as to extend slightly beyond at the edge of the substrate.

A positioning member, in the form of a pair of rollers and pair of clamping fingers depicted by arrow 2032 in FIG. 66 (C), removeably clamps and transports the accessible embedded storage member 2004 a predetermined distance out of the hollowed-out area to facilitate processing of the stored information on the storage member by a processing station 2010 in a manner similar to that depicted in FIG. 66 (D).

As illustrated in FIG. 66 (E), the removed storage member 2004 facilitates processing of the stored information by a data processing station shown by dashed box 2010. In this example, the data processing station 2010 includes transducers 2012 positioned one on each side of an elongated strip storage member 2004, which in the preferred embodiment may have a layer of magnetic material disposed on each side thereof containing stored information in the form of magnetic signals. The transducers 2012 pass the transduced signals over leads 2016 to read/write devices 2020 which processes the signals to produce an output signal on lead 2022. The output signals may be used as an input to a system for processing the signals as described herein before.

As depicted by FIGS. 66 (G), 66 (H) and 66 (I), the removal and reinsertion member 2032 then reinserts the storage member 2004 into the hollowed-out central area of the substrate 2002, releases or unclamps the storage member 2004 and a pin member depicted by arrow 2034 is used for embedment of the storage member 2004 within the substrate 2002.

Figure 67A:
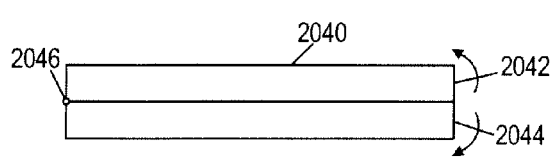
FIGS. 67 (A) and 67 (B) are pictorial representation of another embodiment of a portable card using the teachings of the present invention operatively coupled at the ends thereof to each other enabling at least a portion of said first layer to be moveable relative to said second layer illustrating a closed position and an open position, respectively.
Figure 67B:
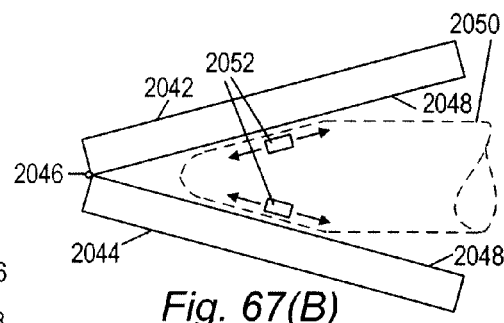

In the pictorial representations of FIGS. 67 (A), 67 (B), 68 (A), 68 (B), 68 (C), 69 (A) and 69 (B), the portable cards substrate has a first layer and a second layer each having an obverse side and a converse side operatively coupled to each other with the obverse side of said first layer positioned in an opposed relationship from the converse side of said second layer. This structure enables at least a portion of the first layer to be moveable relative to the second layer. A storage member is located on at least one of the obverse side of the first layer and converse side of the second layer.

In FIGS. 67 (A) and 67 (B), the substrate 2040 has first layer 2042 and a second layer 2044 each having an obverse side and a converse side operatively coupled to each other at a hinge point depicted by hinge 2046 with the obverse side of the first layer 2040 positioned in an opposed relationship from the converse side of the second layer 2044 enabling at least a portion of the first layer 2042 to be moveable relative to the second layer 2044. In this embodiment, the storage members 2048 are located on at least one of the obverse side of the first layer 2042 and the converse side of the second layer 2044. This embodiment is generally referred to as the clamshell structure. FIG. 67 (A) is the "closed position" and FIG. 67 (b) is the "opened position".

In FIG. 67 (B), the clamshell structure may be transported or is moved from its "closed position" to the "opened position" by any techniques known to persons skilled in the art. For example, a wedge as depicted by dashed wedge 2050 may be used to urge the first layer 2042 in a rotational movement away from the second layer 2044 for the insertion of or swiping of transducers 2052 to read/write the stored information. The wedge shown by dashed wedge 2050 may be in the form of an elongated swiping device having a wedge shaped end containing the transducers 2052. As such, the swiping device concurrently would transport the clamshell structure from its "closed position" to the "opened position" while reading or processing the stored data.

Figure 68A:
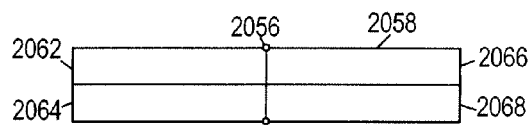
FIGS. 68 (A) through 68 (C) are pictorial representation of yet another embodiment of a portable card using the teachings of the present invention operatively coupled at the centers thereof to each other enabling at least a portion of said first layer to be moveable relative to said second layer illustrating a closed position and an open position, respectively.
Figure 68B:
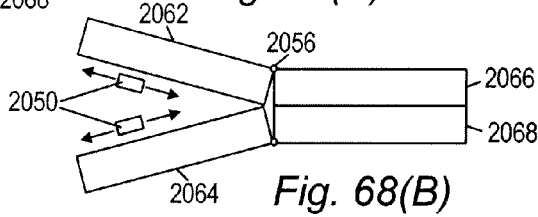
Figure 68C:
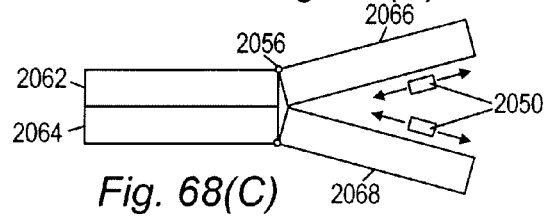

FIGS. 68(A), 68 (b) and 68(C) depict a variation of the embodiment of FIGS. 67(A) and 67 (B) wherein the portable card 2222058 has the first layer in two sections, 2062 and 2066 and the second layer in two sections 2064 and 2068. The storage members are located on the separate sections in a similar manner as described above with respect to FIGS. 67 (a) and 67 (B) However, the sections are hinged at the center as depicted pictorially as hinge 2056.

In a manner similar to that illustrated and discussed with respect to FIG. 67 (B), transducers 2050 are used for processing the stored information.

Figure 69A:
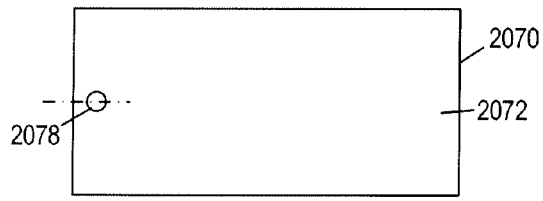
FIGS. 69 (A) and 69 (B) are pictorial representation of still yet another embodiment of a portable card using the teachings of the present invention pivotally coupled at the ends thereof to each other enabling at least a portion of said first layer to be moveable relative to said second layer illustrating a closed position and an open position, respectively.
Figure 69B:
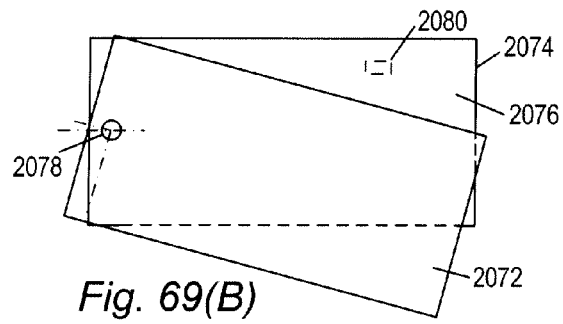

In FIGS. 69 (A) and 69 (B), the portable card 2070, using the teachings of the present invention, have a first layer 2072 and a second layer 2074 pivotally mounted relative to each other as depicted by pivot in 2078. Pivot pin 2078 enables movement in a first direction exposing at least a portion of at least one of the storage member located on the obverse side of the first layer 2072 and the storage member 2076 located on the converse side of said second layer 2074 to facilitate processing of stored information by a transducer depicted by dashed box 2080.

Upon completion of the processing of the stored information, the pivot pin 2078 enables movement in a direction opposite to the first direction to embed the storage members on each of the first layer 2072 and second layer 2074 within the portable card 2070.

Figure 70:
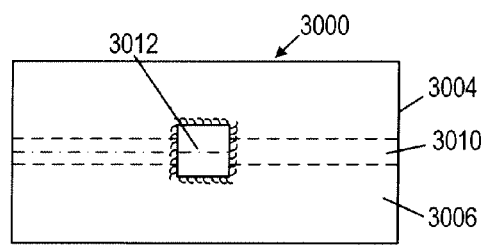
FIG. 70 is a pictorial representation of a top plan view of a portable card having and observe side and a converse side wherein a substrate encloses a single accessible embedded storage member having at least one layer of storage material for storing information moveable out of one end of the card and the observe side of the substrate has an integrated circuit located thereon to form a Smart Card.
Figure 71:
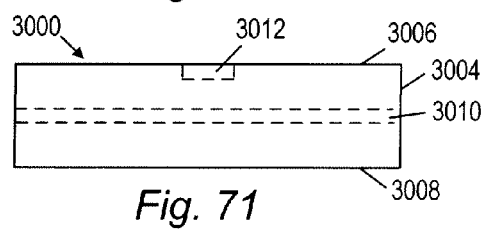
FIG. 71 is a pictorial representation of a front elevation view of the portable card illustrated in FIG. 70.
Figure 72:
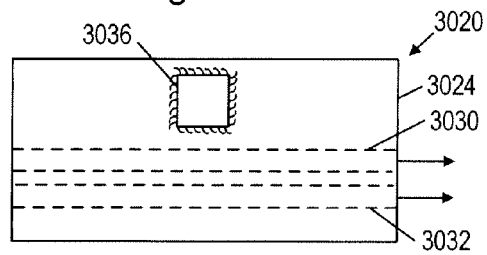
FIG. 72 is a pictorial representation of a portable card having and observe side and a converse side wherein a substrate encloses two accessible embedded storage members each having at least one layer of storage material for storing information wherein each of said storage members are moveable out of the same end of the card and the observe side of the substrate has an integrated circuit located thereon to form a Smart Card.

FIGS. 70 and 71 pictorially illustrate a portable card 3000 having substrate 3004 having an observe side 3006 and a converse side 3008. The substrate 3004 encloses a single accessible embedded storage member depicted by dashed lines 3010 having at least one layer of storage material for storing information. The single accessible embedded storage member depicted by dashed lines 3010 is moveable out of one end of the card 3000. The observe side 3006 of the substrate 3000 has an integrated circuit 3012 located thereon to form a Smart Card;

FIG. 72 is a pictorial representation of a portable card 3020 having and observe side and a converse side wherein a substrate 3024 encloses two accessible embedded storage members each having at least one layer of storage material for storing information depicted by dashed lines 3030 and 3032. Each of the storage members single accessible embedded storage member depicted by dashed lines 3010 are moveable out of the same end of the card 3020 and the observe side of the substrate 3024. substrate 3020 has an integrated circuit 3036 located thereon to form a Smart Card.

Figure 73:
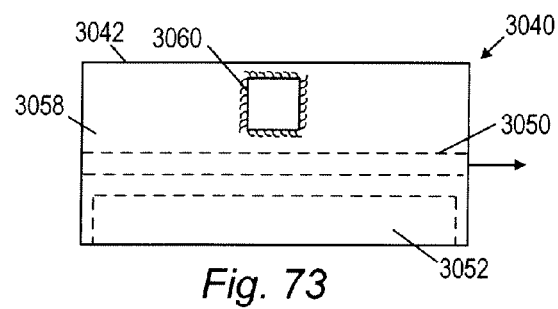
FIG. 73 is a pictorial representation of a portable card having and observe side and a converse side wherein a substrate encloses two accessible embedded storage members each having at least one layer of storage material for storing information wherein one of said storage members is moveable out of the end of the card and the other of said storage members is moveable out of a side of the card and wherein the observe side of the substrate has an integrated circuit located thereon to form a Smart Card.

FIG. 73 is a pictorial representation of a portable card 3040 having and observe side and a converse side wherein a substrate 3042 encloses two accessible embedded storage members each having at least one layer of storage material for storing information depicted by dashed lines 3050 and 3052. Storage member depicted by dashed lines 3050 is moveable out of the end of the card 3040 and the other of the storage members depicted by dashed lines 3052 is moveable out of a side of the card 3040. The observe side 3058 of the substrate 3042 has an integrated circuit 3060 located thereon to form a Smart Card.

In the portable cards disclosed herein, the at least one layer of storage material for storing information in a predetermined format may be any known storage medium including a magnetic medium, an optical medium or a magneto-optical medium.

In the preferred embodiment, the at least one layer of storage material for storing information in a predetermined format may be at least one layer of high density, high coercivity magnetic material for storing magnetic signals. In addition, a relatively hard, abradeable protective coating may be formed on the magnetic material layer which is selected to have a thickness between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating.

The storage member, preferably in the preferred embodiment, has at least one layer of high density, high coercivity magnetic material for storing magnetic signals. Further, the magnetic material layer may be formed of a substantially isotropic material, e.g. magnetic thin film alloy including platinum or an anisotropic material. Materials for forming the above layers have been set forth above.

The transducers discussed herein before may be used in practicing this invention for all of the embodiments of portable cards disclosed herein or which utilize the teachings of the present invention.

This invention includes and applies to a magnetic signal processing apparatus comprising or processing a portable card having a substrate having a predetermined shape and an accessible embedded storage member having at least one layer of high density magnetically coercive material for storing magnetic signals with the coercive material axes of magnetization oriented in a predetermined direction enclosed by the substrate. The storage member and the substrate are adapted to be transported relative to each other to expose at least a portion the storage member to facilitate processing of stored information by a transducer and for embedment of the storage member within the substrate.

A non-magnetic material may be disposed on the high density magnetically coercive material for defining an exchange break layer. A bendable, relative hard, protective coating including a magnetically permeable, magnetically saturable material may be disposed on the exchange break layer and is responsive through the exchange break layer to the coercive material axes of magnetization to produce a magnetic image field in a direction opposite to the predetermined direction.

The protective coating is selected to have a thickness between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating.

A magnetic transducer is positioned relative to a surface of the recording medium for transferring signals with respect to the storage member. A drive member operatively coupled to at least one of the magnetic transducer and the card provides relative movement therebetween.

A removal and reinsertion member is adapted to cooperate with the substrate to at least partially remove the embedded storage member from the substrate to facilitate processing of stored information by a transducer and to reinsert the storage member into the substrate for embedment of the storage member within the card.

A system is envisioned comprising a portable card having substrate having a predetermined shape and an accessible embedded storage member having at least one layer of storage material for storing information enclosed by said substrate. The storage member and the substrate are adapted to be transported relative to each other to expose at least a portion the storage member to facilitate processing of stored information and for embedment of the storage member within the substrate.

A writer/reader having a transducer for at least one of writing encoding signals in the storage member and reading encoded signals from the storage member during relative movement of the card, substrate or body relative to the data processing station enables data flow between the storage member and the transducer.

The system may also include a removal and reinsertion member that is adapted to cooperate with the substrate to at least partially remove the embedded storage member from the substrate to facilitate processing of stored information by a data processing station and to reinsert the storage member into the substrate for embedment of the storage member within the card.

In the embodiments disclosed herein, it is envisioned that: (i) the substrate is moved relative to said data processing station; (ii) the data processing station is moved relative to said substrate or (iii) the data processing station and said substrate are moved relative to each other. In addition, the substrate and at least one storage member are moved relative to each other to facilitate processing of the store information at the data processing station.

The portable card utilizing the teachings of the present invention has wide and multiple applications and is essentially a multi-use portable card having a data storage device. As such, the data storage device in the form of a portable card can be utilized for either or both, either solely or jointly, as a financial or credit card, and/or for non-financial data storage and/or any other transaction type card requiring the storing of magnetic signals.

For magnetically encodeable cards, portable cards or other cards or the like employing the teaching of the present invention for use with magnetic materials, the present invention may be practiced with a wide variety of horizontal or vertical recording materials, soft magnetic materials, non-magnetic materials and substrates. In addition conventional deposition, sputtering, plating, oxidating and web coating methods may be employed to prepare the recording medium or data storage section, or a data storage section combined with a substrate to from a data storage device, or data storage device. Media used for hard disks, floppy disks and recording mediums when used with the protective coating of the present invention may be used for practicing this invention. Further, the above-described advantages may be achieved by the addition of a relatively hard, bendable protective coating to the data storage device that can yield with movement of the card and wherein it is anticipated that a predetermined quantity of the protective coating will be abraded therefrom during normal use in an ambient normal atmospheric operating or usage environment.

The storage material which can be sued for practicing this invention include, without limitation: (i) magnetic material; optical recording material; and (iii) magneto-optical material. Such material are well known to persons skilled-in-the-art, and they need not be discussed in detail herein.

All such variations and incorporating of the teachings of the present invention are envisioned to be covered by and anticipated by the teachings set forth herein.

The invention claimed is:

1. A portable encoded memory card and card writer/reader system comprising:
   a portable encoded memory card including:
      a substrate defining a slot-like hollow area in the card having an opening; and
      a storage member having at least one layer of magnetic recording material for storing information, wherein said storage member and the slot-like hollow area are cooperatively formed such that the storage member is transportable relative to the substrate through said opening between a first position in which the storage member is fully enclosed within the slot-like hollow area, and a second position in which at least a portion of said storage member is removed from the hollow area and fully exposed outside of said slot-like hollow area to facilitate processing of stored information by a data processing station when the member is exposed; and
   said data processing station including a writer/reader having a transducer for at least one of writing encoding signals in said storage member and reading encoded signals from said storage member during relative movement of said storage member relative to said data processing station to enable data flow between said storage member and said transducer,
   wherein the data processing station further comprises a removal and reinsertion mechanism adapted to cooperate with said substrate to at least partially remove said storage member from said hollow area to facilitate processing of stored information by said data processing station, and to reinsert said storage member into said hollow area for embedment of said storage member within said substrate.

2. The card and card writer/reader system of claim 1, wherein said removal and reinsertion mechanism includes:
   a stationary member for urging said storage member from said hollow area to position a portion of said storage member so as to extend slightly beyond at least one of a side edge and an end edge of said substrate; and
   a positioning member for removeably engaging and transporting said storage member a predetermined distance out of said hollow area to facilitate processing of the stored information on the storage member by said data processing station.

3. The card and card writer/reader system of claim 2 wherein said positioning member is adapted to transport and reinsert said storage member into said hollow area for embedment of said storage member within said substrate.

4. The card and writer/card reader system of claim 1 wherein said transducer is an inductive head.

5. The card and card writer/reader system of claim 1 wherein said transducer is a thin film head.

6. The card and card writer/reader system of claim 1 wherein said transducer is a magnetoresistive head.

7. The card and card writer/reader system of claim 6 wherein said magnetoresistive head includes a dual stripe magnetoresistive element.

8. The card and card writer/reader system of claim 1 wherein said transducer is a giant magnetoresistive (GMR) head.

9. The card and card writer/reader system of claim 1 wherein said storage member has at least one layer of high density, magnetic material which is capable of reading and storing data as magnetic signals.

10. A portable encoded memory card and card writer/reader system comprising:
   a portable encoded memory card including:
      a substrate defining a slot-like hollow area in the card having an opening; and
      a storage member having at least one layer of magnetic recording material for storing information, wherein said storage member and the slot-like hollow area are cooperatively formed such that the storage member is transportable relative to the substrate through said opening between a first position in which the storage member is fully enclosed within the slot-like hollow area, and a second position in which at least a portion of said storage member is removed from the hollow member and fully exposed outside of said slot-like hollow area to facilitate processing of stored information by a data processing station when the member is exposed; and said data processing station including:
   a first transducer for reading the stored information from said storage member during relative movement of said storage member relative to the data processing station to enable data flow between said storage member and said first transducer; and
   a second transducer for writing data onto said storage member during relative movement of said storage member relative to the data processing station to enable data flow between said data storage device and said second transducer,
   wherein the data processing station further comprises a removal and reinsertion mechanism adapted to cooperate with said substrate to at least partially remove said storage member from said hollow area to facilitate processing of stored information by said data processing station, and to reinsert said storage member into said hollow area for embedment of said storage member within said substrate.

11. The card and card writer/reader system of claim 10 wherein said storage member comprises:
   at least one thin film layer of high density, high coercivity magnetic material having a predetermined magnetic field orientation for storing data; and
   a diamond-like hardness, abradeable protective coating formed on said thin film magnetic material layer.

12. A system comprising:
   a portable encoded memory card including a substrate having a predetermined shape; and an accessible embedded storage member having at least one layer of storage material for storing information enclosed by said substrate, said storage member and said substrate being adapted to be transported relative to each other to expose at least a portion said storage member to facilitate processing of stored information by a data processing station when the member is exposed and for embedment of said storage member within said substrate and to fully enclose said storage member within said substrate;
   said data processing station including writer/reader having a transducer for at least one of writing encoding signals in said storage member and reading encoded signals from said storage member during relative movement of said portable card relative to said data processing station to enable data flow between said storage member and said transducer,
   wherein the data processing station further comprises a removal and reinsertion member adapted to cooperate with said substrate to at least partially remove said embedded storage member from said substrate to facilitate processing of stored information by said data processing station, and to reinsert said storage member into said substrate for embedment of said storage member within said substrate.

13. The system of claim 12 wherein said storage member comprises a magnetically encoded storage member.

14. The system of claim 12 wherein said storage member comprises an optically encoded storage member.

15. The system of claim 12 wherein said storage member comprises a magnetic-optically encoded storage member.

16. A portable encoded memory card swiping system comprising:
   an elongated member having a wedge shaped end adapted to be inserted between and moving a first layer and a second layer of a substrate of said card wherein said substrate has a first layer and a second layer each having an obverse side and a converse side operatively coupled to each other with the obverse side of said first layer positioned in an opposed relationship from the converse side of said second layer enabling at least a portion of said first layer to be moveable relative to said second layer and wherein a storage member comprising stored information is located on at least one of the obverse side of said first layer and converse side of said second layer; and
   at least one transducer positioned in said wedged-shaped end and positioned to swipe the stored information from said storage member of said card as said wedged-shaped ends moves at least a portion of said first layer relative to said second layer.

17. The portable encoded memory card swiping system of claim 16 wherein said storage member includes at least one layer of magnetic material for storing the information as magnetic signals and wherein said transducer is a magnetic transducer.

* * * * *